(12) United States Patent
Goren et al.

(10) Patent No.: US 7,536,431 B2
(45) Date of Patent: May 19, 2009

(54) VECTOR-MATRIX MULTIPLICATION

(75) Inventors: Avner Goren, Rosh-Haayin (IL); Aviram Sariel, Ramot-Hashavim (IL); Shimon Levit, Rehovot (IL); Yosefa Asaf, Modiin (IL); Sergio Liberman, Netanya (IL); Benzion Sender, Modiin (IL); Tzvi Tzelnick, Tel-Aviv (IL); Yaron Hefetz, Herzelia (IL); Eyal Moses, Tel-Aviv (IL); Vered Machal, Tel-Aviv (IL)

(73) Assignee: Lenslet Labs Ltd., Ramot-HaShavim (IL)

( * ) Notice: Subject to any disclaimer, the term of this patent is extended or adjusted under 35 U.S.C. 154(b) by 564 days.

(21) Appl. No.: 10/488,581

(22) PCT Filed: Sep. 3, 2002

(86) PCT No.: PCT/IL02/00727

§ 371 (c)(1),
(2), (4) Date: Mar. 3, 2004

(87) PCT Pub. No.: WO00/72104

PCT Pub. Date: Nov. 30, 2000

(65) Prior Publication Data

US 2004/0243657 A1 Dec. 2, 2004

(30) Foreign Application Priority Data

Sep. 3, 2001 (IL) .................................. 145245

(51) Int. Cl.
*G06E 3/00* (2006.01)
*G06E 1/04* (2006.01)

(52) U.S. Cl. ....................................... 708/831; 708/191
(58) Field of Classification Search ................. 708/191, 708/831
See application file for complete search history.

(56) References Cited

U.S. PATENT DOCUMENTS

| 3,872,293 | A | 3/1975 | Green |
| 4,603,398 | A | 7/1986 | Bocker et al. |
| 4,607,344 | A | 8/1986 | Athale et al. |
| 4,697,247 | A | 9/1987 | Grinberg et al. |
| 4,777,614 | A | 10/1988 | Ward |
| 4,872,002 | A | 10/1989 | Stewart et al. |
| 4,937,776 | A | 6/1990 | Myers et al. |
| 4,986,640 | A | 1/1991 | Athale |
| 5,005,954 | A | 4/1991 | Liu |

(Continued)

FOREIGN PATENT DOCUMENTS

EP  0 935 321  8/1999

(Continued)

OTHER PUBLICATIONS

Feitelson, D. G.; "Optical Computing—Chapter 4.3: Matrix Operations"; MIT press 1988; pp. 117-129.

(Continued)

*Primary Examiner*—Tan V Mai

(57) ABSTRACT

An integrated VMM (vector-matrix multiplier) module, including an electro-optical VMM component that multiplies an input vector by a matrix to produce an output vector; and an electronic VPU (vector processing unit) that processes at least one of the input and output vectors. Various error reducing mechanisms are also discussed.

38 Claims, 15 Drawing Sheets

U.S. PATENT DOCUMENTS

| | | | |
|---|---|---|---|
| 5,099,448 | A | 3/1992 | Myers et al. |
| 5,099,449 | A | 3/1992 | Dombrosky et al. |
| 5,258,934 | A | 11/1993 | Agranat et al. |
| 5,272,726 | A | 12/1993 | Furuya et al. |
| 5,297,068 | A | 3/1994 | Guilfoyle et al. |
| 5,321,639 | A | 6/1994 | Krishnamoorthy et al. |
| 5,333,117 | A | 7/1994 | Ha et al. |
| 5,384,573 | A | 1/1995 | Turpin |
| 5,394,257 | A | 2/1995 | Horan et al. |
| 5,420,826 | A | 5/1995 | Abramovitz |
| 5,448,749 | A | 9/1995 | Kyuma et al. |
| 5,532,763 | A | 7/1996 | Janssen et al. |
| 5,537,443 | A | 7/1996 | Yoshino et al. |
| 5,537,492 | A | 7/1996 | Nakajima et al. |
| 5,670,979 | A | 9/1997 | Huq et al. |
| 5,784,309 | A | 7/1998 | Budil |
| 5,867,386 | A | 2/1999 | Hoffberg et al. |
| 6,069,912 | A | 5/2000 | Sawahashi et al. |
| 6,178,020 | B1 | 1/2001 | Schultz et al. |
| 6,320,565 | B1 | 11/2001 | Albu et al. |
| 6,529,614 | B1 | 3/2003 | Chao et al. |
| 6,724,334 | B2 | 4/2004 | Tzelnick et al. |
| 2003/0043133 | A1 | 3/2003 | Tzelnick |
| 2004/0248515 | A1 | 12/2004 | Molev Shteiman |
| 2005/0031221 | A1 | 2/2005 | Ludwig |

FOREIGN PATENT DOCUMENTS

| | | |
|---|---|---|
| EP | 0 924 820 | 5/2002 |
| WO | WO 96/00479 | 1/1996 |
| WO | WO 00/72104 | 11/2000 |
| WO | WO 00/72105 | 11/2000 |
| WO | WO 00/72106 | 11/2000 |
| WO | WO 00/72107 | 11/2000 |
| WO | WO 00/72108 | 11/2000 |
| WO | WO 00/72267 | 11/2000 |
| WO | WO 00/76102 | 12/2000 |
| WO | WO 01/77773 | 10/2001 |
| WO | WO 01/78011 | 10/2001 |
| WO | WO 01/78012 | 10/2001 |
| WO | WO 01/78261 | 10/2001 |
| WO | WO 01/84262 | 11/2001 |
| WO | WO 02/17329 | 2/2002 |
| WO | WO 03/021972 | 3/2003 |

OTHER PUBLICATIONS

Genov, R; "Charge-Mode Parallel Architecture for Vector-Matrix Multiplication"; Oct. 2001; IEEE Transactions on Circuits and Systems-II: Analog and Digital Signal Processing; vol. 48, No. 10: pp. 930-936.

Kleinfelder, S. et al.; "A 10kframe/s 0.18μm CMOS Digital Pixel Sensor with Pixel-Level Memory"; Feb. 5-7, 2001; 2001 IEEE International Solid-State Circuits Conference; Session 6.1; CMOS Image Sensors with Embedded Processors; pp. 88, 89 and 435.

Kub, F. J. et al.; "Programmable Analog Vector-Matrix Multipliers"; Feb. 1990; IEEE Journal of Solid-State Circuits; vol. 25, No. 1; pp. 207-214.

Yener et al. "A Nonlinear Programming Approach to CDMA Multiuser Detection", Signals, Systems, and Computers, Conference Record of the 33rd Asilomar Conference, Piscataway, NJ, USA, IEEE, p. 1579-1583, 1999.

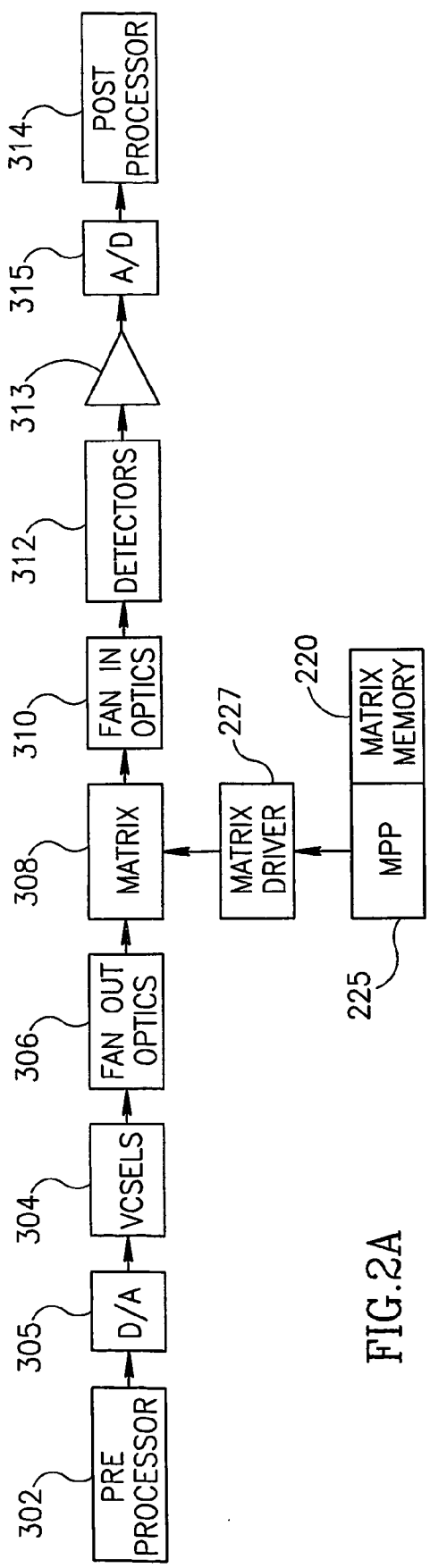
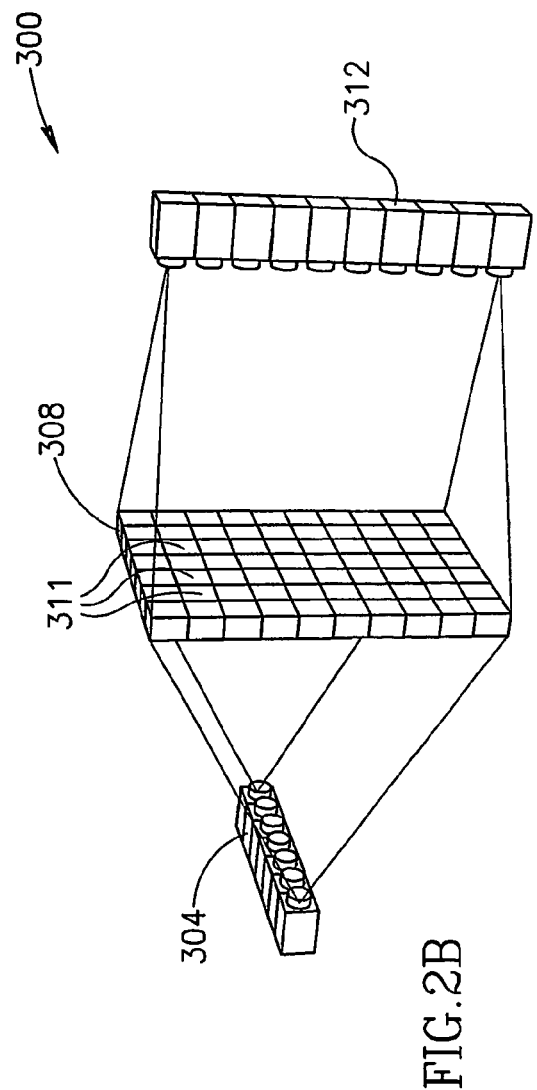
FIG.2A
FIG.2B

VECTOR-MATRIX MULTIPLICATION

RELATED APPLICATIONS

The present application is a U.S. national application of PCT Application No. PCT/IL02/00727, filed Sep. 3, 2002, the disclosure of which is incorporated herein by reference.

FIELD OF THE INVENTION

The present invention is related to applications using vector matrix multiplication.

BACKGROUND OF THE INVENTION

In the quest for higher processing power, various hardware architectures have been proposed, including digital signal processors (DSPs), application specific integrated circuits (ASICs), field programmable gate arrays (FPGAs) and general CPUs. As might be expected, however, even the fastest processors are not fast enough for the newest real-time applications that are conceived by system designers. Typically, any algorithm used is optimized to take into account the characteristics of the particular hardware/software implementation. A typical optimization method is to not use available information to its fullest, thus conserving computing time and remaining within the limits of the hardware capabilities, trading off performance for quality.

Cellular telephone systems are well known. One of the new system concepts is the UMTS (Universal Mobile Telecommunication System) architecture, also known as the 3G architecture. The current suggested standards are 3GPP1, for UMTS and 3GPP2 for a different concept known as CDMA2000. Both concepts define various protocols for implementing high data rate digital communications using a WBCDMA (Wide Band Code Division Multiplexing Access) method.

A considerable amount of signal processing is required to implement the algorithms defined by the suggested standards, especially in the base station where signals from multiple users, all broadcasting at the same time and frequency, must be detected and analyzed. The standard solution is to optimize the algorithms, for execution on DSPs or ASICs. However, even after such optimization, available processing power is not sufficient for the task and many of the protocols are not implemented in a complete manner (e.g., ignoring some available information and trading off performance for quality) or, alternatively the protocols are implemented on a multi-card device, with the users distributed between multiple costly cards.

A processor architecture referred to as "Stanford optical VMM", described for example in Dror G. Fietelson, "Optical Computing", Chapter 4.3, MIT press 1988, the disclosure of which is incorporated herein by reference, suggests performing vector matrix multiplication (VMM) using an optical model based on a transparency matrix. An analog electronic vector-matrix multiplication unit is described, for example, in "Programmable Analog Vector-Matrix Multipliers", by F. Kub, K. Moon, I. Mack, F. Long, in IEEE Journal of Solid-State Circuits, vol. 25 (1) pp. 207-214, 1990, which is incorporated herein by reference.

U.S. Pat. Nos. 4,937,776, 5,448,749 and 5,321,639 apparently describe architectures including optical components, which are suggested for use for matrix/vector manipulation.

SUMMARY OF THE INVENTION

A broad aspect of some embodiments of the invention relates to a processor (referred to wherein as a VMM processor) including a vector-matrix multiplier (VMM) core, adapted to perform vector matrix multiplication. The VMM core is optionally implemented using an electro-optical architecture.

In some embodiments of the invention, the processor including the VMM core is a self-sufficient VMM processor, optionally provided as a single module, which includes at least one other processing unit that is adapted to perform operations that the VMM core is not optimally adapted to perform. The at least one other processing unit optionally includes a vector processing unit (VPU) and/or a scalar processing unit (e.g., a DSP). Potentially, such integration of a VMM core and at least one other processing unit allows a faster operation and/or reduces interference.

Alternatively or additionally, the self-sufficiency of the processor is characterized by the ability of the module to store and utilize local results and/or the ability to reconfigure itself (e.g., calculate and/or change the matrix values). Thus, an independently functioning module is provided in some embodiments and there are fewer inter-device communications and fewer slowdown problems when the module is integrated into a complete system.

Further alternatively or additionally, the processor includes one or more memory units. The memory units may be used, for example, for storing matrix data, for storing intermediate results, old results, static data, various parameters and/or micro-code or sequencing instructions for the module and/or parts thereof.

Optionally, the VMM processor includes a controller. In an exemplary embodiment of the invention, the controller sequences the operation of the module and/or acceptance of input and/or transmission of output, for example, sequencing a series of interspersed transform operations, VPU operations, matrix changes and DSP operations. In a particular example, the controller buffers vector input while a matrix is being replaced.

In some embodiments of the invention, the VMM processor is reconfigurable for various applications. Alternatively or additionally, in a particular application, the module is reconfigurable between several operating modes so that a dynamic resource allocation algorithm may be utilized. In a particular example, a module that is configured to perform two operations, may be reconfigured to perform only one operation or to achieve a higher accuracy from one operation at the expense of the other operation. In another example, a same module is used for two or more different functions, by changing the matrix and/or steps performed by the VPU.

In some embodiments of the invention, the VMM processor is used for applications in which the bulk (e.g., number and/or scalar processing steps) of the operations performed belong to a VMM task.

Optionally, the VMM core includes a matrix of transparency or reflectance elements, whose level of transparency or reflectance (referred to herein as attenuation) represents a respective mathematical matrix value. Input vector values are optionally converted into light beams which are directed to elements of the matrix to perform the multiplication. Performing vector-matrix multiplication using a VMM core achieves much higher processing speeds than achievable using prior art processor architectures, for algorithms using a significant number of vector-matrix multiplication steps.

In some embodiments of the invention, the attenuation values of the matrix elements are changeable. Alternatively, the VMM processor allows update of only a part of the matrix, for example, only one or more rows, columns, rectangular blocks and/or any other portions. VMM some embodiments of the invention, a matrix portion is updated while the rest of the matrix is operational. In one example, the matrix includes one or more redundant rows which may be used instead of other rows of the matrix. Optionally, the values of the redundant rows may be replaced while the remaining matrix elements are used in performing vector-matrix multiplication.

In some embodiments of the invention, a single VMM processor includes a plurality of VMM cores which operate in parallel and/or pipelined, on same or different vectors. Alternatively or additionally, the VMM core performs a sequence of a plurality of VMM operations on a single input vector.

An aspect of some embodiments of the invention relates to a VMM sub-system which includes a VMM core. The VMM sub-system additionally includes a pre-processing unit and/or a post-processing unit, which are used to enhance the accuracy of the VMM sub-system, to compensate for defected and/or otherwise imperfect hardware of the VMM core, to reduce cross-talk, and/or to improve signal to noise ratio.

Optionally, the VMM core comprises an electro-optical unit which performs optical multiplication. The pre-processing and/or post-processing are optionally performed in electronic digital form. Alternatively or additionally, the pre- and/or post-processing may be used for signal processing purposes.

In some embodiments of the invention, the pre-processing and/or post-processing include scrambling the data and/or changing the range of the data, in order to reduce errors due to non-linearities and/or limited dynamic range of the VMM core. Alternatively or additionally, the input vector values are adjusted to compensate for inaccurate spreading of light beams, which impinge on neighboring matrix elements and/or detectors in addition to the matrix elements and/or detectors to which they are directed. Optionally, the pre-processing and/or post-processing depend on calibration tests performed periodically. Alternatively or additionally, the pre-processing and/or post-processing are performed according to a predetermined model.

In some embodiments of the invention, a single mathematical vector-matrix multiplication involves performing a plurality of VMM core operations, in order to enhance the accuracy of the result. Optionally, the input vector is partitioned into a plurality of bit planes or groups of bit planes and each bit-plane group is multiplied separately by the matrix. The bit plane group results are thereafter combined. Alternatively or additionally, a VMM core operation is performed on the same input data a plurality of times and a final result is derived as an average of the results of the plurality of operations.

Alternatively or additionally to performing a plurality of VMM core operations for a single calculation, when a multiplication of an input vector smaller than the matrix of VMM core is performed, the unused elements of the matrix are used for redundant multiplication and/or for bit-plane partitioning. In an exemplary embodiment of the invention, when the input vector is smaller than the size of the matrix, the extra capacity of the VMM core is optionally utilized to enhance the performance of the VMM core. Optionally, at least some of the matrix values are duplicated so that they are represented by a plurality of matrix elements. The corresponding input values are optionally directed through the plurality of elements and the resulting output values are averaged. This averaging increases the accuracy of the vector matrix multiplication.

An aspect of some embodiments of the invention relates to a VMM implementation that includes redundant components, available for compensating for damaged components. For example, a VMM implementation may include redundant input, output and/or matrix elements. In an exemplary embodiment of the invention, the input and/or output are routed through operable elements, in order to take advantage of the redundancy. Optionally, the redundant components are managed by the VMM processor in a manner that is transparent to an external host of the VMM processor. Alternatively or additionally, the quality of the different VMM components are monitored, so that better quality components may be used for computations that require a higher accuracy.

In some embodiments of the invention the VMM core includes one or more redundant elements, such as light detectors, light sources and/or matrix elements. The pre-processing and/or post-processing optionally includes selecting the elements to be used for a specific processing session.

An aspect of some embodiments of the invention relates to a physical implementation of an optical VMM core, in which the light sources generating the input vector values and/or the detectors generating the results are organized in a two dimensional array. Accordingly, each mathematical matrix row or column is represented by a two dimensional array of matrix elements, arranged, for example, in a square or a circle.

An aspect of some embodiments of the invention relates to a physical implementation of an optical VMM core including a plurality of matrices. Optionally, the plurality of matrices are each smaller than the mathematical matrix they represent. Alternatively or additionally, each of the plurality of matrices represents a portion of the represented mathematical matrix. Using smaller matrices allows easier production processes and/or production with a higher yield.

The light from the plurality of matrices is optionally led to different respective detector arrays. In some embodiments of the invention, the light is led from the matrices to the detectors on non-overlapping (although possibly crossing) light paths. For example, the matrices may be aligned relative to each other at an angle different than 90°. Alternatively or additionally, the light from different matrices directed toward the detectors is in different respective polarizations.

In some embodiments of the invention, the plurality of matrices are used in an implementation including a polarizing beam splitter (PBS) in order to receive substantially all the light from the light sources, when the polarization from the light sources is not known (uncontrolled). Optionally, the plurality of matrices includes two matrices which have the same element values. The beam splitter splits the generated light beams between the two matrices according to the uncontrolled polarization. Since two identical matrices are used, the polarization does not matter and light not received by the first matrix is handled by the second matrix.

An aspect of some embodiments of the invention relates to compensation for polarization artifacts of a light source. In an exemplary embodiment of the invention, an array of VCSELs is used, however, each VCSEL has a previously unknown, possibly different polarization. A polarization sensitive (optionally reflective) SLM is possibly used. In an exemplary embodiment of the invention, the light from a VCSELs is split by a polarizing beam splitter, so that each component of light hits a suitably oriented (polarization-wise) SLM. The resulting processed beams of light are overlapped, for example, by the same beam splitter and detected by a detector. If the two SLMs are controlled in corresponding manners, a same result is expected independent of the original polarization, or even if the polarization changes over time.

A broad aspect of some embodiments of the invention relates to using a VMM architecture for various applications where, hereunto, VMM methods were not used. In particular embodiments of the invention, in application for which algorithms were optimized for serial or parallel architectures, algorithms are, in accordance with some embodiments of the present invention, optimized for VMM architectures. In some applications, algorithms that are naturally (mathematically) VMM type and were previously optimized for serial implementation on electronic circuits, are now un-optimized. However, as will be noted below, optically realized VMM architectures have a potential speed that is apparently and currently much higher than electronics (for similar sizes and/or power loads), allowing some brute force algorithms to be applied with reasonable cost, so the previous optimization is no longer ideal. New optimization for VMM and/or VPU operation may be practiced instead, however, in some embodiments of the invention. Particular application include cellular telephone signal processing, such as a WBCDMA receiver at a base station and face recognition for automated cameras. Exemplary additional applications include, the XDSL (Digital Subscriber Line) family of wire modems, OFDM (Orthogonal Frequency Division Multiplexing) technology, GSM, EDGE (2.5G) and other cellular communication systems, VDB Wireless Broadcast, Networking applications such as Packet processors; routers and switches, Compression and Decompression protocols such as JPEG, MPEG, MP3, CELP/LPC voice, Spectrum analyzers and/or Machine vision systems, such as Correlation engines.

A broad aspect of some embodiments of the invention relates to the implementation and/or modification of various 3G or other cellular telephone system algorithms, such as "smart antenna" to apply VMM operations, for example, on a VMM architecture and/or a vector or scalar architecture. A particular benefit of some VMM architectures is that robust real-time processing may be provided. In an exemplary embodiment of the invention, a limited accuracy architecture, such as a non-digital optical architecture, is used. While errors due to limited accuracy are generally undesirable, in the case of WBCDMA, the arriving data is error laden and the algorithms are sufficiently robust to work suitably even if their implementation is not perfect. Another exemplary such application is decoding bits by correlation of a measured input string of values with a reference code. The accuracy of each individual multiplication and the sum is often not that critical, if, for example, the sum is tested against a threshold, so small errors can be tolerated. After the bits are detected (e.g., by the above method), an error correction protocol is optionally applied (e.g., digitally). In some embodiments of the invention, it is assumed that large fraction of the bits are wrong (mainly due to radio interference), so computation error will at most add few more wrong bits.

In an exemplary embodiment of the invention, a VMM architecture is used in a rake receiver. In one example, the VMM is used for searching for signal paths. Alternatively or additionally, the VMM architecture is used for tracking signal paths. Alternatively or additionally, the VMM architecture is used for implementing finger decoders. It should be noted that a fast VMM implementation (which is generally attainable in some embodiments of the invention) can provide multiple fingers for each user, for example, 4 or 8 fingers.

In an exemplary embodiment of the invention, a VMM architecture is used to implement a Multi User Detection (MUD) algorithm. In an exemplary embodiment of the invention, the MUD algorithm is implemented as a parallel algorithm, so that the interference from a large plurality of path signals and/or user signals are removed at each iteration, rather than only one at a time. In one implementation, the signals are removed prior to determining the delay for each signal.

In an exemplary embodiment of the invention, when part of an interfering signal cannot be estimated with confidence, the signal part is not subtracted out, or is fractionally subtracted, for example, a value of half a bit, instead of a value of a whole bit.

In an exemplary embodiment of the invention, a VMM architecture is used for decoding signals having variable spreading factors, for example, to decode high bandwidth channels (e.g., fast Internet data Service) mixed with low bandwidth channels (e.g., voice call).

In an exemplary embodiment of the invention, a VMM architecture implements a smart uplink antenna, in which the signals from a plurality (e.g., 2, 4, 10 or more) antenna elements are processed together to yield an effectively narrow-angle receiving antenna. Optionally, a smart antenna is used to separate high inference users, such as high data rate users, while other users are separated out using other methods, such as MUD.

In an exemplary embodiment of the invention, a VMM architecture is used to implement a smart downlink antenna. In an exemplary embodiment of the invention, a secondary spreading sequence sent to the target telephone (e.g., by sending different sequences for different lobes of the antenna) is analyzed (once returned) to determine a desirable transmit direction path to use for sending data to the target telephone.

An aspect of some embodiments of the invention relates to a detection method for detecting in parallel two signals that have a temporal offset. In an exemplary embodiment of the invention, the correlation matrix includes, for a single user, at least two signals, each signal including contributions from at least two consecutive bits. One signal is two same valued bits and one is two alternating valued bits. If a larger number of bits is detected, a larger number of different signals may be required. The partitioning point between the bits is dependent on the delay for the user (or path) which can be known, for example, based on tracking or on detection of pilot bits. Optionally, the detection is applied on an input vector portion having a size of at least two bits, for example, to assist in detecting correlation in cases where the partitioning point is near the end of the input vector. Consecutive correlations may utilize overlapping input vector portions. The detection method may be used, for example, for MUD or for other detection methods. In a VMM implementation, a simple correlation may be used. However, if a DSP is used (as well or instead of the VMM) more advanced correlation/detection methods may be used, for example, weighted correlation. For example, if a first detection is "01" and a second detection is "00", there is a disagreement on the middle bit. A decision between the two correlation may be made, for example, base on the quality of each correlation and/or the length of the bit include din the corresponding input vector portion.

An aspect of some embodiments of the invention relates to using parallel vector processing for processing data at a cellular base station.

An aspect of some embodiments of the invention relates to compensating for an inexact implementation of a transform method. In an exemplary embodiment of the invention, a transform is implemented by convolution of a vector with a matrix of sub-elements. In a calibration step, the inexact realization of the transform is determined, so that the realization can be corrected by modifying the matrix so that application of the modified matrix would yield, as a result of the imperfection the desired transform. Alternatively or additionally, the correction is applied after the VMM operation, for example, by a VPU. In an exemplary embodiment of the invention, by pre-correcting a slowly changing matrix, correction of a frequently changing result is avoided.

There is thus provided in accordance with an exemplary embodiment of the invention, an integrated VMM (vector-matrix multiplier) module, comprising:

an electro-optical VMM component that multiplies an input vector by a matrix to produce an output vector; and an electronic VPU (vector processing unit) that processes at least one of the input and output vectors. Optionally, the module comprises a DSP (digital signal processor) that processes at least one of the input vector, the output vector or the matrix. Alternatively or additionally, the module comprises a memory that stores at least one of matrix replacement values, at least one previous output vector and instructions for a component of the module.

In an exemplary embodiment of the invention, at least one of said DSP and VPU are programmed to calculate an update value for at least part of said matrix.

In an exemplary embodiment of the invention, said VMM component includes a local memory buffer for update values of said matrix.

In an exemplary embodiment of the invention, said VMM module comprises a register file adapted for exchanging information between said VMM and said VPU. Optionally, said register file includes a register copy ability for transferring information between registers.

In an exemplary embodiment of the invention, said module comprises a parameter extractor which extracts at least one parameter from at least one of said vectors. Optionally, said parameter comprises an extreme value element.

In an exemplary embodiment of the invention, said VMM module comprises a pre-processor which preprocesses said input vector, to improve a quality of its processing by a matrix component of said VMM.

In an exemplary embodiment of the invention, said VMM module comprises a pre-processor which preprocesses said input vector, to correct for artifacts caused by processing by a matrix component of said VMM.

In an exemplary embodiment of the invention, said VMM module a vector buffer for buffered input from an external circuit. Optionally, said buffer receives 8 bit data in parallel.

There is also provided in accordance with an exemplary embodiment of the invention, an integrated VMM (vector-matrix multiplier) module, comprising:

a electro-optical VMM component that multiplies an input vector by a matrix to produce an output vector; and a controller, wherein said controller is operative to replace values in only a part of said matrix.

There is also provided in accordance with an exemplary embodiment of the invention, a VMM (vector-matrix multiplier) component, comprising:

a plurality of input elements that represent an input vector;

a plurality of electro-optical matrix elements that represent a transformation matrix; and a plurality of detector elements that detect signals from said input elements after they are modulated by said matrix elements such that said detected signals represent result vector of a vector matrix multiplication of said input vector, wherein said component comprises at least one redundant element in at least one of said input, matrix and output elements. Optionally, said component comprises a fan element for at least one of input fanning and output fanning, wherein said fan is programmable to selectively utilize said at least one redundant element. Optionally, said component comprises a controller which manages said at least one redundant element.

There is also provided in accordance with an exemplary embodiment of the invention, a VMM component, comprising:

an array of sources;

at least one optical element which spreads the light from one source into a two-dimensional beam;

an SLM having logical rows arranged in a two-dimensional manner to match said beam; and a detector which detects the contributions of modulation of said SLM for multiple beams, wherein said array is a two-dimensional array representing a one dimensional array. Optionally, said SLM is reflective.

There is also provided in accordance with an exemplary embodiment of the invention, a VMM component, comprising:

an array of sources having imperfect polarization orientation;

at least one lens which spreads the light into a beam;

a beam splitter which splits said beam into first and second polarization components;

at least a first SLM that modulates said first polarization component of said beam;

at least a second SLM that modulates said second polarization component of said beam;

a detector array which detects the contributions of modulation of said SLM for multiple beams from both polarization components. Optionally, said beam splitter is a polarizing beam splitter that combines said modulated beams. Alternatively, different elements of said array detect beams from different polarization.

In an exemplary embodiment of the invention, said detector array comprises a polarizing beam combiner for combining said polarization components.

In an exemplary embodiment of the invention, said SLMs are perpendicular to each other. Alternatively, said SLMs are not perpendicular to each other.

There is also provided in accordance with an exemplary embodiment of the invention, an optical vector matrix multiplier (VMM), comprising:

an array of light sources, adapted to generate light beams representing a multiplied vector;

at least two reflective matrixes adapted to spatially modulate light from the light sources; and a detector array adapted to detect light from the reflective matrixes. Optionally, said VMM comprises a beam splitter adapted to receive light generated by the array of light sources and direct the received light to one or more of the matrixes. Optionally, the beam splitter comprises a polarization beam splitter. Alternatively or additionally, the beam splitter provides each of the matrixes with a predetermined percentage of the light of each of the generated light beams. Alternatively, the amount of light provided by the beam splitter to the matrixes is not predetermined.

In an exemplary embodiment of the invention, at least one of the matrixes has fewer elements than the number of light sources multiplied by the number of detectors. Alternatively or additionally, at least some of the elements of the matrixes represent values of a mathematical matrix and the elements of at least one of the matrixes represent fewer than all the elements of the mathematical matrix.

There is also provided in accordance with an exemplary embodiment of the invention, a method of improving signal detection in an electro-optical VMM, comprising:

receiving an input vector and a matrix to be processed by said VMM; and rearranging said input vector on an input of said VMM and said matrix in a matrix portion of said VMM, in a manner that improves signal detection. Optionally, rearranging comprises spatially separating vector elements to reduce cross-talk. Alternatively or additionally, rearranging comprises duplicating at least some vector elements. Optionally, rearranging comprises duplicating an entire vector.

In an exemplary embodiment of the invention, rearranging comprises rearranging said matrix.

In an exemplary embodiment of the invention, rearranging comprises rearranging said input vector so that at least some light sources of said VMM can be extinguished.

There is also provided in accordance with an exemplary embodiment of the invention, a method of improving signal detection in an electro-optical VMM, comprising:

receiving an input vector and a matrix to be processed by said VMM; and adapting values of at least one of said input vector on an input of said VMM and said matrix in a matrix portion of said VMM, in a manner that improves signal detection. Optionally, adapting comprising negating values of at least some vector elements. Alternatively or additionally, adapting comprises shifting a baseline value to be non-zero, such that light sources of the VMM are not extinguished to achieve this base line value. Alternatively or additionally, adapting comprises amplifying or reducing input value to make use of an available dynamic range of said VMM. Alternatively or additionally, adapting comprises shifting an input value base line to make use of an available dynamic range of said VMM. Alternatively or additionally, adapting comprises applying a linearity correction. Alternatively or additionally, adapting comprises weighting vector elements with weights that correspond to a number of zero values in a corresponding matrix column. Alternatively or additionally, adapting comprises weighting at least one of vector elements and matrix elements with weights that correspond to an average of values in corresponding matrix columns.

There is also provided in accordance with an exemplary embodiment of the invention, a method of improving signal detection in an electro-optical VMM, comprising:

receiving an input vector and a matrix to be processed by said VMM;

processing said vector by said VMM to produce an output vector; and adapting values of said output vector, by applying a history correction which corrects for residual affects of a previous computation performed by said VMM. Optionally, said adapting comprises applying a temperature correction. Optionally, said adapting comprises applying a correction for an adaptation made to said input vector.

There is also provided in accordance with an exemplary embodiment of the invention, a method of determining a user path in a cellular system, comprising:

transmitting a different secondary spreading code on different lobes of an antenna; and determining a user direction based on the secondary spreading code actually adopted by the user.

There is also provided in accordance with an exemplary embodiment of the invention, a method of assisting detection of a CDMA signal, comprising:

estimating a signal of an interfering path from an input vector; and subtracting parts of said estimated path signal from said input vector, while not fully subtracting parts of said estimated signal that have a low confidence. Optionally, the method comprises subtracting a fractional value for signal parts, responsive to the confidence in the estimation of the parts.

There is also provided in accordance with an exemplary embodiment of the invention, a method of detection of a CDMA path signal, comprising:

providing an input vector;

generating a composite estimation signal including contributions from at least two consecutive bits; and correlating the composite signal with an input vector. Optionally, said correlating comprises correlating with a portion of said input vector that is large enough to contain two bits. Alternatively or additionally, the method comprises joining the contributions of correlations on successive input vector portions.

There is also provided in accordance with an exemplary embodiment of the invention, a method of MUD (Multi User Detection), comprising:

estimating the signals of a plurality of paths in parallel; and subtracting said signals together from an input vector.

There is also provided in accordance with an exemplary embodiment of the invention, a method of CDMA signal detection, comprising:

receiving an input signal as an input vector; and at least one of detecting and decoding said signal using a vector matrix multiplier for at least one of processing multiple path signals in parallel and multiple parallel correlations. Optionally, the method comprises multi-user-detection using a parallel path estimation. Alternatively or additionally, the method comprises multi-user-detection using a decorrelation detection. Alternatively or additionally, the method comprises applying a smart antenna algorithm by detecting and subtracting out contributions from strong interfering signals. Alternatively or additionally, the method comprises arranging paths in groups for separate processing for each spreading factor.

There is also provided in accordance with an exemplary embodiment of the invention, a VMM component, comprising:

an array of sources elements;

at least one optical component which spreads the light from one source into a beam;

an SLM comprising a plurality of elements arranged in logical rows arranged to match said beam; and an array of detector elements which detect the contributions of modulation of said SLM for multiple beams, wherein at least one of said source elements, said detector elements and said SLM elements are non-uniformly sized. Optionally, said uniformity is selected to compensate for a non-uniformity of light intensity distribution of said component. Alternatively or additionally, at least one of the edge components are made larger. Alternatively or additionally, the effective optical size of non-edge components is made smaller by intentional degradation.

There is also provided in accordance with an exemplary embodiment of the invention, a method of processing using and calibrating a VMM component, comprising:

loading said VMM with an input data vector and a matrix;

reserving at least one of an input data vector element, an output detector element and a matrix element for calibration;

processing said input vector using said VMM and said matrix to produce a result vector;

determining at least one calibration value based on said at least one reserved element; and correcting said result vector based on said calibration value. Optionally, said at least one reserved element comprises a plurality of detectors used to detect a sum value.

Optionally, said at least one reserved element comprises at least one matrix row and at least one input vector element.

BRIEF DESCRIPTION OF THE FIGURES

Non-limiting exemplary embodiments of the invention will be described in following description of exemplary embodiments, read in conjunction with the accompanying figures. Identical structures, elements or parts that appear in more than one of the figures are labeled with a same or similar numeral in all the figures in which they appear.

FIG. 2A is a schematic block diagram of an exemplary electro-optical VMM core, in accordance with an exemplary embodiment of the invention;

FIG. 2B is a schematic illustration of an optical portion of an electro-optical VMM core, in accordance with an exemplary embodiment of the present invention;

DETAILED DESCRIPTION OF EXEMPLARY EMBODIMENTS

SPE Overview

Figure 1:
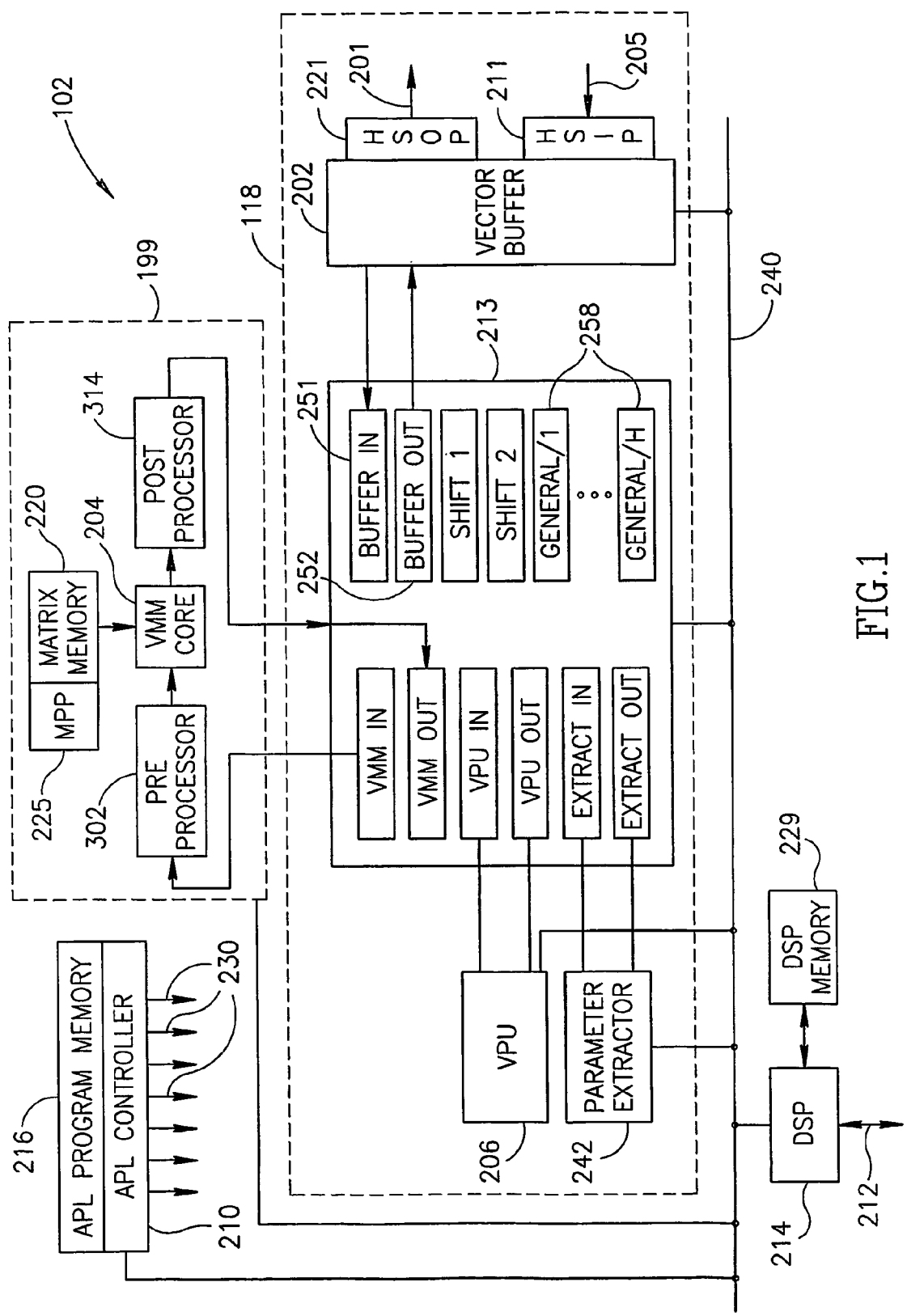
FIG. 1 is a schematic block diagram of a vector matrix multiplier (VMM) signal processing engine (SPE), in accordance with an exemplary embodiment of the invention.

FIG. 1 is a schematic block diagram of a vector matrix multiplier (VMM) based signal processing engine (SPE) 102, in accordance with an exemplary embodiment of the invention. SPE 102 includes a VMM sub-system 199 adapted to perform vector matrix multiplication at a relatively high speed. Sub-system 199 includes a VMM core 204 which is adapted to perform multiplication of input vectors by a matrix at a relatively high rate. Optionally, VMM core 204 includes a programmable matrix, such that the matrix multiplying the input vectors may change according to the task performed and/or during the performance of a task (i.e., according to the steps of the task). In addition to VMM core 204, VMM sub-system 199 includes additional elements as is now described, which are used to translate between mathematical values and values processed internally by VMM core 204.

In some embodiments of the invention, for example as described below with reference to FIG. 2, matrix data of VMM core 204 is preprocessed by a matrix pre-processor (MPP) 225. A matrix memory 220 optionally stores values of a plurality of matrices and/or matrix portions which may be used for fast replacement of the matrix in VMM core 204. The vectors multiplied in VMM core 204 are optionally passed through a (optional) pre-processor 302 on their way to the VMM core. Similarly, the resulting vectors are optionally passed through a (optional) post-processor 314. The operation of pre-processor 302 and post-processor 314 is described in detail below, with reference to FIG. 2.

In some embodiments of the invention, SPE 102 further includes a vector processing unit (VPU) 206 for performing vector-vector operations and/or vector scalar operations, as described in detail below. A parameter extractor unit 242 optionally determines maximum, minimum and/or other parameters of single vectors and/or vector streams, as described below.

In some embodiments of the invention, vector data is received by SPE 102 on an input line 205, through an optional high speed input port (HSIP) 211. Processed vector data is optionally provided on an output line 209, through an optional high speed output port (HSOP) 221. In some embodiments of the invention, a vector buffer 202 is used to regulate the input and/or output of vector data, so as to allow transferring the vector data at a rate different from the operation rate of SPE 102. Vector buffer 102 optionally has a capacity sufficient to store thousands of vectors, for example 4000 vectors of 256 elements.

Alternatively to having a single buffer 202 for input and output, separate buffers are provided for input and output. Further alternatively or additionally, the input and/or the output are unbuffered.

VMM core 204, VPU 206, parameter extractor 242 and vector buffer 202 optionally exchange vectors between them through an optional vector register file 213. Register file 213 optionally includes dedicated registers for input and output of each element communicating through the register file. In one exemplary implementation, vectors inputted from buffer 202 are optionally placed automatically in a "buffer in" register 251, while vectors to be outputted to buffer 202 are placed in a "buffer out" register 252, for retrieval. In some embodiments of the invention, register file 213 optionally includes one or more general purpose registers 258 which are used to store intermediate vectors during their processing. One or more shift registers 260 are optionally used to shift the elements of a vector internally and/or between two vectors, as described below.

Alternatively or additionally to using vector register file 213, the units of SPE 102 may communicate using any other method known in the art, such as a multiple access bus and/or dedicated point to point buses.

The units of SPE 102, except for a DSP 214 (e.g., VMM sub-system 199, VPU 206, buffer 202, register file 213, HSIP 211, HSOP 221, parameter extractor 242), jointly referred to as an APL 118, are optionally controlled by a controller 210. Controller 210 optionally provides control signals to the units on control lines 236, which for simplicity are only shown near controller 210. Optionally, controller 210 receives commands which state for each unit of SPE 102, the tasks that the unit is to perform in the current cycle. A controller memory 216 optionally stores command sequences to be carried out by controller 210.

In some embodiments of the invention, the commands of controller 210 include a field for each of the controllable units of SPE 102. For example, the commands may include six fields, for buffer 202, VMM sub-system 199, register file 213, parameter extractor 242, VPU 206 and APL controller 210. All the instructions in the fields of a single command are optionally performed in a single clock cycle. The field for APL controller 210 optionally includes program flow control commands, such as branch and looping commands. Optionally, when a unit is not used in a certain cycle, its field includes a no operation command. In some embodiments of the invention, fields of at least some of the units may include parameter setting commands, such as commands for replacing the matrix elements of VMM core 204 and/or changing the operation mode of the VMM core. The field of register file 213 optionally may include register transfer commands (i.e., commands for transferring vectors between registers), register zeroing commands and/or shift commands for the shift registers.

In an exemplary embodiment of the invention, the command field of VPU 206 indicates a precision to be used by the VPU, a method of overflow treatment and/or a parameter of truncation, such as whether to use a floor or round function and/or the number of bits to be truncated.

In some embodiments of the invention, the commands carried out by controller 210 and/or stored in program memory 216 are generated by DSP 214 (or a host computer), optionally by compiling high language directives. Optionally, DSP 214 may activate specific sub-routines and/or procedures stored in memory 216. In addition, DSP 214 may optionally halt the operation of controller 210 and/or force a flow branch, for example for debugging. In some embodiments of the invention, DSP 214 may provide controller 210 with operational parameters (e.g., correction coefficients) for the units of SPE 102, such as pre-processor 302, post-processor 314 and/or MPP 225.

In some embodiments of the invention, SPE 102 uses digital signal processor (DSP) 214 for performing scalar operations. For example, DSP 214 may be used for complex decision algorithms and/or for floating point operations. Alternatively or additionally, DSP 214 may perform vector operations which cannot be or are chosen not to be performed by VPU 206 and/or VMM core 204. Generally, DSP 214 performs such operations separately on each element of the processed vector, optionally sequentially. Optionally, DSP 214 is associated with a DSP memory 229 for storing intermediate data and/or scalar results. Alternatively or additionally, memory 229 is used to store subroutines and/or other instructions to be operated by DSP 214. DSP memory 229 may include substantially any suitable memory type, for example RAM, ROM and/or a combination thereof. Alternatively or additionally to DSP 214, SPE 102 may include a general purpose processor and/or a dedicated ASIC for some scalar tasks.

In some embodiments of the invention, DSP 214 controls the operation of SPE 102, for example based on instructions from an external host and/or according to pre-stored programs in DSP memory 229. Optionally, DSP 214 instructs controller 210 on the tasks it is to perform, for example by stating library subroutines of commands that are to be performed. DSP 214 optionally communicates with controller 210 over a bus 240, which additionally allows DSP 214 and/or controller 210 to communicate with other units of SPE 102. Alternatively, DSP 214 communicates with the other units only through controller 210 and/or register file 213.

In some embodiments of the invention, a host interface port 212 connects DSP 214 to an external computer host, optionally through a serial or parallel (e.g., PC, VME) device line. In an exemplary embodiment of the invention, host interface port 212 provides matrix data and/or operation instructions. In an exemplary embodiment of the invention, host interface port 212 comprises a 32 bit 33 MHz slave-only PCI interface. Alternatively or additionally, other interface ports may be used, for example, a serial connection such as one using RTS/RTR (request to send/restart request) lines, a pull configuration, in which SPE 102 requests data, and/or a push configuration in which data is pushed to SPE 102. Various interrupt schemes (from/to SPE 102) are optionally implemented. In some embodiments of the invention, DSP 214 is connected to a debugging interface (not shown), such as a JTAG interface.

Alternatively to including a separate DSP 214 and controller 210, in some embodiments of the invention, a single processor is used both for control and scalar processing. These embodiments may be used, for example, when the extent of scalar processing is expected to be relatively small. Further alternatively or additionally, DSP 214 is used instead of VPU 206, for example when the extent of vector operations (which do not include matrix multiplication) is relatively small. Further alternatively or additionally, two or more of memories 216, 220 and 229 are combined. Alternatively or additionally, each memory unit comprises a suitable unit (RAM, ROM, etc.) according to its specific task.

In some embodiments of the invention, SPE 102 is used primarily for matrix multiplication tasks. Parameter extractor 242 may be used, for example, to find a maximum of the resultant product vectors and/or to find a maximum of the input vectors. In other embodiments of the invention, more complex processing schemes may be performed by SPE 102. For example, VPU 106 may be used in some or all of the input vectors and/or product vectors. Some vectors handled by SPE 102 may not be passed at all to core 204 or may be passed through VMM core 204 a plurality of times. In an exemplary alternative embodiment, VMM core 204 operates as a mathematical co-processor of VPU 206 and/or the other elements of SPE 102. In some cases, an algorithm or a step in an algorithm performed by SPE 102 will only require processing by VPU 206 and/or DSP 214.

Alternatively or additionally to pre-processor 302 and/or post-processor 314, VPU 206 may be used to perform pre-processing and/or post-processing tasks.

In some embodiments of the invention, SPE 102 is produced in a small size which fits into industry standard electronic cards and/or racks. In an exemplary implementation, SPE 102 is implemented by a 10×8 cm chip with a thickness of 1.7 cm. VMM sub-system 199 is optionally positioned in the center. The I/O ports 211 and 221 are optionally located on two opposite sides of the length, a DSP along a third side and the other components along the fourth side.

In some embodiments of the invention, vector elements have a predetermined number of bits, for example 8 bits, which are used to state an integer value. Optionally, each vector may be accompanied by an exponent value, for example of 2 bits, which states for all the elements of the vector a multiplication factor. Optionally, a default multiplication factor of 1 is used.

Complex Vectors

In some embodiments of the invention, complex vectors are represented in SPE 102 by a pair of vectors, a real vector which stores the real parts of the complex vector elements and an imaginary vector which stores the complex parts of the complex elements. The vector matrix multiplication is optionally performed by multiplying each of the vectors by a real matrix including the real parts of the matrix values and an imaginary matrix including the imaginary parts of the matrix values. The resultant complex vector is then calculated from the partial results as is known in the art.

Alternatively or additionally, complex vectors are represented in SPE 102 by a single vector in which the real and imaginary parts are stored in alternate elements (e.g., the real parts of complex elements 1, 2, 3, . . . are stored in positions 1, 3, 5, . . . and the imaginary parts are stored in positions 2, 4, 6 . . . ). In accordance with this alternative, when the matrix of VMM core 214 is used for complex multiplications its elements have the form:

$$M(i,j) = \begin{cases} i, j \text{ odd} & Re\{C[(i+1)/2, (j+1)/2]\} \\ i \text{ odd}, j \text{ even} & Im\{C[(i+1)/2, j/2]\} \\ i \text{ even}, j \text{ odd} & -Im\{C[i/2, (j+1)/2]\} \\ i, j \text{ even} & Re\{C[i/2, j/2]\} \end{cases}$$

where C[i,j] is a represented complex matrix used in the multiplication.

Alternatively or additionally, other complex vector representation methods are used for the vectors and/or the matrix. In some embodiments of the invention, VPU 206, pre-processor 302 and/or post-processor 314 are adapted to convert vectors between formats and/or to correct vectors resulting from multiplication by a complex matrix into a proper format.

Shift Register

Referring in more detail to shift registers 260, in some embodiments of the invention, shift registers 260 are adapted to perform cyclic and/or non-cyclic shifting of the elements of the vector they store. Optionally, the shift may be performed either up (moving the value of the last vector element to a lower index position) or down (moving the value of the first vector element to a higher index position). In non-cyclic shifting, vector positions that become vacant due to the shift are optionally filled with a predetermined value, e.g., zero, as is known in the art. In some embodiments of the invention, the shift may be performed for any number of positions, the number of which optionally stated in the shift command. Alternatively, the shift is performed for a predetermined number of positions, e.g., one position.

In some embodiments of the invention, a shift may be performed in which the vectors in two or more shift registers 260 are shifted together. Optionally, the two or more vectors are taken to be considered an extra long vector, according to a predetermined register order. Alternatively or additionally, a shift is performed together on two vectors which are viewed as a complex vector pair. In some embodiments of the invention, shift registers 260 are adapted to perform translation between different complex vector formats, for example:

{Re(1), Re(2), . . . Re(N)}, {Im(1), Im(2), . . . Im(N)}=>{Re(1), Im(1), Re(2), Im(2) . . . , Re(N), Im(N)} and/or to perform a complex conjugate operation:

{Re(1), Im(1), Re(2), Im(2) . . . }, =>{−Im(1), Re(1), −Im(2), Re(2), . . . }

Input/Output Interface

In some embodiments of the invention, the input and/or output ports 211 and 221 comprise parallel units, allowing high rate data transfer without very high timing constraints. Alternatively or additionally, input and/or output ports 211 and 221 comprise serial ports. Further alternatively or additionally, the received data comprises serial data that is converted into parallel data by buffer 202 and/or by an external component (not shown). Further alternatively or additionally, any other input and/or output methods may be used including methods which involve receiving one or more control, format and/or timing lines along with the data. Optionally, input and/or output ports 211 and 221 may receive data in accordance with a plurality of different methods.

In an exemplary embodiment of the invention, ports 211 and/or 221 receive 256 elements, each element having one byte (e.g., 8 bits). Each element is optionally provided on a separate serial line, driven at 1 GHz, providing vectors at a rate of 125 MHz. In an exemplary embodiment of the invention, the serial lines are driven using differential line driving, to overcome signal noise and interference problems. In an exemplary embodiment of the invention, the input (and/or the output) use LVDS (Low Voltage Differential Signaling) buffers and/or interfaces with two wires for each provided value. Other signal bussing methods may be used as well. It is noted that the data may be provided MSB first and/or LSB first.

It should be appreciated that in some applications SPE 102 performs several operations on input vectors before outputting the result, such that the data transfer rates of input and output ports 211 and 221 may be slower than the operation rate of VMM core 204.

It is noted that the use of 256 element vectors is brought by way of example, and any other vector sizes may be used, according to their utility in industry.

Vector Processing Unit

In some embodiments of the invention, VPU (vector processing unit) 206 is adapted to perform element-by-element operations on one, two or more vectors. Optionally, the element-by-element vector operations provided by VPU 206 include XOR, OR, AND, multiply, average, subtract and/or add. Alternatively or additionally, VPU 206 is adapted to perform a rotate operation on a pair of vectors (equivalent to multiplying by j=sqrt(−1)), e.g., $v_1<=v_2, v_2<=-v_1$. In some embodiments of the invention, VPU 206 is adapted to perform vector multiplication, resulting in a scalar.

In some embodiments of the invention, VPU 206 is adapted to perform single vector operations, such as the logical NOT operation, absolute value, negation, multiplication by $2^n$, truncation and/or rounding. Optionally, VPU 206 is adapted to perform inter-vector conjugate operations, such as, V[2n]=>V[2n−1], −V[2n−1]=>V[2n] and/or V[2n]+V[2n−1]=>V[2n−1], 0=>V[2n]. The specific conjugate operations used are optionally determined according to the specific vector representations used for complex vectors. In some embodiments of the invention, VPU 206 is adapted to perform vector format changing operations, which are used to change the format of a vector as required for further processing.

Alternatively or additionally, VPU 206 is adapted to perform vector-scalar operations, such as adding, subtracting and/or multiplying all the elements of a vector by a single scalar. In some embodiments of the invention, such vector-scalar operations are performed by setting all the elements of a temporary vector to the scalar values and performing an element-by-element operation.

Further alternatively or additionally, VPU 206 is adapted to perform intra-vector processing operations, such as rearranging (shuffling) of vector elements and/or adding elements of a single vector to each other (for example, adding each two adjacent elements and replacing one by the sum and the other by zero). Additional intra-vector operations may include selection of a portion of a vector and/or rearrangement of a vector. Optionally, these additional operations are performed using a second vector which states the selected elements and/or the rearrangement order of the elements. Alternatively, these additional operations are performed according to pre-configured parameters.

In some embodiments of the invention, VPU 206 is adapted to perform operations on three or more vectors, for example very popular sequences of operations, which can be performed more efficiently as a complex operation than as a sequence of operations. For example, a calibration operation (e.g., each element is multiplied by an element-specific calibration value and another element-specific value is subtracted) may be implemented. In some embodiments of the invention, VPU 206 is adapted to perform a carry operation between operations on two or more vector elements, so that a pair (or greater number) of vector elements can act as a single, higher precision, vector element.

Alternatively or additionally, VPU 206 is adapted to perform in a single operation cycle, a sequence of mathematical and or logical operations, for example negating the elements of a vector, adding a scalar to each element of the vector and taking the absolute value of each vector element.

It should be noted that VPU 206, depending on the function performed, may receive as input one or more vectors and scalar values and output a vector, a partial vector or a scalar. In some cases (e.g., peak detection) an output pair is provided (e.g., location and value of peak). The data used for performing the processing of VPU 206 is optionally provided from vector register file 213. Alternatively or additionally, a separate or additional memory is used, for example for scalar values.

In some embodiments of the invention, VPU 206 is implemented by a programmable gate array (FPGA), an application specific integrated circuit (ASIC) and/or any other dedicated hardware. In some embodiments of the invention, VPU 206 includes a plurality of different elements for different tasks. Alternatively or additionally, VPU 206 includes a plurality of identical units which may operate in parallel on different vectors. Further alternatively or additionally, some of the operations performed by VPU 206 utilize shared hardware. For example, the add and subtract operations may use the same hardware with a negation operation performed for subtraction. Alternatively or additionally, some or all of VPU 206 is implemented in software on a digital signal processor and/or on a general purpose processor.

In an exemplary embodiment of the invention, VPU 206 and/or hardware components thereof are replaceable, for example when reconfiguring SPE 102 after manufacture. The replacement may be performed, for example, by inserting or replacing an application specific microcircuit.

In some embodiments of the invention, as described above, VPU 206 comprises digital circuits. Alternatively, VPU 206 includes at least one analog processing circuit. Optionally, in some embodiments, SPE 102 receives analog signals provided directly to VPU 206 (which may include an A/D converter).

Optionally, VPU 206 may operate at different precision levels, e.g., 8 bits, 10 bits or 16 bits. Alternatively, VPU 206 has a same precision as the input data to SPE 102, e.g., 8 bits precision. Further alternatively, VPU 206 has a higher precision than the input data to SPE 102, for example, 10 or 16 bits. Optionally, controller 210 sets the VPU precision to be used, in the command field of VPU 206 provided for each operation.

It should be noted that VPU 206 may operate on data before, in parallel with and/or after data is processed by VMM core 204.

Parameter Extractor

In some embodiments of the invention, parameter extractor 242 is adapted to perform a peak detection operation, which detects one or more highest or lowest values of a vector and/or detects a local area of the vector including the peak value. Alternatively or additionally, a threshold operation detects values above or below a given threshold. Further alternatively or additionally, parameter extractor 242 is adapted to perform a maxima or minima operation adapted to find local maxima and/or minima points of the vector.

In some embodiments of the invention, in addition to single vector calculations, parameter extractor 242 is adapted to perform vector sequence operations, for example, finding a peak vector or vector element over time (e.g., a history of vectors). Optionally, parameter extractor 242 includes an internal vector memory in which a maximal value for each element is stored, together with an index number of the vector in the sequence achieving the maximum. For each vector of the sequence, parameter extractor 242 compares each of the elements of the vector to the corresponding element of the internal vector memory, and updates the internal memory if required. Alternatively, parameter extractor 242 may be used to find minimum vector elements in a sequence, to find first and/or last elements in a sequence passing a threshold and/or to count the number of vectors passing a threshold for each element. Further alternatively or additionally, parameter extractor 242 may determine a vector having a largest or smallest magnitude in a sequence of vectors. In some embodiments of the invention, parameter extractor 242 is incorporated into the VPU.

Timing Issues

In some embodiments of the invention, input and/or output ports 211 and 221 operate at a different clock rate than VMM core 204. Optionally, DSP 214 and/or controller 210 have separate clock cycles from each other and/or from VMM core 204 and/or input and output ports 211 and 221. The use of separate clock rates allows utilizing maximal processing resources of each unit, without slowing one of the units because of others and/or requiring expensive high rate units that are not necessary. For example, as vectors are generally handled by SPE 102 for several cycles, the input and/or output rate may be slower than the rate of operation of VMM core 204. In addition, the use of separate clock rates for the different units allows exchanging or upgrading parts of SPE 102, e.g. DSP 214, without redesigning the entire SPE.

In an exemplary embodiment of the invention, VMM core 204 and VPU 206 operate with a single clock cycle (e.g., 125 MHz).

It is noted that in order to allow operation with an external environment, in some embodiments of the invention, all that is required is to provide interfaces that connect to input and output ports 211 and 221 and to host interface 212. Otherwise, the external environment does not need to accommodate to the operation rate of SPE 102.

In some embodiments of the invention, as described below, VMM core 204 is implemented by an electro-optic core. In an alternative embodiment of the invention, an analog electrical core is used, for example, as described in "Programmable Analog Vector-Matrix Multipliers", by F. Kub, K. Moon, I. Mack, F. Long, in IEEE Journal of Solid-State Circuits, vol. 25 (1) pp. 207-214, 1990 or "Charge-Mode Parallel Architecture for Matrix-Vector Multiplication," R. Genov, G. Cauwenberghs, IEEE Trans. on Circuits and Systems II: Analog and Digital Signal Processing, October 2001, the disclosures of which documents are incorporated herein by reference. One potential advantage of light, however, is that light can be more efficiently fanned out, do to its low attenuation. The use of an optical VMM core generally achieves a higher processing speed than electrical VMM cores, as optical units do not have capacitance. The fact that optical processing elements do not have capacitance also potentially reduces cross-talk effects.

Electro-optical Core Overview

FIG. 2A is a schematic block diagram of an electro-optical VMM sub-system 199, in accordance with an exemplary embodiment of the invention. Reference is also made to FIG. 2B, which is a schematic illustration of an optical portion 300 of electro-optical VMM core 204, in accordance with an exemplary embodiment of the present invention. Electro-optical VMM core 204 optionally includes a semi-transparent matrix 308, formed of window elements 311 (FIG. 2B) having transparency values (e.g., between 0 to 1) corresponding to values of a mathematical matrix to multiply input vectors. Vectors to be multiplied by matrix 308 are received from pre-processor 302 and converted into analog voltage signals, using a digital to analog converter (D/A) 305. Optionally, D/A 305 includes a driver which amplifies the analog signals to suitable levels. The analog voltage signals are optionally converted to light signals by a light source array, such as a VCSELs unit 304.

Optionally, the light from each light source in VCSEL array 304 is spread out by fan out optics 306 so as to pass through an entire column of elements 311 of matrix 308, as required in vector-matrix multiplication. The light passing through matrix 308 is optionally converged by fan-in optics 310, such that the light from each matrix row is directed to a respective detector in a light detector array 312. The detectors of array 312 optionally convert the light into analog voltage signals which are amplified by amplifiers 313 and converted to digital signals by an analog to digital (A/D) converter 315. The digital signals are then optionally passed for post processing to post-processor 314.

Matrix

In some embodiments of the invention, the attenuation values of elements 311 of matrix 308 are programmable. Optionally, matrix 308 is an SLM (spatial light modulator) with elements 311 that can be amplitude and/or phase controlled. Optionally, a GaAs SLM, in which the attenuation value of each element is controlled by a respective electrical voltage, is used. In an exemplary embodiment of the invention, matrix 308 comprises an MQW (multi-quantum wells) light modulator, in which fast value changing (i.e., a fast settling time) at a rate of about a few nano-seconds is possible. In a particular exemplary embodiment of the invention, a matrix change is achieved in about 1-4 microseconds. If about 30,000 matrix changes are performed, between about 3-12% of the time is required for matrix changing.

Optionally, DSP 214 (FIG. 1) generates mathematical values of a matrix to be multiplied. The mathematical matrix values are optionally converted into attenuation values of elements 311, by matrix pre-processor (MPP) 225 as described below. The values from MPP 225 are optionally provided to a matrix driver 227 which sets the actual attenuation values of elements 311. In some embodiments of the invention matrix driver 227 is coupled to matrix 308 using a flip-chip bonding. Alternatively or additionally, the coupling of matrix driver 227 to the elements 311 of matrix 308 uses chip to chip bonding methods known in the art. Optionally, matrix driver 227 includes a flash digital to analog converter (DAC) for each element. The flash DAC optionally allows updating matrix values at a relatively fast rate (e.g., in less than 1 microsecond). In some embodiments of the invention, the flash DAC comprises a ramp DAC as described in a US application Ser. No. 10/234,632, filed on Sep. 3, 2002, and titled "DIGITAL TO ANALOG CONVERTER ARRAY", the disclosure of which is incorporated herein by reference. Alternatively or additionally, driver 227 includes one or more calibration settings, by which predetermined matrixes are loaded, for example, all at minimum value, all at maximum value, checkerboards and/or all at an average value or other uniform value.

In some embodiments of the invention, as described above, a matrix memory 220 stores matrix values for fast replacement of the attenuation values of elements 311. In one example, each matrix element and/or column has an associated memory in which replacement values are stored. Thus, the matrix can be updated in a single clock cycle or in an otherwise short period. Alternatively or additionally, the matrix values can be shifted, for example by one or more rows down or up according to the equation $M[j,k] <= M[j+N,k]$, where k is a positive or negative integer, optionally a small integer (e.g., 1 or 2). Alternatively or additionally, a shift may involve the movement of each matrix value one or more columns to the right or left. The shift may be cyclic or may involve insertion of new values in places emptied by the shift (non-cyclic). Such matrix shifts may be used in running filters, for example in signal identification applications.

In some embodiments of the invention, a mathematical matrix larger than can be accommodated by VMM core 204 is stored in matrix memory 229. At a first stage a first portion of the matrix is loaded into VMM core 204 for multiplication. Thereafter, the values are shifted in order to load the remaining part of the large matrix into VMM core 204.

Optionally, matrix memory 220 stores mathematical values before they are pre-processed by MPP 225. Thus, the stored values remain usable even when the pre-processing rules change. Alternatively, matrix memory 220 stores pre-processed matrix values, so as to allow faster loading of the stored values into matrix 308. Further alternatively, matrix memory 220 stores for at least some mathematical matrices both pre-processed and not preprocessed values, which can be used according to the circumstances.

In some embodiments of the invention, the matrix element values are all replaced at once. Alternatively or additionally, matrix driver 227 may replace a single row and/or column of the matrix and/or a single element of the matrix. Further alternatively or additionally, matrix driver 227 may replace any and/or predetermined rectangular portions of the matrix.

Alternatively, to the values of elements 311 of matrix 308 being changeable, elements 311 have fixed attenuation values which are determined during production and/or during factory calibration. For example, the values may be in accordance with a specific code for which the multiplication is performed.

In some embodiments of the invention, the matrix elements and multiplied vectors are represented by 8 bit vectors. Alternatively, other element sizes may be used. In a specific embodiment, a very small element size is used, for example having only the values {−1, 0, 1}. Such small size elements are easily stored and manipulated and have less chances of error. In some embodiments of the invention, VMM subsystem 199 may operate in a full element size mode (e.g., 8 bits) or in a reduced element size mode (e.g., 1 or 2 bits), according to the specific application processed. The reduced element size mode, may be used for data of a low value range or may be used for bit-planes of full size elements, as described below.

Light Source and Detectors

Detector array 312 may include substantially any detector type known in the art, such as a monolithic silicon photodiode or a CMOS array. Alternatively, other photo-detectors may be used, for example detectors comprising GaAs or Ge.

Alternatively or additionally to using a VCSELs unit 304 as a light source, other light sources may be used, for example, a pulsed laser or a LED source. In some embodiments of the invention, a continuous wave (CW) laser source is used with light modulators such as liquid crystal displays (LCDs), acousto-optic modulators and/or MQW modulators. Further alternatively or additionally, wave propagation devices, such as the Litton "MO-SLM" (Magneto Optic SLM) device are used.

In some embodiments of the invention, instead of using a single light source for each vector value, a plurality of light sources are used for one or more of the vector values. The use of a plurality of light sources optionally provides more efficient and/or uniform light production and/or a better signal to noise ratio. The fan out optics are optionally adjusted according to the number of light sources used. In an exemplary embodiment of the invention, each vector value is generated by an entire column of light sources, such that each matrix element 311 receives light from a respective light source. In this exemplary embodiment, there is much more flexibility in matching mathematical values to light sources and/or matrix elements allowing better avoidance of defective elements, for example as described below. This embodiment is most suitable for use when relatively cheap light sources are used. In some cases, when the data vector is smaller than the maximum ability of VMM core 204 to handle, data elements may be duplicated, in adjacent or non-adjacent location, for example all values or values with a low intensity.

Alternatively to using a single detector for each row, in some embodiments of the invention, a plurality of detectors are used for each row, for example in order to increase the accuracy of the detectors (by reducing the total amount of light impinging on a single detector). Optionally, any of the arrangements described above for the light sources may be used for the detectors. For example, VMM core 204 may include a detector for each matrix element 311. The detected values from the plurality of detectors of each row are optionally added in analog currents, or are converted to digital values and added in digital form.

In some embodiments of the invention, one or more operation parameters of VCSELs 304 and/or detectors 312 are software controlled and/or configurable. For example, a base beam power level and/or a power level range of VCSELs 304 may be changed. In some embodiments of the invention, the power level of each VCSEL may be controlled separately, for example, for example to compensate for local production defects in specific VCSELs 304 and/or specific rows or columns of matrix 308. Alternatively or additionally, the power level of some or all of VCSELs 304 is controlled together, for example, according to a desired compromise between power consumption and accuracy. The power level of VCSELs 304 is optionally set as a trade off between accuracy, which requires higher power levels, and reducing heat effects, which requires lower power levels.

Adjustable parameters of detectors 312 may include, for example, their collection time, an amplification gain of amplifiers 313 and/or an analog bias for dark current subtraction.

In some embodiments of the invention, VMM core 204 includes one or more in-core controllers and/or drivers which control the parameters of the VMM core. Alternatively or additionally, the parameters of VMM core 204 are controlled by controller 210 (FIG. 1).

Error Reduction

A potential disadvantage of an optical implementation of VMM core 204 is that in some implementations a higher error rate, as compared to electrical digital devices, can be expected. In an exemplary embodiment of the invention, SPE 102 is used for applications where the data is originally noisy and/or where the applied algorithms fail softly. One example is communication systems, as exemplified below in a cellular communication system, in which error correction and/or detection methods are used.

Alternatively or additionally, error correction methods and/or error reduction methods are implemented by SPE 102. The error correction methods may include, for example, adding error correction bits to the processed data Optionally, the error reduction methods include performing the same processing operation a plurality of times and averaging the result. The processing speed advantage due to the use of VMM core 204 is much larger than the additional processing power required for the error correction and/or compensation methods.

In general, a VMM architecture as described herein, may be useful where extensive calculations are required. In some embodiments of the invention, existing algorithms are redesigned for use with a VMM architecture, for example so that they fail softly on errors in the data, implementation of the algorithm and/or calculations.

In some embodiments of the invention, SPE 102 is used in applications which require performing of one or more transformations, such as correlations, convolutions, permutations, filters, and Fourier transforms (e.g., DFT, IDFT, DCT (discrete cosine transform), IDCT, DST (discrete sine transform), IDST). Such applications may include, for example, rake receivers, multi user detection (for example, as described in a PCT application filed on even date as the instant application, and having the title "MULTI-USER DETECTION", the disclosure of which is incorporated herein by reference), third generation base stations as described hereinbelow and/or smart antennas. Further applications optionally include DSL modems (e.g., ADSL, VDSL), image processing, spectrum analysis, echo cancellation, software defined radio, weather prediction, signal processing and/or wireless applications MMDS, LMDS). SPE 102 may operate as a general purpose processor or may be used for a specific dedicated application.

Pre- and Post-processing

In some embodiments of the invention, pre-processor 302 and/or post-processor 314 are adapted to perform one or more tasks which are directed to reducing the effect of inaccuracies of VMM core 204. Optionally, pre-processor 302 changes input vectors in a manner which causes the errors to have a lesser effect on the output vector and/or further computations. Post-processor 314 optionally reverses the changes applied by pre-processor 302, so that the changes do not affect the result. In some embodiments of the invention, the attenuation values of matrix 308 are changed and/or rearranged, and the changes of pre-processor 302 conform the input vectors to the changes in matrix 308. Alternatively or additionally, the changes of pre-processor 302 do not require any changes in matrix 308. Some of the pre-processing tasks are optionally performed according to calibration results. Exemplary calibration procedures in accordance with embodiments of the present invention are described hereinbelow.

In an exemplary embodiment of the invention, pre-processor 302 is adapted to perform one or more of the following pre-processing tasks:

(a) signed to unsigned conversion of input values (e.g., $v(i) \leftarrow v(i)+128$ for 8 bit element vectors). This conversion is optionally used, when SPE 102 is used for signed data, for example in the range [−128,127], in cases in which VMM core 204 operates only on positive values.

(b) applying a non-linearity correction function to the input values. Optionally, the non-linearity correction function is implemented by a look up table (LUT). In some embodiments of the invention, the function provides an output with a larger number of bits than the input, for example 9-bits for an input of 8-bits (e.g., for results of addition). The non-linearity correction function is optionally used to correct for non-linearity in the current output of driver 227, the light output of VCSELs 304, the current of the VCSEL drivers and/or non-linearity of other elements of VMM core 204. Alternatively or additionally, a LUT is used to implement other pre-processing tasks, such as sign inversion, scrambling, gain change and/or offset correction (changing the range of the vector values to fit an operation range of the VCSELs).

(c) pre-correction of the values according to errors found during calibration. In some embodiments of the invention, the pre-correction is applied using the function $v(i) \leftarrow a^* v(i)+b$, where a, b are correction values having different values for each i, or having the same values for all i. In some embodiments of the invention, constants a and b have predetermined values or are determined periodically. Alternatively or additionally, constants a and b vary with time, according to a known pattern of ripple i variations of the attenuation of the matrix elements, for example when the matrix comprises an LCD.

In some embodiments of the invention, the light output from each laser L(j) is given by $L(j)=a+b^*v(j)$ where v(j) is the value of the element j in the input vector. Light from the laser depends on the current I(j) of the laser driver, which is approximately $L(j)=Eta^*(I(j)-I_0)$ where Eta is the slop efficiency of the laser and $I_0$ is the threshold current. Both Eta and $I_0$ may depend on temperature and may vary from one laser to the next. Optionally, a linear transformation between the vector value v(j) and the digital value provided to the current driver, is used to compensate for variations in Eta and $I_0$. The transformation is optionally calculated each time a value is to be used, or during calibration.

The variable "a" optionally has a small positive value, such that light is always produced by VCSELs 304, even when the represented value is zero (e.g., after signed to unsigned conversion). This possibly prevents slowdown of VMM core 204 due to the need to restart VCSELs 304 after they are shut off. Alternatively or additionally, when a VCSEL 304 is not used for a relatively long period, for example when a whole set of vectors has padded zero elements, the VCSELs are shut off.

(d) rearranging the values of the input vector according to an arrangement of the matrix values in the matrix. In some embodiments of the invention, the values of the matrix are shuffled in order to reduce cross-talk and/or to use redundant matrix elements instead of defected elements. Optionally, pre-processor 302 reorders the vector elements according to the matrix arrangement.

(e) scrambling (reversing the values of some of the elements of the input vector). In an exemplary embodiment of the invention, even elements (or odd elements) of the input vector are reversed (i.e., their sign is changed) in order to reduce the effect of correlated noise and/or to randomize the effect of errors. Such noise may be due to different power levels used for negative and positive values, which different power levels may cause change in temperature and/or other system parameters.

Optionally, the corresponding matrix values (e.g., the values of even columns) are inverted accordingly, such that the result does not change. Alternatively or additionally, the post-processing compensates for the change in the value. In some embodiments of the invention, the inversion of 8-bit positive values (i.e., in the range [0,255]) is performed by the function $v(i) \leftarrow 255-v(i)$.

(f) repeated multiplication for extended accuracy. In some embodiments of the invention, pre-processor 302 is adapted to provide the same input vector (optionally pre-processed in different ways, for example scrambling) for several consecutive cycles. Optionally, some or all of the input vectors are multiplied by the matrix a plurality of times. Post-processor 314 optionally averages the results of the plurality of multiplications and provides the average as output. Thus, sporadic errors in the multiplication result may be reduced. In some embodiments of the invention, the number of times an input vector is multiplied by the matrix depends on the accuracy required verses the desired processing speed. In some embodiments of the invention, post-processor 314 performs the averaging digitally. Alternatively or additionally, the averaging, or summation thereof, is performed in an analog circuit, in electrical and/or optical form.

In some embodiments of the invention, extended accuracy is achieved by repeating the multiplication twice, once with the original input vector and once with a negated form of the input vector. The vector results of the two multiplications are optionally averaged to form a result vector Y(k), using the function:

$$Y(k)=(A^*v-A^*(-v))/2$$

where $A^*v$ denotes the multiplication of the input vector v with the matrix A. This enhanced mode of operation possibly minimizes some inaccuracies related to drift of the components and some of the random noise associated with the VMM operation. In some embodiments of the invention, the vector negation is performed by pre-processor 302 and post processor 314 performs the subtraction and division by 2. Alternatively, some or all of these operations are performed by VPU 206.

(g) history cancellation. Optionally, pre-processor 302 corrects for history effects in VMM core 204, e.g., in VCSELs 304 and/or detectors 312, by reducing from the input vector a fraction of the previous input vector. In an exemplary embodiment of the invention, the function $V(i) \leftarrow (1-K)^*V(i)-K^*V'(i)$ is used, where V'(i) is the previous input vector and K is a constant. Optionally, K is a small constant and is same for all i. Alternatively, K is different for different i, for example, in order to compensate for different history effects in different VCSEL light sources. Alternatively, the history correction may take into account more than one previous input vector.

A particular example of history cancellation is temperature compensation. In some embodiments of the invention, history cancellation is designed to correct for problems relating to different heating of each VCSEL due to the current flowing through it as it relates to the input value Vin(t) where t is the time. Vin(t) is a number between −127 and +128. Alternatively or additionally, temperature compensation is used to correct for differential cooling in a device and/or to compensate for hot spots or other sources of temperature gradients, un-designed for temperatures and/or varying temperatures. For correct multiplication, it is generally desirable to maintain a linear relation between Vin(t) and light output L(t):

$$L(t)=L0+L1*(Vin(t)+127),$$

where L0 and L1 are system parameter which is the same for all the channels.

Light output of a VCSEL can be modeled to depend on the driver current I(t) as:

$$L(t)=E(T)*(I(t)-Io(T)),$$

where both the slop efficiency E(T) and the threshold current Io(T) depend on the temperature T.

Typical dependencies are:

$$E(T)=E0-E1*T \text{ and } Io(T)=Io0+Io1*T+Io2*T2,$$

where Eo, E1, Io0, Io1 and Io2 depend on the construction of the VCSEL and properties of the specific laser and may vary among the lasers in the same array.

In an exemplary embodiment of the invention, the VCSEL driver controls the current I(t) by placing a number V(t) at the DAC so that the current is I(t)=C0+C1*Vin(t).

Stabilizing (or measuring and compensating for) the temperature of the laser casing is, in some cases, insufficient, since the laser is heated by the current passing through it, while it is cooled by conduction to the case.

In an exemplary embodiment of the invention, the temperature is computed for each laser just before pulse t by knowing the history of heat deposited by the preceding pulses t−1, t−2 (or more).

Using the heat equation, the temperature at time t can be approximated by:

$$T(t)=T1*(T(t-1)-T0)+T2*H(t-1),$$

where: T0 relates to the case temperature

T1 relates to the rate of cooling

T2 relates to rate of heating by the current.

H(t−1) is the amount of heat deposited by the last (t−1) pulse $$H(t-1)=V(t-1)*I(t-1)-L(t-1),$$

where V(t−1) is the voltage on the laser while Current I(t−1) is flowing through it. A suitable approximation is: H(t−1) =T3+T4*I(t−1) Where T3 and T4 are system constants.

In an exemplary embodiment of the invention, it is the purpose of the temperature history correction to ensure that the above linear relationship will be maintained.

For this purpose, associated with each VCSEL is a processor that follow the temperature of the VCSEL according to T(t)=a+b*T(t−1)+c*Vin(t−1) and applies a correction to the input value Vin(t);

$$V'in(t)=A+B*Vin(t)+C*Te(t)Vin(t)+D*T(t)+E*T(t)2+ F*T(t)2*Vin(t),$$

where a, b, c, A, B, C, D, E, F are optionally calculated from models describing the laser operation and by solving the above equations or by inferring them from measurements on each laser in the array during calibration of the VMM.

As a practical matter, some of the coefficients (e.g. E and F) may be very small and ignored.

In an exemplary embodiment of the invention, the accuracy to which the current is corrected is about half the difference between two light levels. Thus, if Vin(t) is an 8-bit value, the result of this calculation (and the current controlling DAC) is done in 9-bits.

In an exemplary embodiment of the invention, it is noted that the correction to the various values (e.g., Room Temp, History and Non-Linearity) is in the last few (~4) bits, all these calculations. Optionally, these calculations are carried out with very limited accuracy and ignoring all small values. Dedicated hardware (e.g. an ASIC or a FPGA) is optionally used to perform these calculations.

Alternatively or additionally, other temperature compensation methods may be used, for example, using a calibration step determine a mapping between current value and actual light output (e.g., as detected by a detector). This can be used, for example to generate a table or to approximate the above or other physical model and/or a correction function (e.g., a polynomial of a low order or a piece-wise approximation). Alternatively or additionally, one or more temperature sensors may be used. Alternatively or additionally, a temperature-sensitive circuit (e.g., a resistor) may be provided in conjunction with each VCSEL, to correct for at least some temperature effects.

(h) boosting of input values directed to lasers far from the center of VCSELs 304, in order to compensate for fan in spatial inefficiency. Alternatively or additionally, boosting and/or reducing the gain may be performed for other reasons.

(i) limiting the dynamic range of the input values of some or all the elements of the input vector. In some embodiments of the invention, some of the elements of matrix 308 may have a limited dynamic range, for example, due to production inaccuracies. Similarly, elements of VCSELs 304, detector 312 and/or other elements of VMM core 204 may have limited dynamic ranges or may have values which they handle with low accuracy. Optionally, in these embodiments, pre-processor 302 limits the range of the input values into a range in which the elements of, for example, matrix 308 are relatively accurate. In some embodiments of the invention, for simplicity, all the elements of the input vector are limited to the same range. Alternatively, each element of the input vector may be set to a different dynamic range according to respective elements in matrix 308.

(j) extending the dynamic range. In some embodiments of the invention, the input values, in some cases, are known to be limited to a small range, e.g., between 0-15. Optionally, in these cases, pre-processor 302 extends the range of the values over the entire dynamic range of VMM core 204, in order to achieve a higher accuracy. Optionally, if one or more of the input bits is known to be constantly zero (or constantly '1'), the extension of the range is achieved by shifting the data and/or selecting the significant bits (i.e., the bits not always zero) and putting them in the most significant positions.

In some embodiments of the invention, pre-processor 302 partitions each of the input vectors into two or more portion vectors which together represent the input vector. For example, pre-processor 302 may perform a bit-plane decomposition, in which the elements of the input vector are partitioned into single bits or groups of bits. Alternatively or additionally, the input vectors may be split into two or more vectors whose sum or element by element multiplication is equal to the input vector. The partitioning may form vectors of same or different sizes. Each portion vector is optionally multiplied by matrix 308 separately, and the result vectors are optionally combined by post-processor 314. Alternatively or additionally, the combination of the result vectors is performed while the results are represented by light beams (e.g., between fan in optics 310 and detectors 312) or in analog electrical currents (e.g., between detectors 312 and A/D converter 315, or within detectors 312 which collect the light of a plurality of multiplication cycles).

Partitioning the vectors into portions (e.g., bit planes or pairs of bits) possibly allows higher accuracy handling of each portion, and altogether more accurate processing, possibly at the expense of slower operation. In some embodiments of the invention, the partitioning extent of the input vector may be adjusted at run time and/or configured at initialization (or after manufacture) according to a desired compromise between accuracy and run time speed.

In some embodiments of the invention, each bit plane is multiplied as a number of its own, without taking account of the position of the bit-plane in the original value. For example, in partitioning the number '11101001', multiplication is performed, for example, for the numbers '1110' and '1001'. Post-processor 314 optionally shifts the result of the first multiplication before adding the results together. Alternatively or additionally, each bit plane is multiplied as a number which stores its position in the original value. For example, in partitioning the number '11101001', multiplication is performed, for example, for the numbers '11100000' and '1001'. In this alternative, the results may be simply added without correction or shifting, in either digital (e.g., by post-processor 314) or in analog (either electrical or optical). In an exemplary embodiment of the invention, partitioning a vector into portions is non-uniform. For example, more lower order bits are grouped together than higher order bits.

Further alternatively or additionally, one or more of the bit-planes of the higher order portion of the original value stores its position, but is shifted to the right by one or more positions, to enhance accuracy. Optionally, instead of shifting the result by post-processor 314, the multiplication is performed a predetermined number of times, as required instead of the shift, and the results of all the multiplications are added. Optionally, more repeated multiplications are performed for higher order bits than for lower order bits, since the accuracy of the most significant part of the number is typically most important in preventing errors. In an exemplary embodiment of the invention involving 8 bit input values, the input vectors are split into 2 most significant bits and 6 least significant bits. The multiplication of the 2 most significant bits are optionally performed twice or four times while the multiplication of the 6 least significant bits is performed once.

Alternatively or additionally to performing the different bit-plane multiplications at different times, the different multiplications may be performed in parallel on different portions of the matrix (when the matrix is larger than the input vectors) and/or on a plurality of parallel VMM cores. The different portions and/or matrices may hold the same values or may hold different values required for the specific vector element portions they are to handle.

In an exemplary embodiment of the invention, in addition to cooperation with pre-processor 302, post-processor 314 is adapted to perform one or more of the following post-processing tasks:

(k) post-correction of the values according to errors found during calibration. In some embodiments of the invention, the post-correction is applied using the function $v(i) \leftarrow a^* v(i) + b$, where a, b are correction values having different values for each i, or having the same values for all i.

In an exemplary embodiment of the invention, the gain a and the offset b are determined by noting that the operation to be performed by the VMM is: $Y=A\,X$; where A is a matrix, and X and Y are vectors. This may be represented as:

$Y(k) = \text{Sum}[A(j,k)^*X(j)]; \text{ for } j=\{1, N\}$

Elements of X are represented by the light of the lasers, which cannot directly represent negative numbers, in some embodiments of the invention. In these embodiments, the light $L(j) = a + b^*X(j)$ Similarly, the reflectance of the matrix R(j,k) has a finite contrast ratio as well as the non-negativity: R={Rmin to Rmax} where: 0<Rmin<Rmax<1.

Thus, the reflectance $R(j,k) = c + d^*A(j,k)$

The light collected on a detector D(k) is the sum of all the light directed to it by the optics. So with perfect optics:

$D(k) = \text{Sum}[R(j,k)^*L(j)]; \text{ for } j=\{1, N\}$ $= \text{Sum}[(c + d^*A(j,k))^*(a + b^*X(j))]$ $= N^*c^*a + c^*b^*\text{Sum}[X(j)] + d^*a^*\text{Sum}[A(j,k)] + d^*b^*\text{Sum}[A(j,k)^*X(j)]$ Examining these results we see that: $C1 = N^*c^*a$ $d^*a^*\text{Sum}[A(j,k)]$ for $j=\{1, N\}$ is a value different for each column "k" and depends on the values of the matrix elements. Once a matrix is loaded, this factor does not generally change (e.g., except, for example for temperature effects). Since matrix replacement is relatively rare, and, in some applications a set of a small number (e.g., 2 or 3) of matrixes is cycled, it is possible to digitally calculate $C2(k) = d^*a^*\text{Sum}[A(j,k)]$ for $j=\{1, N\}$ and use it for correction.

$\text{SumX} = c^*b^*\text{Sum}[X(j)]$ depends on the vector X which changes every VMM operation.

SumX is optionally calculated by digital summation.

Alternatively, at least one, and preferably several detectors D(K) are dedicated for this purpose. In an exemplary embodiment of the invention, the matrix elements in column K are kept at constant value "1": $A(j,K) = 1$ Then $D(K) = N^*c^*a + c^*b^*\text{Sum}[X(j)] + d^*a^*\text{Sum}[A(j,k)] + d^*b^*\text{Sum}[A(j,k)^*X(j)]$ We use the two already known corrections to calculate the last:

$D(K) - (N^*c^*a + d^*a^*\text{Sum}[A(j,k)]) = d^*b^*\text{Sum}[1^*X(j)]$
$c^*b^*\text{Sum}[X(j)] = (N^*d^*b + N^*c^*b)^*\text{Sum}[X(j)]$ $\text{SumX} = (D(K) - C1 - C2(K))/(N^*d^*b + N^*c^*b)$, To extract Y(k) we correct the measurement D(k) by:

$Y(k) = D(k) - C1 - C2(k) - c^*b^*\text{SumX}$

In an alternative method, two dedicated detectors are used: D(K) and D(L), where $A(j,L) = 0.5$ Then:

$D(K) = N^*c^*a + c^*b^*\text{Sum}[X(j)] + d^*a^*\text{Sum}[1] + d^*b^*\text{Sum}[1^*X(j)]$ $D(L) = N^*c^*a + c^*b^*\text{Sum}[X(j)] + d^*a^*\text{Sum}[0.5] + d^*b^*\text{Sum}[0.5^*X(j)]$ Then:

$D(K) - D(L) = N^*d^*a/2 + d^*b^*\text{SumX}/2$

Or $\text{SumX} = 2^*(D(K) - D(L) - N^*d^*a/2)/d^*b$

The constants a, b, c, d are parameters of the system that generally do not change during the operation. Calibration procedures are set up to calibrate and maintain their value.

These calibration methods could be used by performing measurements with known a X e.g. X={255, 255, ... } and X={127, 127, ... } to extract a, b, c, d and C2(k).

It is should be noted that the values 1, 0.5, 255 and 127 for A and or X could be replaced with other values and combinations of values. In some embodiments of the invention, for example when the matrix is unbalanced, with some lines having many zeros, different matrix lines (and/or data elements) may be weighted so that the average detected value is within a relatively small range. One case where this might happen is in CDMA calculation, where a code matrix may include many zeros and especially more zeroes for short codes as compared to long codes. In this case, line representing long codes may use smaller values, e.g., inversely related to their code length.

(l) applying a non-linearity correction function to the output values. Optionally, the non-linearity correction function is implemented by a look up table (LUT). In some embodiments of the invention, the function provides an output with a larger number of bits than the input, for example 9-bits for an input of 8-bits. The non-linearity correction function is optionally used to correct for non-linearity in VMM core 204 and/or in other elements of SPE 102.

(m) history cancellation. Optionally, post-processor 314 corrects for history effects in detectors 312, by reducing from the output vector a fraction of one or more of the previous output vector. In an exemplary embodiment of the invention, the function $V(i)<=(1-K)*V(i)-K*V'(i)$ is used, where $V'(i)$ is the previous output vector and K is a constant. Optionally, K is a small constant and is same for all i. Alternatively, K is different for different i, for example, in order to compensate for different history effects in different detectors. Alternatively, the history correction may take into account more than one previous output vector.

(n) matrix column sign inversion. In some embodiments of the invention, for each column k having a high average reflectance (e.g., representing elements having a positive average), the reflectance values of the column are reversed. In an exemplary embodiment of the invention, this inversion is performed in order to reduce the level of shot noise in detectors 312, which noise is generally proportional to the square root of the light intensity impinging on the detector. Preprocessor 314 optionally inverts the detected values of columns which were inverted.

In some embodiments of the invention, when the processed vectors and hence the mathematical matrix multiplying the vectors, are smaller than matrix 308, the additional elements 311 of matrix 308 are used to reduce error levels. Optionally, some of the values of the mathematical matrix are represented by a plurality of matrix elements 311. The light signal to be multiplied by a value of the mathematical matrix is optionally passed through all the plurality of matrix elements 311 representing the mathematical matrix value. The resulting values are optionally averaged, so as to provide better accuracy results. The matrix elements used for the duplicated values may be adjacent each other, in order to reduce cross-talk effects, or may be separated from each other, in order to avoid local inaccuracies of the matrix.

For example, in some embodiments of the invention, repeated multiplication for extended accuracy is performed for small vectors by duplicating the input vectors and the matrix elements which are to multiply the input vectors. For example, when a VMM sub-system 199 having 256×256 elements in its matrix 308 is used to multiply a vector v of 128 elements by a mathematical matrix A of 128×128 elements, the actual multiplication performed by VMM sub-system 199 is:

$$\begin{bmatrix} r_1 \\ r_2 \end{bmatrix} = \begin{bmatrix} A & 0 \\ 0 & A \end{bmatrix} \begin{bmatrix} v \\ v \end{bmatrix}$$

and the result vector r is calculated as the average of $r_1$ and $r_2$. Alternatively, one of the instances of vector v or of matrix A is negated, as discussed above. It is noted that if the matrix is smaller than 128 elements the remaining positions may be padded with zeros. Alternatively or additionally, additional instances of the vector may be multiplied by additional matrix instances. In some embodiments of the invention, for example, when there is not enough room for an entire additional instance of vector v in core 204, a portion of the vector is repeated for multiplication, for example according to the values of the matrix elements involved in the multiplication.

Alternatively or additionally, the input vector may be used to represent values with more than 8 bits, for example a pair of vector elements representing 16 bits. The post processing, VPU and/or DSP may be used to effect a carry function. Optionally, the two element parts overlap in one or two bits, for example two 8 bit elements representing a 14 bit value.

Alternatively or additionally, when fewer than all the matrix elements 311 are required, the matrix elements used are separated from each other as much as possible, in order to reduce cross talk effects. Different matrix values may be separated by different amounts.

In some embodiments of the invention, the operation speed of VMM core 204 is adjusted according to the required accuracy of the results. Optionally, when high accuracy results are required, VMM core 204 is operated at a relatively low speed.

The pre-processing and/or post-processing tasks to be performed on a specific input batch are optionally programmed into SPE 102 according to the specific input and the accuracy and/or speed required from its processing. Alternatively or additionally, the pre-processing and/or post-processing tasks are selected according to an error level of matrix 308 and/or VCSELs 304.

Pre-processor 302 and/or post-processor 314 are optionally implemented by a field programmable gate array (FPGA) and/or an application specific integrated circuit (ASIC). Alternatively or additionally, pre-processor 302 and/or post-processor 314 are implemented on a digital signal processor, a general purpose processor and/or any other processor, either the same as DSP 214 or a different stand alone processor.

Handling Large Input Vectors

In some embodiments of the invention, when input vectors having a number of elements greater than the number of rows in matrix 308 need to be multiplied, a plurality of multiplications are performed between portions of the vector and respective matrix portions. VPU 206 is optionally used to consolidate the resulting vectors.

In some embodiments of the invention, when long vectors are to be multiplied by a large matrix which cannot be represented at once by matrix 308, the order of multiplication is arranged to minimize the rate of matrix reload (change of values in matrix 308). As an example, when several complex value vectors are multiplied by a matrix, all the vectors are optionally first multiplied by a sub-matrix representing the real part of the matrix, then all the vectors are multiplied by a sub-matrix representing the imaginary part of the matrix and the results are summed appropriately, as described above.

Cross Talk Cancellation

In some embodiments of the invention, the attenuation values a(i,j) of the elements of matrix 308 are adjusted to compensate for inaccuracies in the directing of light by fan-out optics 306 and/or fan-in optics 310. Assuming accurate light handling by fan-out optics 306 and fan-in optics 310, the light P(i,j) impinging on each matrix element is equal to 1/N *V(i), where N is the number of elements in a column of matrix 308, and V(i) is the light intensity of VCSEL i. The light collected by each detector 312 is therefore given by:

$$D(j) = \sum_i a(i, j) P(i, j) = \frac{1}{N} \sum_i a(i, j) V(i)$$

In some cases, the light V(i) from VCSELs 304 is distributed not only on the matrix elements of the i'th column but also, in a lesser degree, on neighboring columns. Optionally, the light P(i,j) actually impinging on each matrix element is assumed to have the form P'(i,j)=1/N*[(1-2c)V(i)+c*V(i-1)+ c*V(i+1)], where c is a cross talk factor which is generally small relative to 1. Assuming accurate fan-in optics 310, the light collected by each detector 312 is given by:

$$D'(j) = \sum_i a(i, j) P'(i, j) =$$
$$\frac{1}{N}(1-2c)\sum_i a(i,j) V(i) + \frac{1}{N} c \sum_i a(i,j)[V(i-1) + V(i+1)]$$

In some embodiments of the invention, the attenuation values of elements 311 set to $$a'(i, j) = a(i, j)\frac{1}{1-2c} - c * [a(i+1, j) + a(i-1, j)],$$

such that the resultant detected values are:

$$D''(j) = \underbrace{\frac{1}{N}(1-2c)\sum_i a(i,j) V(i)}_{D(j)} - \qquad (1)$$
$$\frac{1}{N}c^2 \sum_i [a(i+1,j) + a(i-1,j)][V(i-1) + V(i+1)]$$

using the equality $$\sum_i [a(i+1, j) + a(i-1, j)]V(i) = \sum_i [V(i-1) + V(i-1)]a(i, j).$$

As can be seen the right hand element of the right side of equation (1), which represents a non-compensated portion of the optics inaccuracies, decreases with the square of c and is therefore negligible.

In some embodiments of the invention, fan-in optics 310 transfers some of the light of a row j also to the detectors of rows above and/or below. Optionally, the attenuation values of matrix 308 are adjusted in order to compensate for such inaccurate light transfer. In an exemplary embodiment of the invention, the actual compensated attenuation values a'(i,j) of elements 311 are given as a function of the desired attenuation vales a(i,j), by:

$$a'(i,j) = b*a(i,j) - c1*a(i+1,j) - c2*a(i-1,j) - c3*a(i,j+1) - c4*a(i,j-1) + d \qquad (2)$$

in which b, c1, c2, c3, c4 and d are constants, which may be different for different i, j. In some embodiments of the invention, for simplicity, one or more of c1, c2, c3 and c4 are assumed to be zero and/or equal to another one of the values. In some embodiments of the invention, for simplicity, b, c1, c2, c3, c4 and/or d have same values for all i and j. Alternatively, in order to achieve additional accuracy, the constants b, c1, c2, c3, c4 and/or d have values which depend on i and/or j.

In some embodiments of the invention, additional terms including coefficients of (i+k, j+n) are used in calculating a'(i,j), where k, n are any integer values. Alternatively or additionally, one or more terms of a'(i,j) is taken as a coefficient of other compensated corrected attenuation values. For example, the compensated attenuation values a'(i,j) may be calculated row after row, using previously calculated values from previous rows and/or previous columns, i.e., a'(i-k,j-n) in which at least one of k, n is positive and the other is non-negative.

In some embodiments of the invention, whenever possible, corrected attenuation values are used instead of non-compensated values. For example, the following equation may be used instead of equation (2):

$$a'(i,j) = b*a(i,j) - c1*a(i+1,j) - c2*a(i-1,j) - c3*a(i,j+1) - c4*a(i,j-1) + d$$

In an exemplary embodiment of the invention, the following equation is used:

$$a'(i,j) = b(i,j) * \{a(i,j) - c(k,m) * [a(i+1,j) - a'(i-1,j)] - d(k,m) * [a(i,j+1) + a'(i,j-1)]\}$$

in which k=floor [i/16] and m=floor [j/16]. Thus, the b coefficient is calculated separately for each matrix element, while the c, d coefficients change in blocks of 16×16 elements. It is noted that other block sizes may be used.

In some embodiments of the invention, the coefficients used in calculating the compensated attenuation values are determined from direct measurement of the inaccuracies in fan-in optics 310 and/or fan-out optics 306.

Alternatively or additionally, it is assumed that the cross talk can be represented by matrices $T_{in}$ and/or $T_{out}$, such that d'=$T_{in}$ A $T_{out}$x, instead of d=Ax. A compensation matrix A'=$T^{-1}_{in}$ M' $T^{-1}_{out}$ is optionally used instead of the original matrix A.

Cross talk matrices $T_{in}$ and/or $T_{out}$ are optionally determined during calibration by measuring results of predetermined input/matrix/output combinations. In some embodiments of the invention, a set of cross talk measurement vectors of the form X(j)=δ(K-j) (where δ(K-j) is zero unless K=j (e.g., X(j)={0, 0, ... 1, 0, ... }) are multiplied by a matrix A(j,k)=δ(M) *δ(K+1), providing result vectors Y(k). The above described fan-out cross talk coefficient c(M, K+1) is optionally determined from the resultant Y(k). Similar measurements are optionally performed to determine the fan-in coefficients. More efficient determination methods, which require fewer test multiplications, may be used in which a few non-zero values of X and A are used in some or all of the test multiplications.

In some embodiments of the invention, matrices T are simplified into a sparse form, such as {{1, d, 0, 0, ... },{d, 1, d, 0, 0, . . . }, {0, d, 1, d, 0, . . . }, . . . } where all "d" may have different values which are small relative to 1, so as to allow for relatively simple inversion of the matrices T. Alternatively or additionally, iterative and/or recursive methods are used in inverting matrices T.

Alternatively or additionally to the attenuation values of matrix 308 compensating for inaccuracies in fan-out optics 306 and/or in fan-in optics 310, the attenuation values of matrix 308 are modified to compensate for irregularities in the VCSELs 304, in the detectors 312 and/or in other components of VMM core 204, including matrix 308 itself. As an example, if one light source in VCSELs 304 is stronger then other sources, the matrix elements in the column to which its light is spread may be made more opaque to compensate. In another example, if the fan-In optics 310 is more efficient for the center columns and the efficiency declines towards the edges, the matrix elements 311 are optionally made more transparent (for the same original matrix values) for the edge pixels. Optionally, the attenuation values of elements 311 of matrix 308 have a sufficient dynamic range, allowing compensation for a wide range of irregularities.

Alternatively or additionally, the compensation of the inaccuracies is performed by pre-processor 302 and/or post-processor 314. In some embodiments of the invention, the unit of VMM core 204 (e.g., pre-processor 302, matrix 308 and/or post-processor 314) used to compensate for each inaccuracy is selected according to the accuracy achieved by each of the elements. Optionally, when necessary, the compensation is performed by a plurality of different units of VMM core 204.

Optionally, when possible (e.g., the accuracy achievable by different units is substantially the same), the compensation is performed by pre-processor 302. Alternatively, when possible, the compensation is performed by matrix 308. In some embodiments of the invention, when matrix 308 changes seldom, the compensation is performed by matrix 308, in order to reduce the number of times the compensation is performed. When matrix 308 changes often, the compensation is optionally performed by pre-processor 302, in order to minimize the amount of calculations required. Optionally, the selection is performed at production based on the intended use of SPE 102. Alternatively, for each application a unit to perform the compensation is selected.

In an exemplary embodiment of the invention, the cross-talk matrices are determined and/or tracked using methods described herein or in the other PCT application filed on even date, for tracking inter-channel interactions.

Redundancy

Assuming without loss of generality that the manipulated vectors include 256 vectors, matrix 308 optionally includes an array of 256×256 elements 311. Alternatively, matrix 308 includes additional elements 311 beyond those required for performing the matrix multiplication (e.g., beyond 256×256). In some embodiments of the invention, matrix 308 includes one or more rows and/or columns beyond the number of elements in the multiplied vectors (e.g., 256).

Optionally, during operation, only the required number of rows and columns are used. In some embodiments of the invention, the redundant elements 311 are used instead of defective elements, due to manufacture or aging failures. Optionally, the rows and/or columns to be used are configured after manufacture. In these embodiments, the redundancy is optionally used to compensate for defective elements 311. If a matrix having x extra rows and y extra columns is provided, at least x+y defects in the matrix can be tolerated, by using one of the replacement rows/columns, in which there is no defect, in place of a row/column that has a defect. Defective matrix, detector and/or light source elements are optionally detected during calibration.

Alternatively or additionally, the rows and/or columns to be used at any specific time are set by a controller of VMM core 204, so that at different times different elements 311 are used. Optionally, the attenuation values of rows not in use may be updated while the other rows are being used for matrix multiplication. Thus, when the change of the attenuation values of elements 311 is relatively time consuming, it may be performed without stopping the operation of VMM core 204.

In some embodiments of the invention, fan out optics 306 and/or fan in optics 310 are programmable, for example, using a controllable refracting optical element, to shift light from one optical path to another. Optionally, the light from each VCSEL may be directed to one of a predetermined number (e.g., 2-4) of adjacent rows of matrix 308. At any specific time the light paths are optionally set to impinge on the specific matrix elements 311 which are to be used. Alternatively or additionally, extra light sources (VCSELs) 304 and/or detectors 312 are provided. Optionally, in this alternative, each VCSEL is assigned to a respective row of matrix 308. Further alternatively or additionally, an internal switching unit of VCSELs array 304 controls the electrical driving amplitudes applied to each of the VCSELs. In some embodiments of the invention, the switching speed of the values applied to specific VCSELs 304 is of the order of the time required to change the attenuation values of elements 311, as in many cases the switching between different VCSELs 304 is performed together with changes in attenuation levels of matrix 308.

In some embodiments of the invention, redundant detectors 312 are also provided to compensate for malfunctioning detectors. Alternatively or additionally, one or more extra light sources are provided to compensate for malfunctioning VCSELs 304.

In an exemplary embodiment of the invention, when redundant elements (e.g., VCSELs, matrix elements and/or detectors) are provided, at least some of the provided elements are produced with a relatively low quality, in order to limit costs. Alternatively or additionally, a larger percentage of redundant elements is provided for elements that are relatively cheap (e.g., detectors), while a low percentage of redundant elements (or not redundant elements at all) are provided for expensive elements (e.g., VCSELs). In an exemplary embodiment of the invention, only two or one extra VCSELs are provided due to their relatively high cost. Alternatively or additionally, the number of provided VCSELs is selected such that the chances of having fewer functional VCSELs than required is below a predetermined probability.

In some embodiments of the invention, all of VCSELs 304 and/or detectors 312 have the same operation parameters. Alternatively, one or more VCSELs and/or detectors 312 have different parameters, for example, for use with matrix elements which require such different VCSELs 304 and/or detectors 312. Optionally, detectors 312 with different dynamic ranges, are provided for use with matrix elements 311 having different properties. Alternatively or additionally, VCSELs 304 with higher intensities than others, are provided for use with matrix elements having transparencies above normal. These options are especially advantageous in those embodiments in which VCSELs 304 and/or detectors 312 are provided for each element of matrix 308.

In some cases, columns and/or rows close to the edges of matrix 308 receive less light than other rows due to off-axis inefficiency of the fan-in and/or fan-out optics. Optionally, mathematical matrix elements represented by elements at the edges of matrix 308 are represented by two or more elements, in order to enhance the accuracy and/or effective brightness of these elements. For example, each of one or more edge rows and/or columns may be duplicated. Pre-processor 302 optionally corrects for the duplication of columns, while post processor 314 corrects for the duplication of rows. Alternatively, any other suitable correction methods may be used.

In some embodiments of the invention, one or more additional matrix columns and/or rows, and/or one or more extra detectors and/or VCSELs are provided for on-line calibration and/or sanity checking. Optionally, at least one additional VCSEL 304 is provided for base line estimation, total energy measurement and/or other system analysis or monitoring. In an exemplary embodiment of the invention, four rows and/or columns are constantly set to a maximal attenuation value (e.g., 255), for calibration purposes. Alternatively or additionally, four columns and/or rows are set to a middle attenuation value, e.g., 128. The results of the on-line calibration are optionally used by pre-processor 302 and/or post-processor 314, as described above.

In some embodiments of the invention, matrix elements to which no light is intentionally projected or intentionally collected from, are kept in a highest attenuation state, to reduce their potential noisy contribution.

Calibration

As described above, in some embodiments of the invention, adjustment parameters and/or error values are determined in one or more calibration processes. Optionally, the calibration process is performed after manufacture. Alternatively or additionally, a calibration process is performed every time the values of matrix 308 are changed and/or periodically at a predetermined rate (e.g., every 16 multiplication cycles) and/or after a predetermined number of matrix multiplications. Alternatively or additionally, calibration is performed for each batch of input vectors and/or for each matrix multiplication performed. Further alternatively or additionally, calibration is performed when the resulting processed data appears erroneous or inconsistent. Optionally, indications on the level of errors are received from an application receiving the processing results. In some embodiments of the invention, calibration is performed when the error level exceeds a pre-determined level. Alternatively or additionally, the temperature of SPE 102 or parts thereof is monitored and a temperature dependent calibration is applied when the temperature changes significantly. Further alternatively or additionally, the calibration process is performed whenever matrix 308 is not in use.

In an exemplary embodiment of the invention, the calibration includes processing one or more known vectors in one or more different manners and comparing results between the vectors and/or to a known result. A particular calibration test that may be applied is calculating both a transform and a negative of the transform and adding the two results, to see if the total is zero. In some embodiments of the invention, a calibration process includes performing a same calculation under different conditions. During operation, the conditions are monitored and accordingly correction value are selected. Optionally, the specific correction value is selected based on an interpolation of the values determined in the calibration process. The different conditions may include different temperatures. As noted above with regard to history cancellation, temperature calibration may be used. In some cases, it is assumed that various effects maintain a steady state and/or are dependent on data settings and/or on averaged states of the matrix. To this end a (relatively) small number of situations are executed on the processor and distortions of the results recorded and used to pre-correct the data and/or the matrix and/or post process the result, irrespective of the original cause.

In some embodiments of the invention, a short testing procedure is performed periodically at a relatively high rate and a longer testing procedure is performed at a lower rate. Alternatively or additionally, along with each multiplication, one or more test procedures, e.g., use of one or more test columns, is performed.

In an exemplary embodiment of the invention, the calibration includes using an input vector having same values for all the elements of the vector. Optionally, an average value is used for all the input elements, e.g., 128.

In an exemplary embodiment of the invention, calibration comprises performing a transform on dummy data (e.g., blank) to determine a correction matrix. The correction matrix is optionally applied by VPU 206 and/or by post-processor 314. Alternatively or additionally, the calibration results in changing the settings of the optical elements of VMM core 204, for example the transparencies of elements 311 and/or the light intensities of VCSELs 304. Alternatively or additionally, the results of the calibration are used to select redundant matrix, VCSEL and/or detector elements and/or to rearrange (or shift) the mapping of the elements.

In some embodiments of the invention, pre-processor 302 is adapted to generate values required for calibration. Optionally, pre-processor 302 is adapted to generate a vector formed of all '0' bits, all '1' bits and/or of a specific numeric value, such as 128 for 8-bit element vectors. Alternatively or additionally, pre-processor 302 is adapted to generate a sum vector in which each element is equal to the sum of i (the position in the vector) and V(i) the value of the input vector in position i. The sum vector is optionally used for static calibration of post-processor 314. In some embodiments of the invention, instead of calculating the sum vector (or other calibration values) by pre-processor 302 it is calculated by VPU 206.

Folded Path VMM Core

In some embodiments of the invention, VMM core 204 uses a folded optical path, for example in order to achieve a more compact structure for VMM core 204. The optical path is optionally folded along its length and/or its width.

Figure 3A:
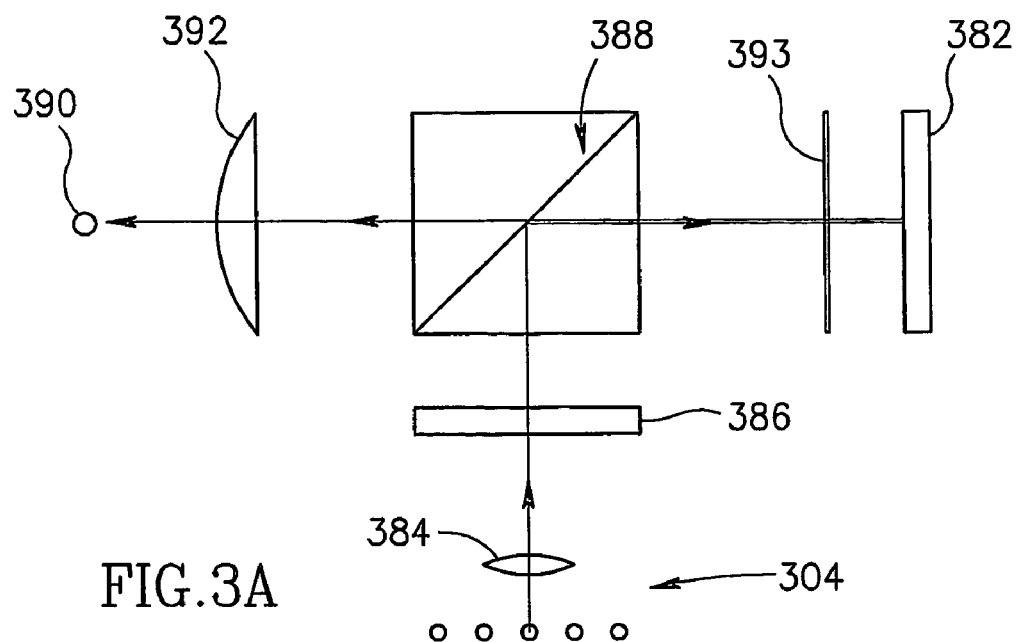
FIG. 3A is a schematic side view of an optical implementation of a VMM core, in accordance with an exemplary embodiment of the invention.
Figure 3B:
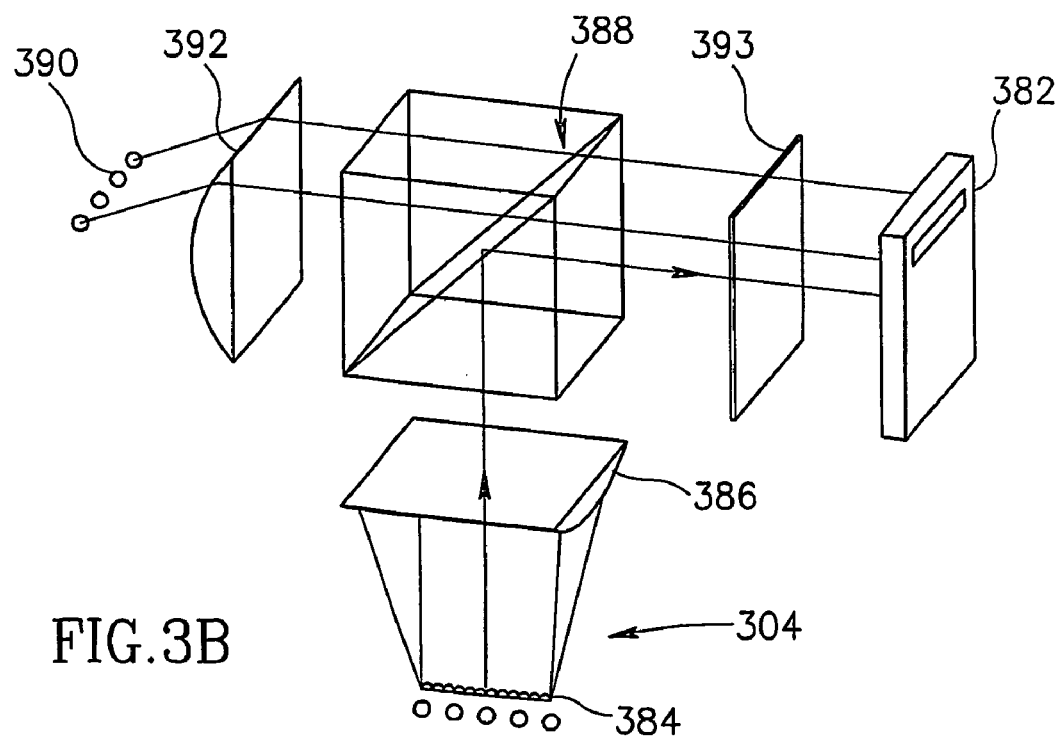
FIG. 3B is a schematic three-dimensional view of the optical implementation of FIG. 3A, in accordance with an exemplary embodiment of the invention.

FIGS. 3A and 3B are a schematic side view and a three-dimensional view, respectively, of an optical implementation 380 of VMM core 204, in accordance with an exemplary embodiment of the invention. In the embodiment of FIGS. 3A and 3B, a reflective attenuation matrix 382 is used. Reflective matrix 382 may be, for example, a GaAs/GaAlAs Multi Quantum Well (MQW) matrix. By using a reflective matrix 382, VMM core 204 is generally more compact and possibly easier to manufacture and/or package.

In optical implementation 380, VMM core 204 comprises an array of light sources (e.g., VCSELs 304), with a relatively accurate polarization control. Methods of manufacturing VCSELs 304 with a relatively accurate polarization are described, for example, in EP patent publication 0,924,820, "Polarization-controlled VCSELs using externally applied Uniaxial Stress" and EP patent publication 0,935,321, "Surface Emission Semiconductor Laser", the disclosures of which are incorporated herein by reference.

Each VCSEL 304 optionally has a respective lenslet 384 (in FIG. 3A, only one lenslet is shown, in FIG. 3B, a lenslet array is shown), which spreads the light from its VCSEL 304 along a plane perpendicular to the page in FIG. 3A. Optionally, a cylindrical and/or asymmetric lenslet 384 is used. The spread out light from VCSELs 304 is then optionally straightened by cylindrical lenses 386 into parallel light beams. The parallel light beams from a single light source hit a polarizing beam splitter (PBS) 388 which allows light polarized light in a first polarization to pass through and reflects light with opposite polarization. As mentioned above, the light from VCSELs 304 is optionally polarized in a specific direction such that substantially all the light is reflected by PBS 388. The reflected light is directed toward reflective matrix 382, such that the light from a single VCSEL 304 is directed to a row of the reflective matrix. Each element of reflective matrix 382 reflects the light impinging on it, while absorbing a percentage of the light according to an adjustable attenuation level. The adjustable attenuation level reflects a value of a mathematical matrix on which vector multiplication is performed, as described above with reference to FIGS. 2A and 2B. The light beams reflected from reflective matrix 382 are reflected back towards PBS 388.

In some embodiments of the invention, the light passing between PBS 388 and reflective matrix 382 passes through a λ/4 polarization changer 393, which shifts the polarization of the passing light. As the light passes through polarization changer 393 twice (on the way from PBS 388 and on the way back to PBS 388), the polarization of the light is switched, such that substantially all the light reflected by reflective matrix 382 passes through PBS 388, rather than being reflected by PBS 388. The light passing through PBS 388 is directed toward a detector array 390. The light directed toward detector array 390 is optionally fanned in by a cylindrical lens 392, such that all the light from a single column of matrix 382 reaches a single detector in array 390.

Alternatively to using polarization accurate light sources, light sources with a random, but constant polarization, are used. The amount of light actually reaching each of the elements (according to the actual polarization of each light source) is optionally determined during calibration. Accordingly, the results are corrected for the different percentages of light loss.

Further alternatively, light sources whose polarization changes in time, are used. A detector array optionally determines the current loss of light due to the polarization and accordingly the results are corrected. Further alternatively or additionally, a scrambler is applied to the light, such that it always has a 45 degree polarization. Thus, half the power of the light is lost, but it may be easy to compensate for the loss. Alternatively, a circular polarization is used. For example, instead of a 45 degree polarization, a clock wise (CW) or counter clock wise (CCW) polarization, is used.

Figure 4:
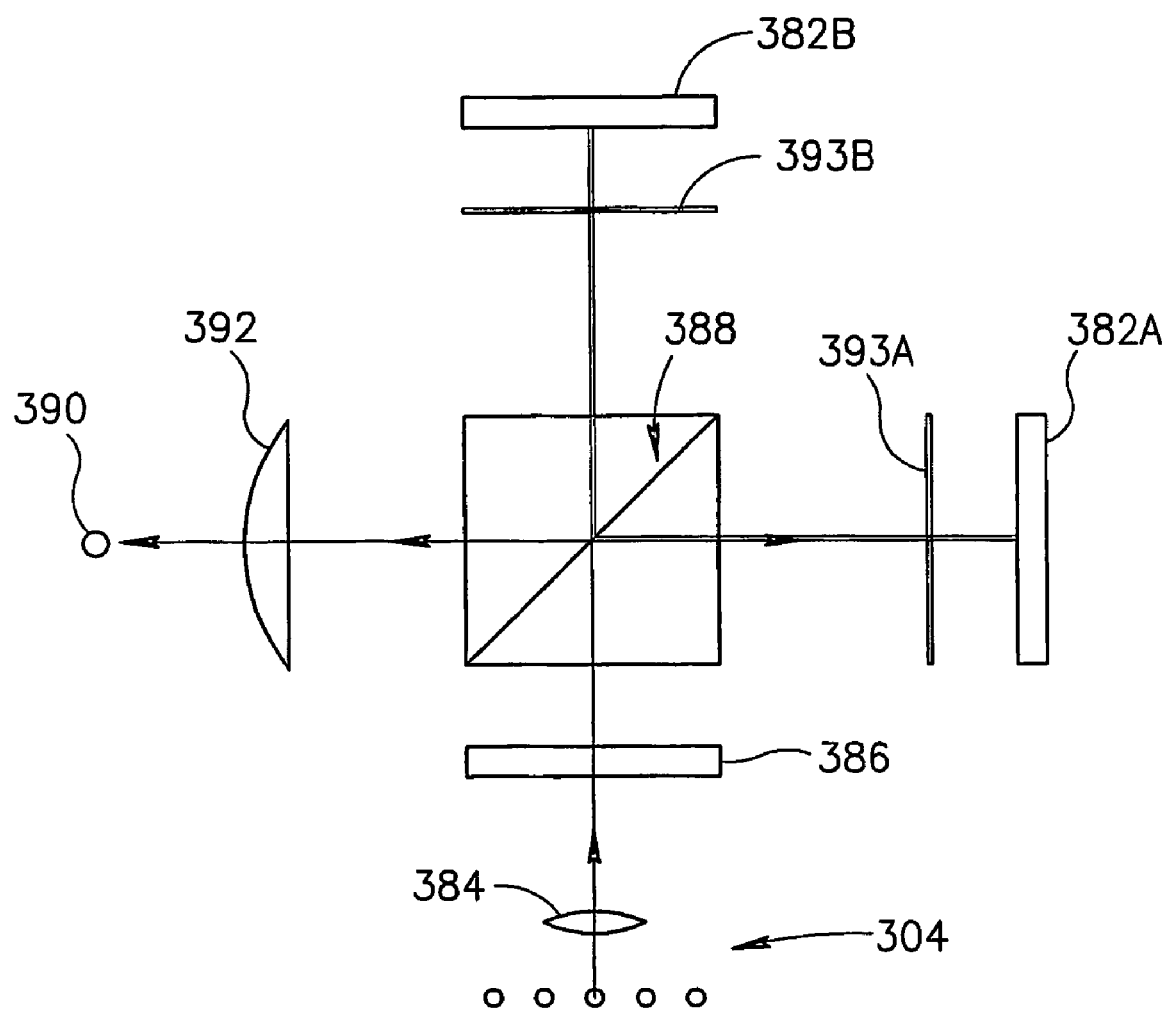
FIG. 4 is a schematic side view of an optical implementation of a VMM core, in accordance with another exemplary embodiment of the invention.

FIG. 4 is a schematic side view of an optical implementation 450 of VMM core 204, in accordance with another exemplary embodiment of the invention. Generally, implementation 450 is similar to implementation 380 of FIGS. 3A and 3B, so in the following description mainly only the differences are discussed. In implementation 450, two substantially identical reflective matrices 382 (marked 382A and 382B) are used, in an implementation which eliminates the need for light sources with a relatively accurate polarization control and/or stability. In implementation 450, an array of VCSELs 304 (or other light sources) generate light without polarization control. The light from VCSELs 304 is optionally spread out by lenslets 384 (for simplicity only one is shown) and passed through a cylindrical lens 386, toward a PBS 388. PBS 388 optionally decomposes the light to its orthogonal polarizations, so that some of the light (having a specific polarization) passes through PBS 388, impinging on a row (perpendicular to the page of FIG. 4) of matrix 382B. Matrix 382B reflects the light back towards PBS 388 after attenuating each light beam according to its required attenuation. A polarization changer 393B optionally changes the polarization of the light passing between PBS 388 and matrix 382B, such that the light reflected from matrix 382B is reflected by PBS 388 back toward a detector array 390.

A remaining portion of the light, having a different polarization, from each VCSEL 304 is reflected by PBS 388 toward a row (perpendicular to the page of FIG. 4) of reflective matrix 382A. A polarization changer 393A optionally changes the polarization of the light passing between PBS 388 and matrix 382A, such that the light reflected from matrix 382A passes through PBS 388 toward detector array 390. In implementation 450, each mathematical matrix value is represented by two matrix elements, an element in matrix 382A and a respective element in matrix 382B.

In some embodiments of the invention, for example as is now described with reference to FIGS. 5A and 5B, beams with different polarizations are used to allow a same propagation space to be shared by two or more sets of paths.

Figure 5A:
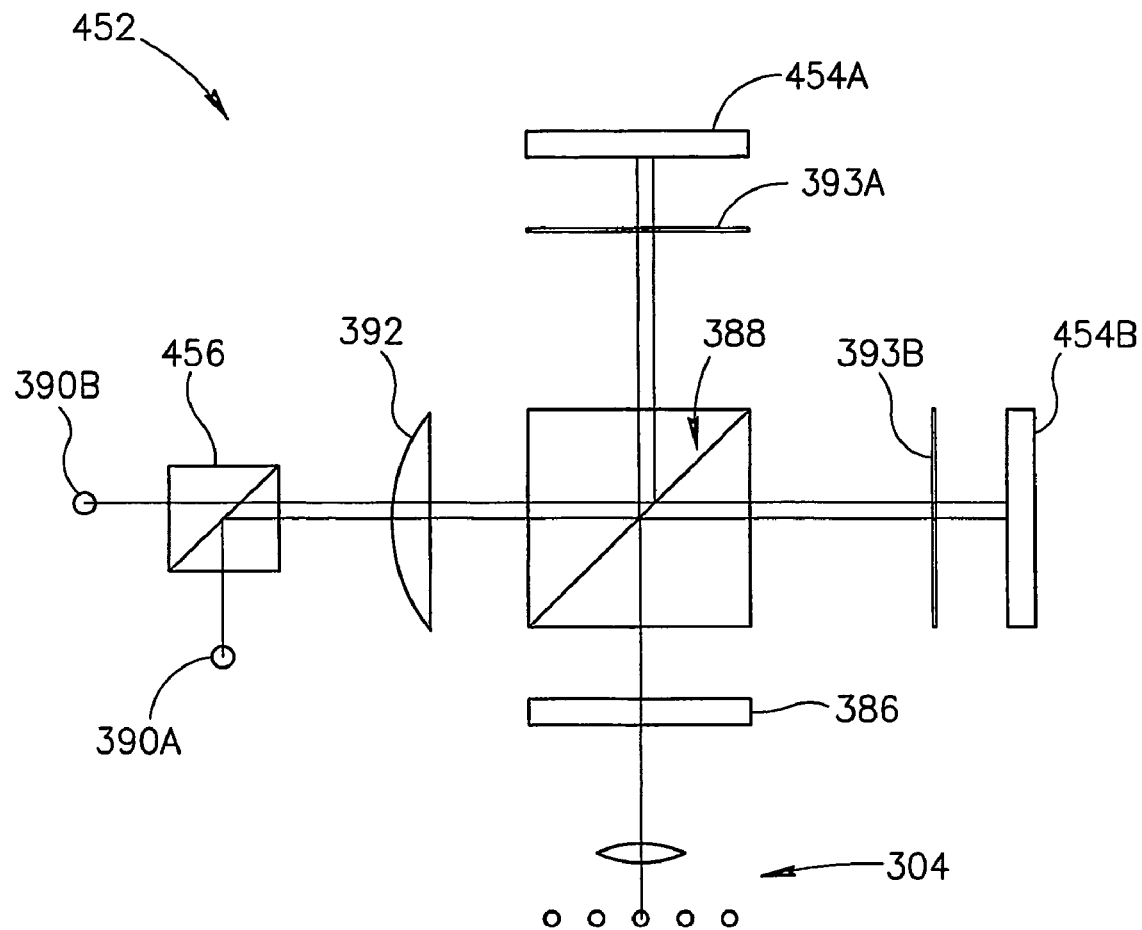
FIG. 5A is a schematic side view of an optical implementation of a VMM core, in accordance with still another exemplary embodiment of the invention.

FIG. 5A is a schematic side view of an optical implementation 452 of VMM core 204, in accordance with still another exemplary embodiment of the invention. In implementation 452, instead of using one full size reflective matrix, as in FIGS. 3A and 3B, two half size complimentary matrices 454A and 454B, are used. The use of smaller reflective matrices 454, potentially increases the yield of the production process of matrices 454 and therefore makes the production of VMM core 204 cheaper. For the following explanation it is assumed, without loss of generality, that the mathematical matrix of VMM core 204 is 256×256 elements and that each reflective matrix 454A and 454B, has 256×128 elements.

In implementation 452, polarization controlled VCSELs 304 generate light beams, each of which is spread out by a lenslet 384 and cylindrical lens 386 into 128 parallel beams. The 128 parallel light beams are directed to PBS 388, which has a polarization setting, relative to the polarization of VCSELs 304, such that the light of each beam is split in half, a first half continuing toward reflective matrix 454A and a second half being reflected toward reflective matrix 454B. Thus, the light of each VCSEL 304 reaches 256 elements, 128 on each of matrices 454A and 454B. In some embodiments of the invention, each row of the mathematical matrix is represented by 128 elements on matrix 454A and 128 elements on matrix 454B. In some embodiments of the invention, as described above, polarization changers 393A and 393B are located between PBS 388 and matrices 454A and 454B, respectively, such that the light reflected by the matrices is directed toward a pair of detector arrays 390A and 390B.

The light from PBS 388 headed toward detectors 390A and 390B may be viewed as an array of 256×128 parallel beams, each beam including light from two matrix elements, one on each of matrices 454A and 454B. It is noted, however, that the light from the different elements in each beam has a different polarity. The light beams are optionally diverged by a cylindrical lens 392, condensing each column of 256 beams into a single beam. Thus, after cylindrical lens 392 there are 128 beams, each of which is formed by a pair of different polarity beams.

In some embodiments of the invention, a detector PBS 456 is used to separate the different polarity beams, so as to direct the light from matrix 454A toward detector array 390A and the light from matrix 454B toward detector array 390B. Each detector array 390A and 390B optionally includes 128 detectors, together having 256 detectors.

Optionally, one matrix is used for real values and one for imaginary values.

Figure 5B:
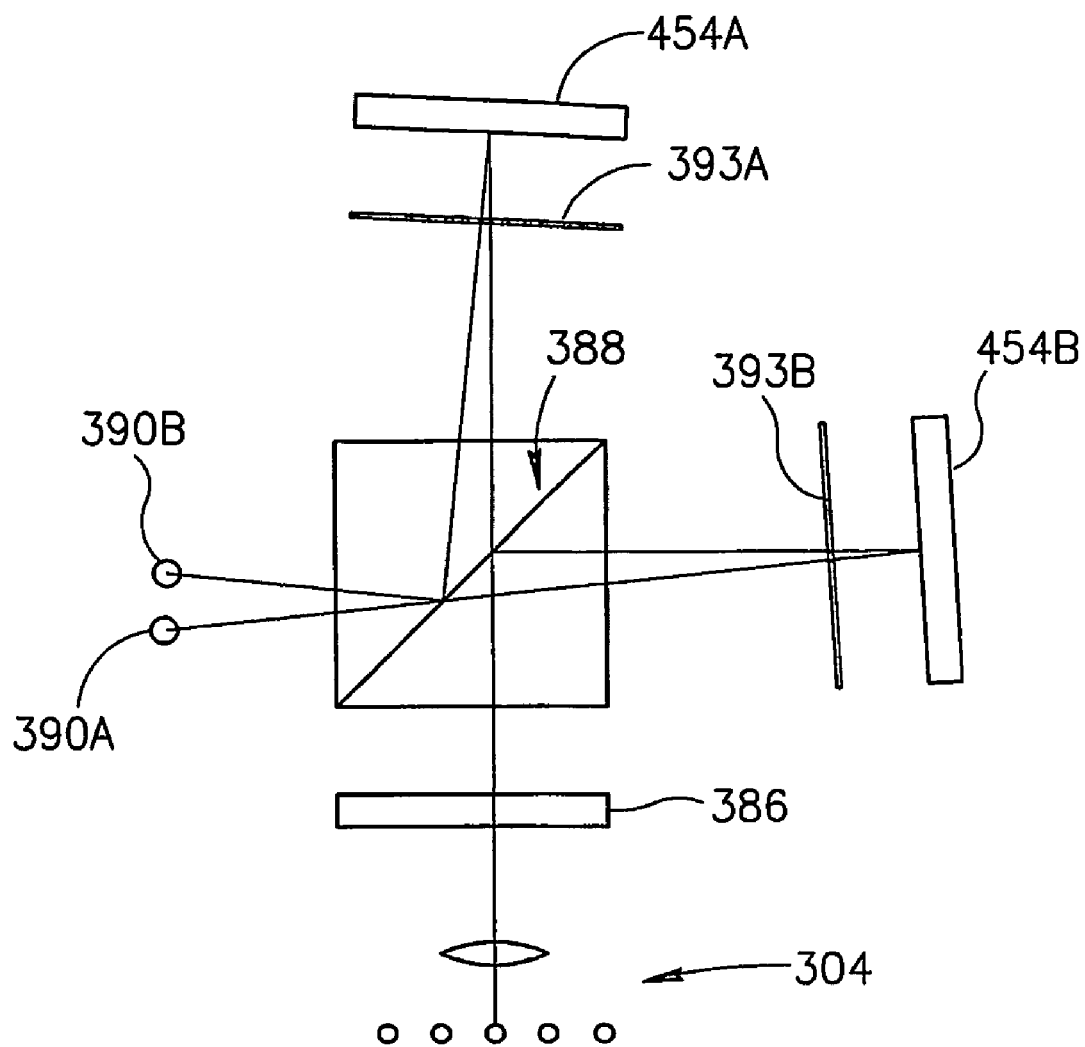
FIG. 5B is a schematic side view of an optical implementation of a VMM core, in accordance with still another exemplary embodiment of the invention.

FIG. 5B is a schematic side view of an optical implementation 458 of VMM core 204, in accordance with still another exemplary embodiment of the invention. Implementation 458, is similar to implementation 452, but places matrices 454A and 454B at an angle relative to PBS 388, so that the light beams from the matrices do not overlap. Thus, detector PBS 456 (FIG. 5A) is not required.

Reference is now made to FIGS. 6A-6D, which are schematic illustrations of elements of VMM core 204, in accordance with still another exemplary embodiment of the invention. For simplicity, FIGS. 6A-6D show a twelve element vector example. It will be obvious to those in the art that the embodiment of FIGS. 6A-6D may be modified to correspond to substantially any vector size.

Figure 6A:
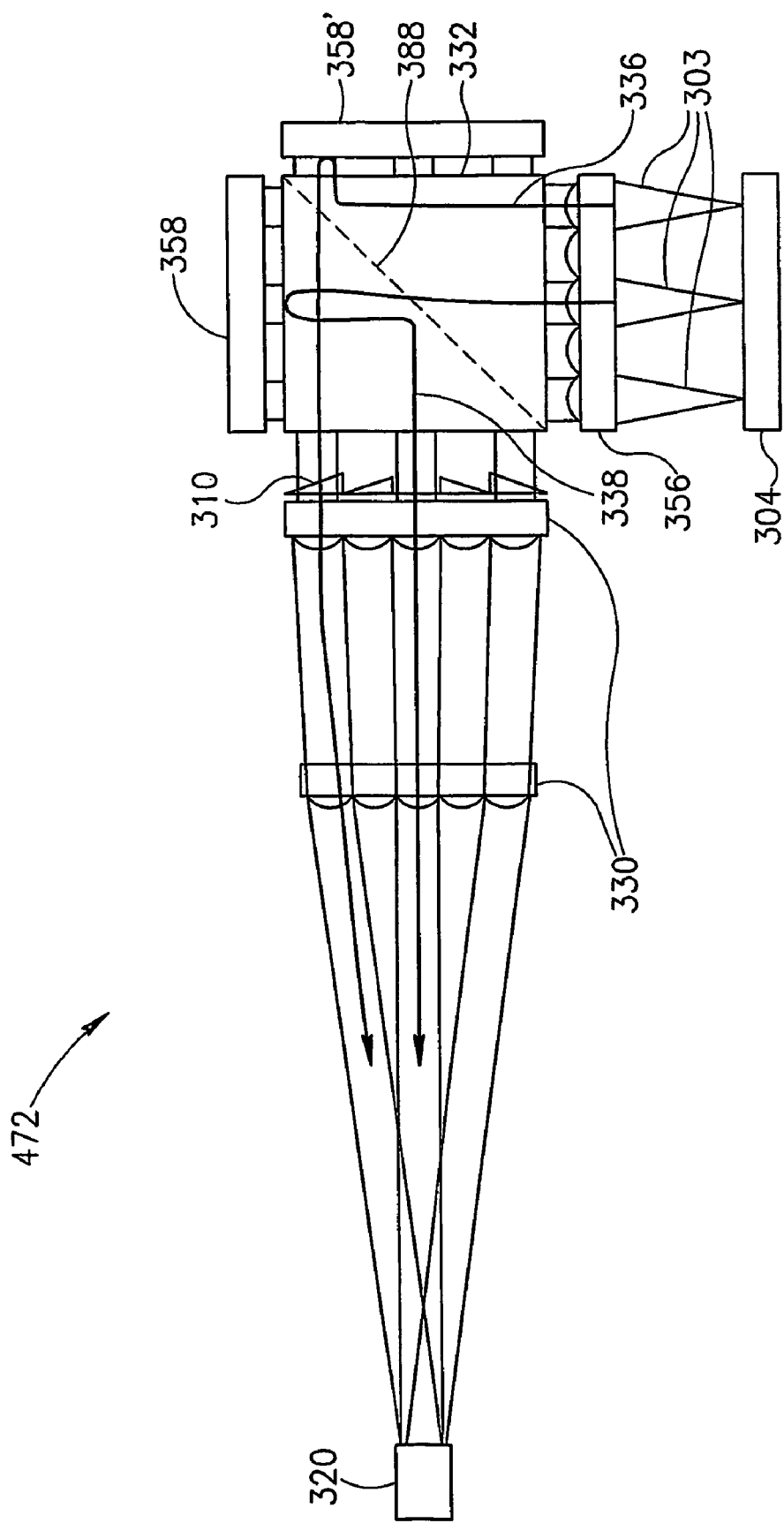
FIG. 6A is a schematic side view of an optical implementation of a VMM core, in accordance with still another exemplary embodiment of the invention.
Figure 6B:
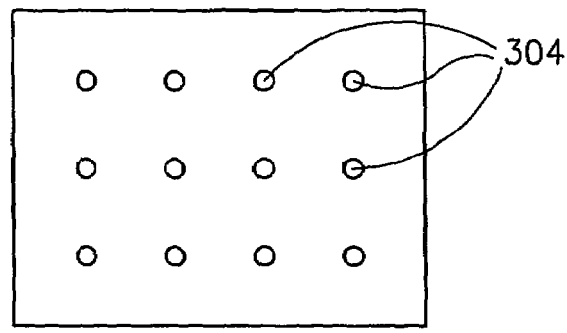
FIG. 6B is a schematic illustration of the organization of an array of VCSELs, in accordance with the VMM core of FIG. 6A.

FIG. 6A is a schematic side view of an optical implementation 472 of VMM core 204. In implementation 472, rather than organizing VCSELs 304 in a one dimensional array, VCSELs 304 are organized in a two dimensional array (e.g., with each dimension having more than one, two, four or more light sources in it). VCSELs 304 are organized, for example as shown in FIG. 6B, which is a schematic illustration of the organization of VCSELs 304.

Each VCSEL 304 generates a light beam 303, which is directed to a respective portion of each of two reflective matrices 358 and 358', through lenslets 356 and a PBS 388. Alternatively or additionally, the light beams 303 may be directed to matrices 358 and 358' through other elements, such as described above with respect to other embodiments.

In some embodiments of the invention, the expanded light beams are passed through a collimator and/or a cropper (not shown) so as to form collimated beams.

Figure 6C:
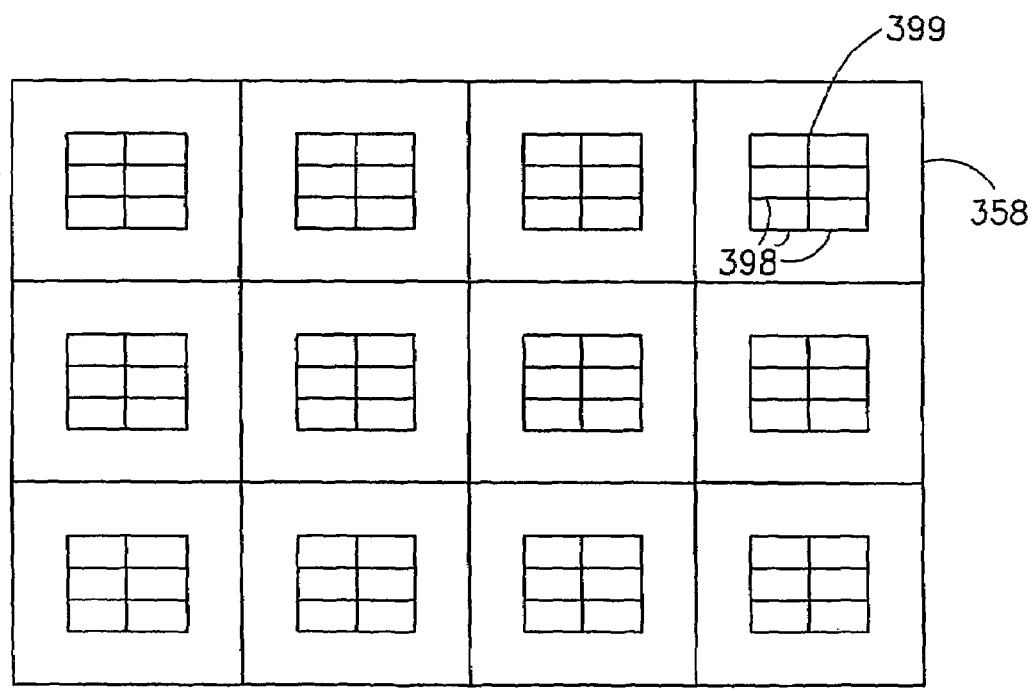
FIG. 6C is a schematic illustration of a reflective matrix suitable for use in accordance with the VMM core of FIG. 6A.
Figure 6D:
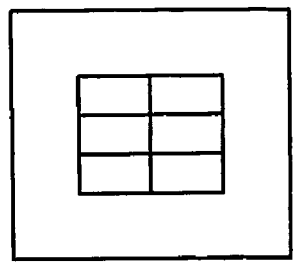
FIG. 6D is a schematic illustration of a detector array suitable for use in the VMM core of FIG. 6A.

FIG. 6C is a schematic illustration of reflective matrix 358. Matrix 358 comprises for each light beam 303, an element array 399 which includes a plurality of attenuation elements 398 which absorb a programmed percentage of the light in the light beam. Each VCSEL 304, and respective generated light beam, corresponds to a single element of a multiplied vector. Each element 398 optionally corresponds to a single element of a mathematical matrix represented by VMM core 204. Optionally, each element 398 corresponds to specific row and column indices identifying the mathematical matrix element to which the element 398 corresponds. The elements 398 of a single array 399 optionally correspond to half the elements of a single row of the mathematical matrix, the other elements of the row being represented by a corresponding array 399 on matrix 358'. Each element 398 corresponds to FIG. 6D is a schematic illustration of a detector array 320 in implementation 472. Detector array 320 optionally includes a number of detectors equal to the number of elements in the multiplied and resultant vectors. In some embodiments of the invention, detector array 320 is divided into two sub-arrays 327 and 327' corresponding to respective ones of matrices 358 and 358'. Optionally, each sub-array 327 and 327' has a number of detectors equal to, and organized as, the elements of element arrays 399. The reflected light beams from all of element arrays 399 of matrix 358 are optionally directed to sub-array 327, in a manner such that all the elements 398 corresponding to a single column of the mathematical matrix are collected by a single detector. In a same manner, the reflected light beams from all of element arrays 399 of matrix 358' are optionally directed to sub-array 327', in a manner such that all the elements 398 corresponding to a single column of the mathematical matrix are collected by a single detector.

In some embodiments of the invention, a prism element 310 and/or magnification and imaging lenslet arrays 330 are used to direct the light from the plurality of element arrays 399 to detector array 320.

Although in FIG. 6C element arrays 399 are shown as having a square shape, in some embodiments of the invention other shapes, such as a rectangular shape, a symmetrical polygon shape and/or a circular shape are used. The shape of element arrays 399 is optionally chosen so as to minimize the dispersion diameter of beams 303 which are directed onto the element arrays.

In some embodiments of the invention, elements 398 have a shape chosen according to the shape of element array 399 and the number of elements in the array 399. For example, when arrays 399 have a square shape, elements 398 optionally have a rectangular shape, which easily spans the entire area of array 399. Optionally, the rectangular shape of elements 398 is as close as possible to being square so as to minimize the border lengths between elements 398.

Figure 6E:
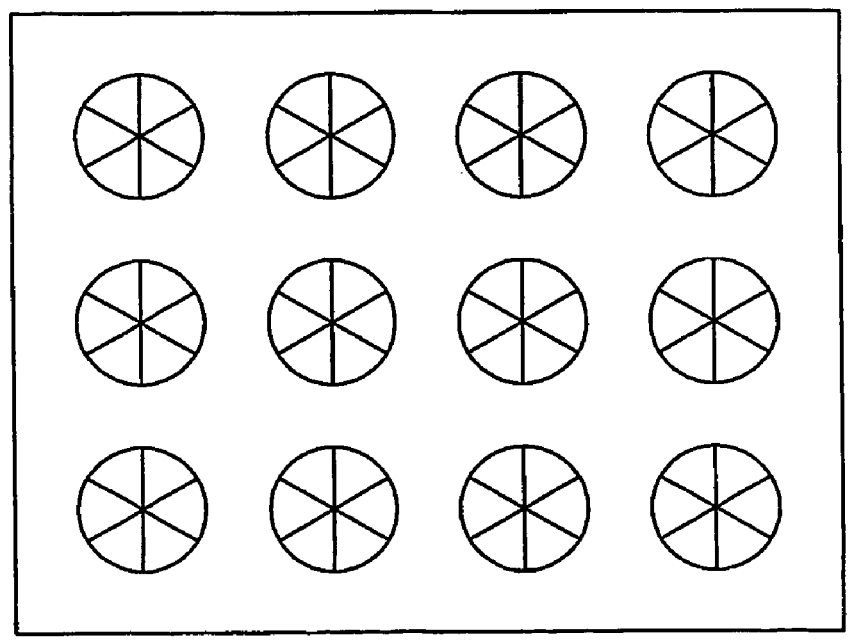
FIG. 6E is a schematic illustration of a reflective matrix suitable for use with the VMM core of FIG. 6A.

FIG. 6E is a schematic illustration of a reflective matrix, in accordance with another exemplary embodiment of the invention. In the embodiment of FIG. 6E, element arrays 399 have circular shapes, and elements 388 have circular sector shapes. Alternatively, elements 398 in the form of concentric rings (and optionally a central circle), are used. Optionally, the widths of the rings are adjusted, such that all of elements 398 have the same area.

In some embodiments of the invention, as described above, all of elements 398 have substantially the same area, so as to have equal light intensities corresponding to equal mathematical values. Alternatively, for example, in order to allow for better element location and/or easier production of the reflective matrices, elements 398 of different areas are used. Furthermore, elements 398 of different areas may be used to correct for border inefficiencies or other non-uniformity of the optical system. Similarly, in some embodiments of the invention, detectors having different areas are used. For example, detectors located at ends of the light array may have larger areas to compensate for the low light efficiency reaching these elements. In some cases, the elements and/or detectors are all manufactured to a same size and then selectively degraded in size and/or quality to promote uniformity of function.

Optionally, pre-processor 302 (FIG. 1) and/or post-processor 314 compensate for the different areas and light intensities. Alternatively or additionally, the attenuation values of elements 398 are adjusted to compensate for the different areas.

It is noted that SPE 102 does not necessarily represent a square mathematical matrix. Rather, substantially any matrix size and shape may be used, the number of elements of the input and resultant vectors being adjusted accordingly (not necessarily being equal). Furthermore, regardless of the maximal size of a mathematical matrix that can be handled at once by VMM sub-system 199, in some embodiments of the invention, smaller and larger vector-matrix pairs may be handled. For smaller vectors, the remaining vector elements are optionally set to zero and/or the corresponding light sources are shut off or used for calibration. The handling of larger vectors was described hereinabove.

One property of some of the above described embodiments is that SPE 102 is configurable. This allows for a device with multiple SPEs 102 that can be reconfigured and/or adapted for various situations. A particular example is described below, in which, depending on the processing being performed instantaneously by a base station, different SPEs 102 may be configured in different ways. In addition, however, the function of a single SPE 102 can be changed on the fly, for example, allowing different functions to be evaluated, without requiring previously processed data to be exported outside of SPE 102.

In some embodiments of the invention, a processing system includes a plurality of SPEs 102 organized in series and/or in parallel. Alternatively or additionally, one or more SPEs 102 include a plurality of VMM sub-systems and/or VMM cores 204 which operate in series or in parallel.

Additional hardware implementations which may be used for electro-optical core 204 are described in one or more of the following PCT applications and publications, assigned to Lenslet Ltd. and JTC (2000) Inc.:

PCT/IL99/00479, published as WO 00/72267;
PCT/IL00/00283, published as WO 00/72104;
PCT/IL00/00285, published as WO 00/72107;
PCT/IL00/00286, published as WO 00/72108;
PCT/IL00/00284, published as WO 00/72106;
PCT/IL00/00282, published as WO 00/72105;
PCT/IL00/00671, published as WO 02/17329;
PCT/IL01/00331, published as WO 01/78261;
PCT/IL01/00333, published as WO 01/78011;
PCT/IL01/00334, published as WO 01/78012
PCT/IL/01/00332, published as WO 01/7773; and
PCT/IL01/00398, published as WO 01/84262.

The disclosures of all of these applications are incorporated herein by reference. In particular, some of these applications describe implementations for splitting, processing and/or collecting light, for VMM architectures and for various useful optical components, such as matching filters and sign extractors. In particular, it is noted that some of the above implementations are limited with respect to the type of transform that can be applied (e.g., FFT-derived). A particular implementation uses leaky and scattering light pipes to spread light from a point source from one end of the pipe along a line along the side of the pipe and similar light pipes to collect light along the pipe to the pipe end. Other methods known in the art may be used as well. Another exemplary application uses a cylindrical lens to spread the light from a linear array to a 2D plane. Another implementation uses linear detector elements that detect light form a line of matrix elements. Various OVMM (optical vector matrix multiplier) devices have been described in the art, for example, the well known Stanford OVMM.

Exemplary Op Code Set

In an exemplary implementation, a programming environment is provided for the SPE. In one example, an environment similar to the well known MatLab® environment is used. Optionally, the commands are designed so that each command is naturally decomposed to the hardware commands for the various components of the SPE. Alternatively, a high level compiler and/or optimizer may be provided. In an exemplary embodiment of the invention, 7 data types are provided for use with the commands: Scalar, Complex scalar, Vector, Complex vector, Matrix, Complex matrix, Boolean vector.

1. Scalar—A real number with length of 1.

2. Complex scalar—A number that contains real and imaginary parts with length of 1.

3. Vector—Column vector that contains real numbers. Length is less or equal to 256 (n<256, n is even).

4. Complex vector—An even-length vector that contains real numbers. Length is less or equal to 256 (n<256, n is even). Optionally, odd-indexed numbers are the real part, and the even-indexed numbers are the imaginary part.

5. Matrix—Matrix that contains real numbers. Size is less or equal to 256 (n,m<256, n is even).

6. Complex matrix—Matrix that contains real numbers. Size is less or equal to 256 (n,m<128). As noted above, real numbers may be arranged, for example in odd columns or in odd rows.

7. Boolean vector—Column vector that contains real numbers. Length is less or equal to 256. The real values used may depend on the implementation, for example as noted above.

The following table summarizes the provided instructions. Different function's inputs and outputs have different data types. This table summarizes the inputs and outputs of every function in the simulator, each of which is optionally a hardware instruction (e.g., possibly including pre- and post-processing steps:

TABLE I

| Function name | Module | Inputs | | Outputs | |
| --- | --- | --- | --- | --- | --- |
| | | Type 1 | Type 2 | Type 1 | Type 2 |
| VmmMatrixLoad | VMM | Matrix | | | |
| VmmVectorMult | VMM | Vector | | Vector | |
| Scalar2Vector | VPU | Scalar | | Vector | |
| CmplxScalar2CmplxVector | VPU | Scalar | | Vector | |
| VectorInsertDown | VPU | Vector | Scalar | Vector | Scalar |
| VectorInsertUp | VPU | Vector | Scalar | Vector | Scalar |
| VectorScalarAdd | VPU | Vector | Scalar | Vector | |
| VectorScalarMult | VPU | Vector | Scalar | Vector | |
| VectorScalarSub | VPU | Vector | Scalar | Vector | |
| VectorShift | VPU | Vector | Scalar | Vector | |
| ZeroVector | VPU | Scalar | | Vector | |
| VectorSign | VPU | Vector | | Vector | |
| VectorAbs | VPU | Vector | | Vector | |
| VectorMov | VPU | Vector | | Vector | |
| VectorVectorAdd | VPU | Vector | | Vector | |
| VectorVectorMult | VPU | Vector | | Vector | |
| VectorVectorSub | VPU | Vector | | Vector | |
| VectorLogicNot | VPU | Boolean Vector | | Boolean vector | |
| VectorVectorCompEqual | VPU | Vector | Vector | Boolean vector | |
| VectorVectorCompGreat | VPU | Vector | Vector | Boolean vector | |
| VectorVectorCompLess | VPU | Vector | Vector | Boolean vector | |
| VectorVectorConditionalChoose | VPU | Vector | Vector | Vector | |

TABLE I-continued

| | | Inputs | | Outputs | |
|---|---|---|---|---|---|
| Function name | Module | Type 1 | Type 2 | Type 1 | Type 2 |
| CmplxVectorBuild | VPU | Vector | Vector | Complex vector | |
| CmplxVectorConj | VPU | Complex vector | | Complex vector | |
| CmplxVectorMult_1i | VPU | Complex vector | | Complex vector | |
| CmplxVectorSeparate | VPU | Complex vector | | Vector | Vector |
| CmplxVectorCmplxVectorMult_Imag | VPU | Complex vector | Complex vector | Complex vector | |
| CmplxVectorCmplxVectorMult_Real | VPU | Complex vector | Complex vector | Complex vector | |
| CmplxVectorImagVectorMult | VPU | Complex vector | Complex vector | Complex vector | |
| CmplxVectorRealVectorMult | VPU | Complex vector | Complex vector | Complex vector | |

It should be noted that some instructions write the output to a global variable and some instructions have only one input (e.g., have a blank column). Also, the instruction "VectorVectorConditionalChoose" has third input with type Boolean vector.

A short description of the instructions follows.

VmmVectorMult—Multiply Vector by Matrix.
Syntax Z=VmmVectorMult(X)
Operands X is Vector type. Vector elements are 8 bits.
Description Multiply Matrix by Vector. The Matrix is taken from Matrix memory. The result is multiplied by $2^{-Gain}$. Gain is taken from memory (stored when Matrix is loaded).
Mathematically Z=(Matrix*X)/2Gain VmmMatrixLoad—Load matrix
Syntax VmmMatrixLoad(Matrix,Gain)
Operands Matrix is Matrix type, No output. Matrix elements are 8 bits.
Description Matrix is loaded to matrix memory. Matrix gain is stored in memory.

VectorVectorAdd—add two real vectors
Syntax Z=VectorVectorAdd(X,xn,Y,yn,zn)
Operands X, Y and Z are Vector type.
xn is the bits number of the first operand.
yn is the bits number of the second operand.
zn is the bits number of the result.
Description X is added to Y (element wise) and the result is set at Z.

VectorVectorSub—subtract two real vectors
Syntax Z=VectorVectorSub(X,xn,Y,yn,zn)
Operands X, Y and Z are Vector type.
xn is the bits number of the first operand
yn is the bits number of the second operand
zn is the bits number of the result
Description Y is subtracted from X (element-wise) and the result is set at Z.

VectorVectorMult—multiply two real vectors
Syntax Z=VectorVectorMult(X,xn,Y,yn,zn)
Operands X, Y and z are Vector type.
xn is the bits number of the first operand.
yn is the bits number of the second operand.
zn is the bits number of the result.
Description X and Y are multiplied (element-wise) and the result is set at Z.

VectorScalarAdd—add real vector with real scalar
Syntax Z=VectorScalarAdd(X,xn,Y,yn,zn)
Operands Y is Scalar type. X,Z are Vector type.
xn is the bits number of the first operand
yn is the bits number of the second operand
zn is the bits number of the result
Description Y is added to all elements in X. The result is set at Z.

VectorScalarSub—subtract real scalar from real vector.
Syntax Z=VectorScalarSub(X,xn,Y,yn,zn)
Operands Y is Scalar type. X, Z are Vector type.
xn is the bits number of the first operand.
yn is the bits number of the second operand.
zn is the bits number of the result.
Description Y is subtract from all elements in X. The result is set at Z.

VectorScalarMult—multiply real scalar by real vector.
Syntax Z=VectorScalarMult(X,xn,Y,yn,zn)
Operands Y is Scalar type. X, Z are Vector type.
xn is the bits number of the first operand.
yn is the bits number of the second operand.
zn is the bits number of the result.
Description Y is multiply by all elements in X. The result is set at Z.

VectorInsertUp—insert element to vector from top.
Syntax [Z,Out]=VectorInsertUp(X,In,xn)
Operands In,Out are Scalar type. X, Z are Vector type.
xn is the bits number of the first, Second operands and the result.
Description Shifts all elements down once, insert a new element to top of X and take out one element from the bottom of the vector.

VectorInsertDown—insert element to vector from bottom.
Syntax [Z,Out]=VectorInsertDown(X,In,xn)
Operands In,Out are Scalar type. X, Z are Vector type.
xn is the bits number of the first, Second operands and the result.
Description Shifts all elements up once, insert a new element to bottom of X and take out one element from the top of the vector.

VectorShift—arithmetic shift elements in vector
Syntax Z=VectorShift(X,xn,N,yn)
Operands N is Scalar type 8 bits. X, Z are Vector type.
xn is the bits number of the first operand and the
yn is the bits number of the results
Description All elements in X are multiply by $2^N$. N can be negative which means arithmetic right shift. The result is set at Z.

VectorSign—passes sign of elements in vector.
Syntax Z=VectorSign(X,xn)
Operands X, Z are Vector type.
xn is the bits number of the first operand.
Description Return 1 for positive numbers, −1 for negative numbers and 0 for zero numbers.
Means the result is always 2 bits. The result is set at Z.

VectorAbs—returns Absolute value of Vector elements.
Syntax Z=VectorAbs(X,xn,yn)
Operands X, Z are Vector type.
xn is the bits number of the first operand.
yn is the bits number of the results.
Description Returns Vector Z with the absolute values of each element in Vector X.

Scalar2Vector—copy scalar to vector
Syntax Z=Scalar2Vector(X,xn)
Operands X is Scalar type, Z is Vector type.
xn is the bits number of the first operand and the result
Description X is copied to a vector, size 256.

CmplxScalar2 CmplxVector—Complex Scalar to Complex Vector.
Syntax Z=CmplxScalar2 CmplxVector(Xr,Xi,xn)
Operands Xr is a Real-part Scalar type.
    Xi is a Imaginary-part Scalar type.
Z are Complex vector type.
xn is the bits number of the first operand and the result elements.
Description Places Real-part and Imaginary-part Scalars into a Complex Vector in the odd and even indexes, and duplicates it to receive a 256-elements Vector.

ZeroVector—reset vector
Syntax Z=ZeroVector(xn)
Operands Z is Vector type.
xn is the bits number of the first operand and the result
Description Z is set to zero, size 256.

VectorMov—copy vector
Syntax Z=VectorMov(X,xn,yn)
Operands X, Z are Vector type.
xn is the bits number of the first operand
yn is the bits number of the results
Description Copy all elements in X to Z.

CmplxVectorBuild—Complex vector constructor.
Syntax Z=CmplxVectorBuild(X,xn,Y,yn,zn)
Operands X, Y, Z are Complex vector type.
xn is the bits number of the first operand.
yn is the bits number of the second operand.
zn is the bits number of the result.
Description Build new Complex vector from X and Y. From X the odd-indexed elements (Real part) and from Y the even-indexed elements (Imaginary part).
    Mathematically Z=real(X)+j*imag(Y)

CmplxVectorSeparate—Construct real and imaginary vectors.
Syntax [X,Y]=CmplxVectorSeparate(Z,zn)
Operands X,Y, Z are Complex vector type.
zn is the bits number of the first operand and the results.
Description Construct two complex vectors.
X odd-indexed elements are copied from odd-indexed elements of Z.
X even-indexed elements are set to zero.
Y even-indexed elements are copied from even-indexed elements of Z.
Y odd-indexed elements are set to zero.
Mathematically: X=real(Z); Y=imag(Z);

VectorLogicNot—logic not operation on vector elements.
Syntax Z=VectorLogicNot(X)
Operands X, Z are Boolean vector.
Description performs logical 'not' operation on every Boolean element in the vector.

VectorVectorCompEqual—element-wise compare if equal.
Syntax Z=VectorVectorCompEqual(X,xn,Y,yn)
Operands Z is Boolean vector type. X,Y are Vector type.
xn is the bits number of the first operand.
yn is the bits number of the second operand.
Description compare element-wise respectively between two vectors. For every couple that is identical put 1 in the result vector, 0 otherwise.

VectorVectorCompGreat—element-wise compare if greater.
Syntax Z=VectorVectorCompGreat(X,xn,Y,yn)
Operands Z is Boolean vector type. X,Y are Vector type.
xn is the bits number of the first operand.
yn is the bits number of the second operand.
Description compare element-wise respectively between two vector. If Xi is greater than Yi put 1 in the result vector, 0 otherwise.

VectorVectorCompLess—element-wise compare if smaller.
Syntax Z=VectorVectorCompLess(X,xn,Y,yn)
Operands Z is Boolean vector type. X,Y are Vector type.
xn is the bits number of the first operand.
yn is the bits number of the second operand.
Description compare element-wise respectively between two vector. If Xi is smaller than Yi put 1 in the result vector, 0 otherwise.

VectorVectorConditionalChoose—conditional vector constructor.
Syntax Z=VectorVectorConditionalChoose(X,xn,Y,yn,zn, Condition)
Operands Condition is Boolean vector type. X,Y,Z are Vector type.
xn is the bits number of the first operand.
yn is the bits number of the second operand.
zn is the bits number of the result.
Description Build new vector from X and Y according to Condition Boolean vector. If condition is 1 Zi=Yi, else Zi=Xi CmplxVectorConj—Vector conjugate.
Syntax Z=CmplxVectorConj(X,xn)
Operands X, Z are Complex vector type.
xn is the bits number of the first operand and the result.
Description Conjugate each complex number. Perform negate on each even-indexed element.
    Mathematically Z=conj(X)

CmplxVectorMult_1i—multiply by j.
Syntax Z=CmplxVectorMult_µl(X,xn)
Operands X,Z are Complex vector type.
xn is the bits number of the first operand and the result.
Description Multiply a vector by j. Switch odd & even-indexed elements. Negate odd-indexed elements.

Mathematically Z=j*(X)

CmplxVectorCmplxVectorMult_Real—Real Complex Multiplication.
Syntax Z=CmplxVectorCmplxVectorMult_Real(X,xn,Y,yn,zn)
Operands X,Y,Z are Complex vector type.
xn is the bits number of the first operand.
yn is the bits number of the second operand.
zn is the bits number of the result.
Description Multiply a Complex vector by a Complex vector. Take the real part of the result (equivalent to Real Instruction). The multiplication is done in three stages:
1. Element-wise multiply the 2 vectors.
2. Subtract 2 companion elements (the even-indexed from the odd-indexed). Put the result in the odd indexed place.
3. The even indexed places of the result are set to zero.
Mathematically Z=Real(X*Y)

CmplxVectorCmplxVectorMult_Imag—Imaginary Complex Multiplication.
Syntax Z=CmplxVectorCmplxVectorMult_Image(X,xn,Y,yn,zn)
Operands X,Y,Z are Complex vector type.
xn is the bits number of the first operand.
yn is the bits number of the second operand.
zn is the bits number of the result.
Description Multiply a Complex vector by a Complex vector. Take the imaginary part of the result (equivalent to Imag Instruction). The multiplication is done in four stages:
1. Switch real and imaginary elements in Y.
2. Element-wise multiply the 2 vectors.
3. Add 2 companion elements and put the result in the even indexed place.
4. Set the odd-indexed elements to zero.
Mathematically Z=Imag(X*Y)

CmplxVectorRealVectorMult—Complex Multiplication by real.
Syntax Z=CmplxVectorRealVectorMult(X,xn,Y,yn,zn)
Operands X,Y,Z are Complex vector type.
xn is the bits number of the first operand.
yn is the bits number of the second operand.
zn is the bits number of the result.
Description Multiply a Complex vector by a Complex vector. The second vector is set to real (the even indexed elements are referred as zero). The multiplication is done in two stages:
1. In the second vector, Copy odd-indexed elements to even-indexed places.
2. Result is element-wise multiplication of the 2 vectors.
Mathematically Z=X.*Real(Y)

CmplxVectorlmagVectorMult—Complex Multiplication by Imaginary.
Syntax Z=CmplxVectorlmagVectorMult(X,xn,Y,yn,zn)
Operands X,Y,Z are Complex vector type.
xn is the bits number of the first operand.
yn is the bits number of the second operand.
zn is the bits number of the result.
Description Multiply a Complex vector by a Complex vector. The second vector is set to imaginary (the odd indexed elements are referred as zero). The multiplication is done in four stages:
1. In the second vector, Copy even indexed elements to odd indexed places.
2. Element-wise multiply the 2 vectors.
3. Switch the companion elements.
4. Negate odd-indexed elements.

Mathematically Z=X.*(j*(imag(Y)))

As noted in the instruction descriptions, there is a limit of precision. In an exemplary embodiment of the invention, commands are also provided for casting a value to have a limited bit resolution and/or allow it to be saturated to an upper or lower limit when it is too high.

In an exemplary embodiment of the invention, a simulation system is provided to try out commands and programs before actually programming the SPE. Optionally, such a simulator is written in MatLab. Such a simulator may be useful for calculating expected error values and/or optimizing (manually) programs. In an exemplary embodiment of the invention, the simulation (or a real system) includes a profiler, which, for example, keeps track of which commands were executed, their order, their relative occurrence and/or precision. The data is optionally shown in graph form and/or in table form.

In an exemplary embodiment of the invention, the profiling information is stored in a table with the following format, with zero precision representing "don't care":

| Operation index code | Input_1 # of bits | Input_2 # of bits | Output # of bits |
|---|---|---|---|
| 17 | 7 | 0 | 7 |
| 16 | 4 | 0 | 4 |
| 15 | 3 | 6 | 7 |
| 18 | 8 | 8 | 16 |

Exemplary Application

Figure 7:
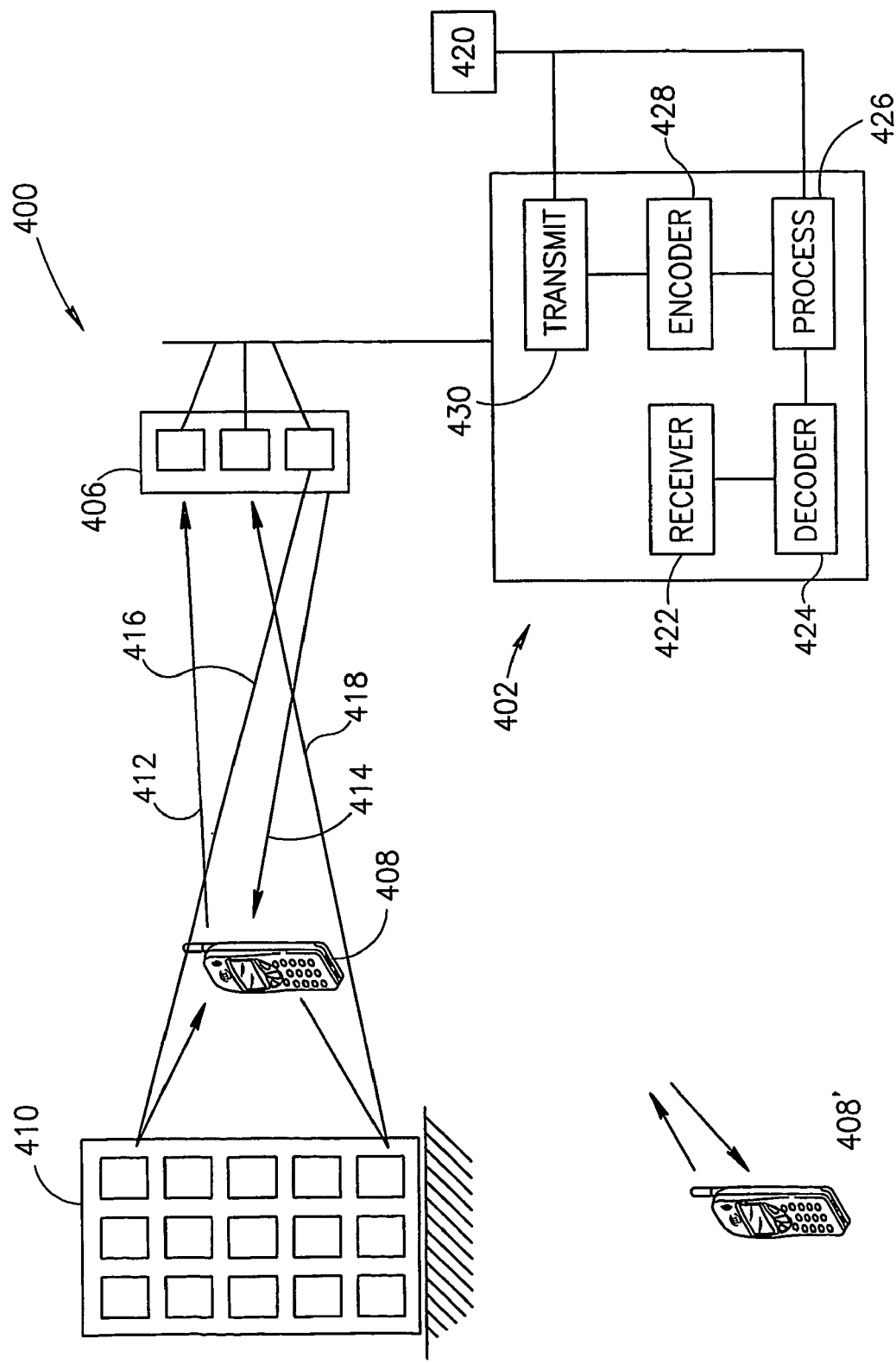
FIG. 7 is a schematic block illustration of a UMTS system suitable for implementation using a module as described in FIG. 1.

FIG. 7 is a schematic block illustration of a UMTS system 400 suitable for implementation using a module as described in FIG. 2. A plurality of cellular telephones 408 and 408' communicate with a base station 402, that is connected to further system components 420 (not described in detail). Telephone 408 communicates with base station 402 via an uplink 412 and a downlink 414. However, in a typical situation, such as the presence of a nearby building 410, there is multi-path propagation, shown as a secondary uplink 418 and a secondary downlink 416 (two shown, many more typically exist). As the uplink and downlink may use different frequencies, the indirect paths are often different for the uplink and for the downlink.

Base station 402 includes an antenna 406 (shown generally connected) that optionally includes multiple component antennas (described below). A processing section of base station 402, which can include VMM processors such as SPE 102 (FIG. 1), comprises a receiver 422 for receiving transmissions from telephone 408, a decoder 424 for extracting the information carried by the transmission, a processor 426 that processes the data (e.g., collecting call statistics and power control) and communicates with further components 420, an encoder 428 that prepares data for transmission and a transmitter 430 that generates signals to be sent to telephone 408.

In an exemplary embodiment of the invention, the VMM processors are used for processing in one or more of the above described components. In the methods described bellow. The matrix is a matrix portion of a VMM multiplier. Various other processing activities described may be performed, for example, by a VPU, a DSP, a host CPU or separate hardware/software.

In an exemplary embodiment of the invention, system 400 is a wide band CDMA system. In CDMA systems, each bit of data is spread out in time as a plurality of chips. Chip streams from different users share a same time and frequency space, but use pseudo-orthogonal codes to differentiate between the different users.

Figure 8:
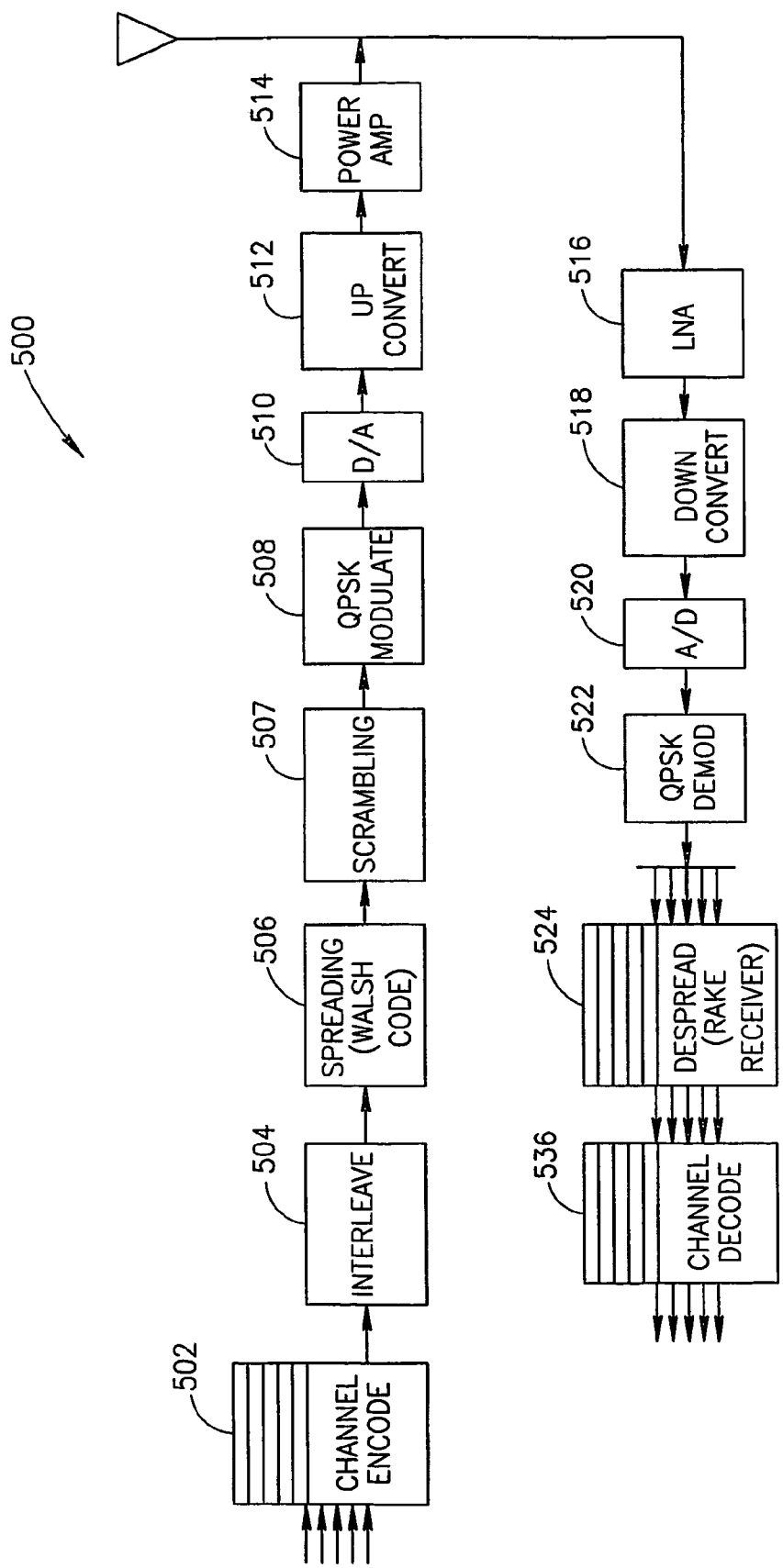
FIG. 8 is a schematic diagram of an information transmission and reception process, in accordance with an exemplary embodiment of the invention, and based on the UMTS standard.

FIG. 8 is a schematic diagram of an information transmission and reception process 500, in accordance with an exemplary embodiment of the invention, and based on the UMTS standard. Different implementations may use different values than described below. One or more bit-channels (e.g., speech and data) are encoded (502), optionally, adding error correction information. If multiple channels are provided, they are interleaved (504). At 506, the data bits are spread, typically by Walsh Sequences, to encode each bit as a series of chips, the length of the Walsh sequence at the spreading/encoded data being defined by a spreading factor. At the same time, a control bit stream is spread with the Walsh sequence typically with a fixed length of (e.g., 256) and the same Walsh sequence is used for all users. For voice, for example, one bit of data has one control bit associated with it, and some of the control bits are known pilot bits. Walsh encoding also separates multiple channels, if they exist, into orthogonal values. In one example, 1 bit of voice data is spread into 256 (complex valued) chips, a spreading factor of 256. 1 bit of computer data, however, may be spread into 64 chips, a spreading factor of 64. Typically, a fixed chip rate is desired, and the spreading factor is thus determined by the ratio between the bit rate and the chip rate. The spreading factor of the control channel is typically fixed.

At 507, the chips are scrambled by multiplying each chip with an element from a (typically user specific) pseudo-random sequence. These sequences have the property that, different sequences have low correlation (e.g., orthogonal) to each other so that sets of chips from different users can be separated at reception. Two types of sequences are in general use, long sequences (38400 chips) and short sequences (256 chips). The length of the sequence denotes the number of elements after which the sequence repeats itself.

At 508-514, the chips are QPSK modulated, converted to analog, up-converted to RF frequencies (in some cases to IF frequencies), amplified and transmitted.

At 516-522, base station 402 receives a signal, amplifies it and generates a QPSK demodulated stream of complex chip values. Optionally, the stream is oversampled, for example 8 times, to allow various alignment processes, as described below, to be better applied.

At 524, a rake receiver, one example of which is described below, reconstructs the series of chips sent by each telephone 408. Then, the chips are decoded (526). In an exemplary embodiment of the invention, the reconstruction and decoding is performed for multiple users at a same time.

Figure 9:
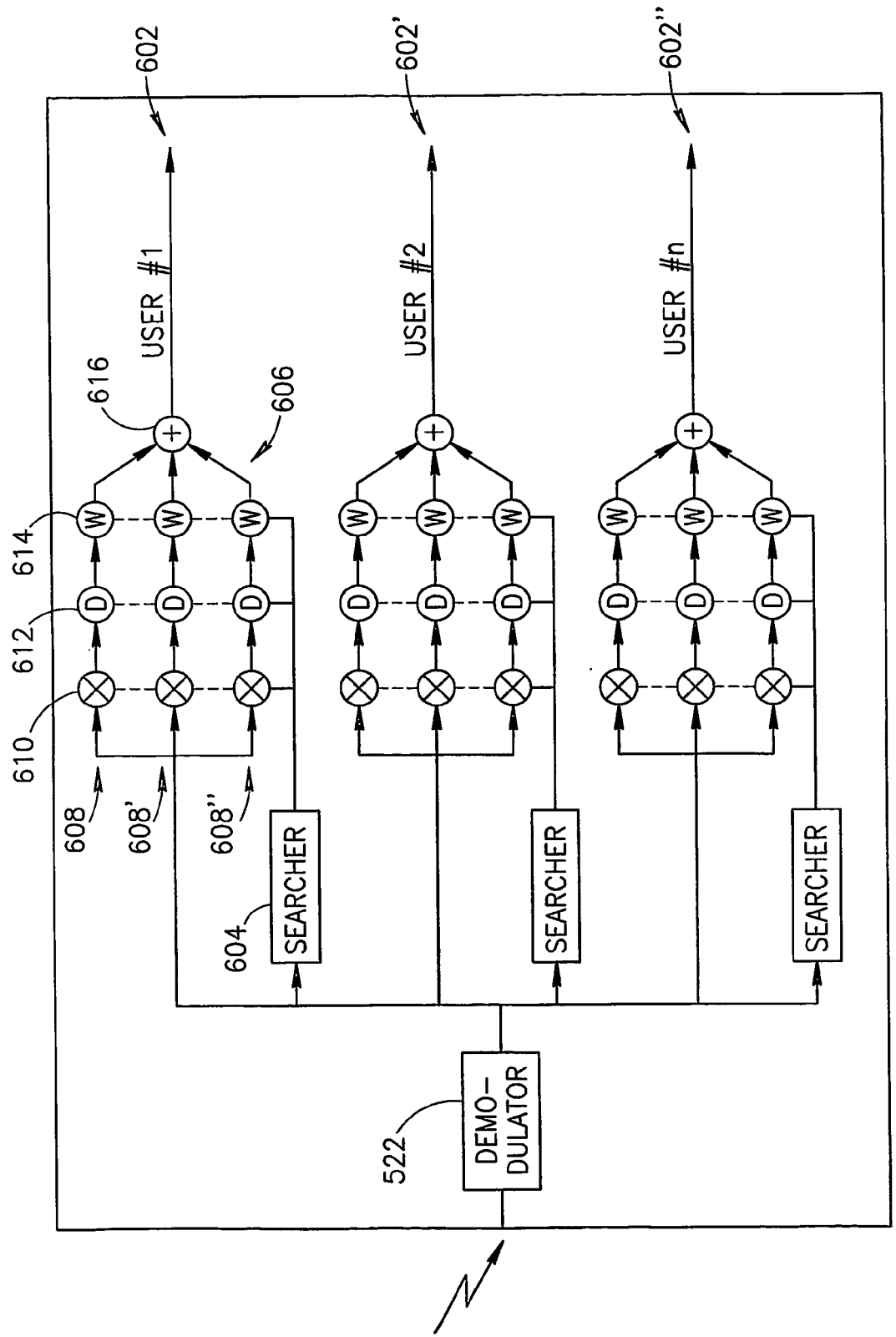
FIG. 9 is a schematic block diagram of a rake receiver, in accordance with an exemplary embodiment of the invention and suitable for example, for use in FIG. 7.

FIG. 9 is a schematic block diagram of an exemplary rake receiver 600, suitable for example, for reference 524 of FIG. 8. In an exemplary embodiment of the invention, rake receiver 600 performs the following two types of tasks:

(a) extract data including, for example, combining paths and separating channels, under conditions of inference between multiple paths of a same user and multiple users; and (b) find, lock onto and track multiple paths for a same user.

As noted above, a single user/base-station pair may be communicating over multiple paths. Not only do the multiple paths interfere with each other, but if the base station is to track a single path for a user, it would be desirable that the tracked path be reliable. In an exemplary embodiment of the invention, instead of tracking a single path, multiple paths for a single user are identified, tracked and the contributions from reliable tracks utilized to extract the data.

In an exemplary embodiment of the invention, the general behavior of receiver 600 is as follows. Receiver 600 first detects the relevant paths for a user. The paths are combined and corrected to form a composite path and the (possibly at a later stage) the data in the composite path signal is extracted. Prior to decoding the composite path may be corrected again, for example, to correct phase shifts.

The data from demodulator 522 is processed for several users 602 in parallel. For a single user 602, data from demodulator 522 is passed to a searcher 604. Searcher 604 correlates the incoming signal with the pseudo-random chip series for each user, based on the knowledge that a "1" value pilot bit is available in the control portion of each transmission. The result is a series of peaks, each peak of which corresponds to a path of transmission of data from a user.

In an exemplary implementation, a correlation matrix comprises, in each row, a set of chips for a single user, based on that user's pseudo random code. The correlation is a running correlation on an interval dependent of possible path delays. For example, proportional to the cell size and cell topology (e.g. existence of reflective buildings). Each step can move one sample ahead (e.g., 8 samples per chip), or a whole input vector less an optional overlap between vectors. It is noted however, that to detect a correlation it is not necessary to compare an entire chip set, however, comparing an entire chip set does increase the probability of success and reduce error rates. In an exemplary embodiment of the invention, only part of the slot is searched. Rather, only a few bits are searched and then the other bits are tracked.

In an exemplary embodiment of the invention, the correlation searches over all the control bits in a frame and ignores data bits. Possibly, QPSK demodulator 522 outputs two steams of bits, I and Q, one of which is data and one of which is control. Alternatively or additionally, only known pilot pits are correlated. The various user chip sets, etc. are optionally stored in the memory of module 102.

As noted, each user may be transmitting on multiple paths. In an exemplary embodiment of the invention, each path is detected, tracked and possibly used. A finger 608 is assigned to each path. Each such finger includes a signal corrector 610 that corrects phase and amplitude of the signal, a delay 612 that shifts the entire signal (an integer number of sub samples) and a weight 614 that assigns a measure of reliability for the path covered by the finger. The contributions from all the fingers of this user are added together at an adder 616 to provide a composite signal that will be later decoded.

In an exemplary embodiment of the invention, the correlation process is used to detect which paths have a significant signal. By tracking, over a frame or between frames, how often the path is detected, a measure of reliability of the path may be discerned. Paths with a strong signals are selected to be covered by a finger. For example, 8 or 16 fingers per user may be provided. While some of this may utilize the DSP portion of module 102, in an exemplary embodiment of the invention, dedicated peak finding hardware is used to detect correlation peaks and the VMM is used to perform the correlation operation. It should be noted that once a path is found, depending on the system assumptions and/or parameters, a second search or alignment may be performed only in a next frame or within the same frame. In an exemplary embodiment of the invention, the paths that are found to be stronger are used to update the profile of paths for the finger detector, if a separate matrix is used for finger processing.

The resulting chip stream is then decoded, for example, to determine if the data bit value is 1 or 0. First, however, the phase shift, caused by the radio transmission, between the data and control bits is corrected. This can be done by comparing the actual extracted pilot bits to the true values of the pilot bits (e.g., channel estimation). Typically, the phase shift between known pilot bits is relatively constant (e.g., Doppler shifting has a small effect over such intervals) The sign of the bit combining result (e.g., the sum of all the fingers) determines the decoded bit value. This is the opposite process to the Walsh spreading, in which the sign of the Walsh sequence is defined by the bit value e.g., a "0" value of the bit is converted into "1" multiplied by the Walsh sequence, and a "1" value of the bit is converted into "−1" multiplied by the Walsh sequence (e.g., an inverted sequence).

Figure 10:
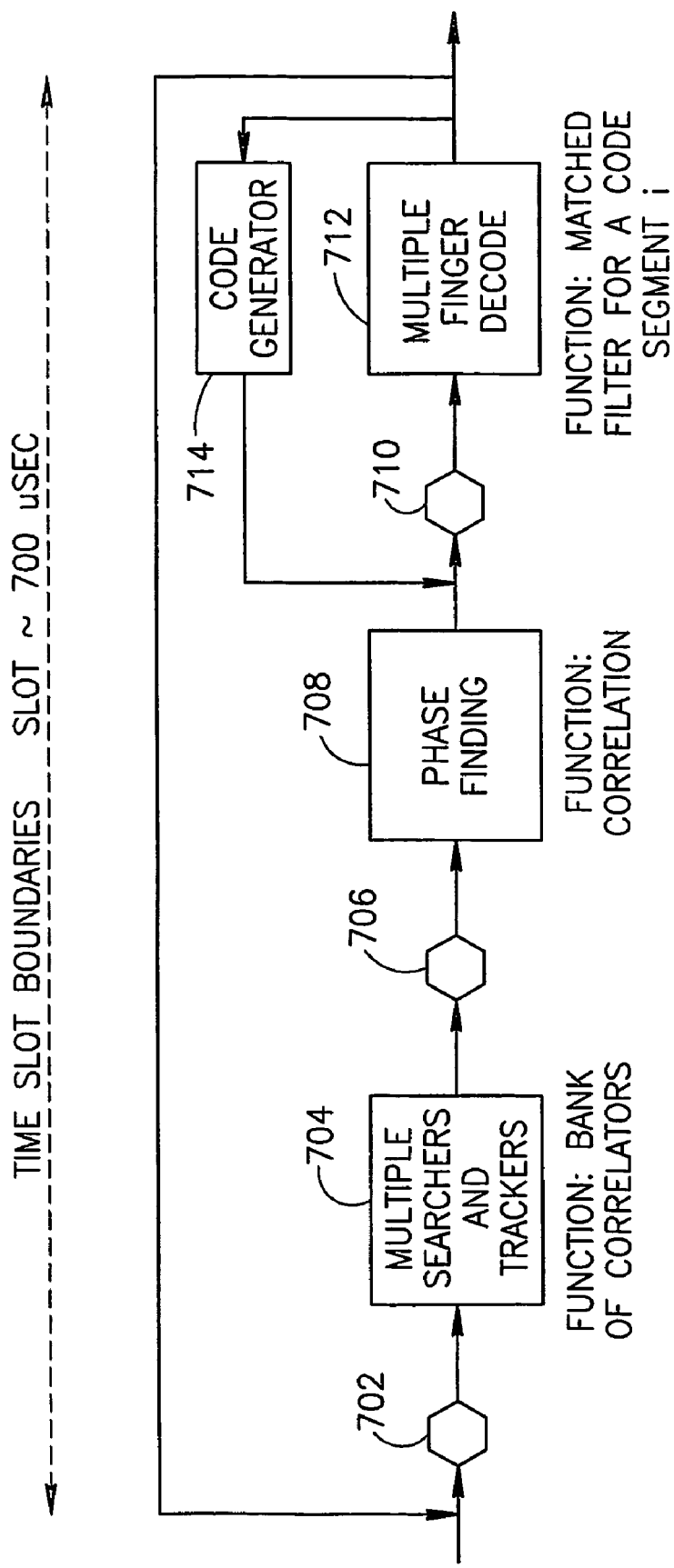
FIG. 10 is a flow diagram for a rake receiver, in accordance with an exemplary embodiment of the invention, in which hexagons represent partial or complete matrix updates.

FIG. 10 is a flow diagram 700 for a rake receiver and decoder, in accordance with an exemplary embodiment of the invention, in which a hexagon represent a step of partial or complete matrix update. At 702 a search matrix is loaded, for example, with two rows for each user, one for imaginary values of the pseudo-random sequence and one for real values (e.g., control and data bits, respectively). The two rows may be, for example, consecutive or a block of real rows is followed by a block (e.g., all) the imaginary rows. In an exemplary embodiment of the invention, the matrix holds the pseudo random sequence and the VCSELs are modulated by the Walsh code. As different spreading factors may have different Walsh sequence lengths, it is more convenient to Walsh-modulate the input rather than the matrix. The matrix is optionally sub-sampled to match the input. At 704, the matrix is applied to some or all of the data in the frame, yielding a plurality of paths. For example, one bit may be searched for each nine bits that are tracked. At 706 a new, phase correction, matrix is inputted and then at 708 a phase correction is determined that best corrects the data to have separation of control bits and data bits (e.g., pilot bits). In an exemplary embodiment of the invention, the matrix used for finger detection is constructed according to the results of the searching phase and the spreading factor that is indicated in the control bits. Generally, the data's spreading factor is known at the end of the frame. Only that spreading factor is used in the matrix for a single bit correlation, at this time (e.g., for some spreading factors, part of the matrix is unused, or used for redundancy and/or improvement of signal to noise). Users with same spreading factors may be grouped together in a same matrix.

In one embodiment of the invention, where long codes are used, the matrix values are updated as the input progresses along the frame, for each new bit interval a different segment from the long code is loaded to the matrix.

At 710, a finger specific matrix is loaded, with codes generated by a code generator 714 (e.g., if long codes are used and search is not on all of frame). The delays, etc. are optionally embodied in the values inserted into the matrix and their shifting, for example assuming a short shift (e.g. <32 chips). It should be noted that once the phase is determined, sub-sampling of the data is not required in all embodiments and the sub-sampling may be removed, for example, by interpolation or averaging. At 712 decoding for multiple fingers is applied, as noted above, using, for example, path corrections as determined at 704. Code generator 714 generates further codes for later parts of the frame.

In an exemplary embodiment of the invention, when a low density of users is being serviced at the base stations, long codes are used. However, once high capacity is required, short codes and multi-user detection methods, described below, may be used.

The above description of a rake receiver has focused on a case where a single spreading factor is used. However, this is not always the case. For example, two or more spreading factors may coexist. In this case, finger decoding comprises adding together the contributions from fewer than 256 chips for a single bit. In an exemplary embodiment of the invention, only a subset of the matrix row elements are used. Alternatively, if the users cannot be arranged so each matrix performs only same size spreading factors (and in other cases, same length codes), some of the processing may be performed on a different matrix for those cases. Alternatively, the VCSEL values and matrix values are duplicated, to provide a stronger signal. Alternatively or additionally, only matrix values are duplicated.

In one example of a low spreading factor, such as 4, there are 64 bits in 256 chips. By arranging the matrix in a triangular way, more then one bit can be decoded at the time. It should be noted however, that if a low spreading factor is used, the number of users is generally reduced since the total capacity (bits/sec) for a cell is typically interference limited and there is a trade off between the data rate and the power. Power increase compensates for rate increase (e.g., fewer chips per bit). The factor of increase is called the coding gain. Therefore, if one or more users is using a small spreading factor then many other potential users are not active and their resources can be used for decoding of more then one bit at the same matrix.

DSP 214 is optionally used for choosing only a few paths among all the peaks that the peak detector has detected and/or for calculating phase rotation from the quadrate components.

The decoding operation is a match filter process (filtering) performed on the decoding bits. The combining is by aligning the different paths of filtered data and summing using a Maximum Ratio Combining (MRC) method (the contribution of each path is multiplied by its amplitude and the right weight). In an exemplary embodiment of the invention, each path has an associated DSP process, which associates a weight depending on the reliability of the path. Unreliable paths are dropped and newly found reliable paths are added and assigned a weight. Any weight assignment method, for example as known in the art may be used.

Alternatively, Equal Gain Combining is used, where all paths contributions are considered equally. To generate the matrix for this phase, the users are divided into groups according to their spreading factor. Each such group can have its own matrix. The rows of the matrix will have the length of the spreading factor and one bit at the time will be decoded. This operation is repeated for each spreading factor separately (e.g., for all 7 possible spreading factors (4 . . . 256). Alternatively, the users are grouped so that only some of the matrixes need to be constructed and used. In addition, more than one bit can be decoded per cycle, as explained above.

In an exemplary embodiment of the invention, a search for a correlation of an input vector with a small pattern comprises loading the matrix so each line includes the pattern, shifted by some amount (the arrangement may be non-monotonic, to reduce cross-talk). The result indicates where in the input there is the best match. A peak detector is optionally applied on the result vector to determine this location. In an exemplary embodiment of the invention, when the input vector is longer than the length of the device input, a partial overlap between consecutive input vectors sections, for example about or more than the pattern size, may be provided. Alternatively, a shorter or no overlap is provided.

As the number of users increases, the inference between users becomes significant. In addition, a single user may have many more paths than is practical to model using a multi-finger rake receiver. Another interference cause is neighboring cells, however, this interference is considered to be lower then the intra-cell interference. Cancellation of this interference can be done in the same way as the intra-cell interference (e.g., using MUD, described below) if the neighboring cells transmit their data bits (e.g., using an Iur connection).

In an exemplary embodiment of the invention, a MUD (multi user detection) method is used to remove the contribution of interfering signals, so that the desired signal is more discernible. In an exemplary embodiment of the invention, the MUD method is used to determine the best correlation for each user, on the data bits, rather than on the control bits. After the best correlation are determined, multi-finger detection may be applied as above.

Three MUD algorithms are commonly used, although many have been suggested and are contemplated as being suitable for some embodiments of the invention.

A first method is based on maximum likelihood. The signal is estimated based on channel estimation (e.g., delay, phase, amplitude and/or Doppler shift) and the data bits are permuted to determine a best match to the input signal. This method is generally considered very complex.

A second method is decorrelation detection, in which the signal is assumed to be a convolution of the data bits with a cross-correlation matrix with noise added. If the noise is ignored, the data bits can be reconstructed by inverting the cross-correlation matrix and multiplying it by the input signal, or by solving a set of equations.

A third method is an iterative process of eliminating inference contributing paths by subtraction of a user signal estimation. In an exemplary embodiment of the invention, multiple interfering paths are removed in parallel. The value of a single bit can be estimated, for example, by subtracting the effect of a previous, a current and a next bit, of a plurality of paths.

In an exemplary embodiment of the invention, a plurality of strong signals are detected in the input signal, for example using a detection matrix as described above. After detection, the signal value is decoded, the temporal delay is determined and the signal strength is estimated. All of these have been described above with reference to a general rake receiver, except for signal strength estimation which can be estimated directly from the extracted signal. The thus estimated signals are then aligned in time and corrected to have the estimated amplitude and then subtracted from the input signal, hopefully, having a similar effect as if the interfering signals were never present. It should be noted that a plurality of signals can be estimated and subtracted in parallel. Alternatively or additionally, the VMM processor may be used to generate the estimated signals in parallel, by multiplying the data estimates of each signal by their suitable spreading functions. Amplitude correction may be achieved, for example, using a VPU operation.

In an exemplary embodiment of the invention, when an interfering data bit cannot be estimated with a desired level of confidence, chips relating to that bit are not subtracted out from the input signal or a fraction of the bit value is subtracted. The fraction may be related to the confidence level.

In an alternative exemplary embodiment of the invention, a matrix approach is used to establish and then to solve the equations of the second (decorrelation) method. In an alternative embodiment, the iterative method is used. However, at each iteration, a plurality of paths (e.g., 128) are removed.

In an exemplary embodiment of the invention (using the second method), the multi-user detection comprises of the following steps:

(a) multipath combining, for example using MRC;

(b) calculation of cross-correlation coefficients and matched filter results (for example using an over sampling of 4);

(c) solving the resulting set of equations, for example using iterative, non-stationary method such as CG, CGS, BiCG-STAB or GMRES; and (d) optionally verifying the results using a DSP.

In an exemplary embodiment of the invention, MUD methods are applied only to the significant bits, while setting the insignificant bits to zero. This may improve the accuracy and/or reduce error propagation, especially the magnification of the effect of Gaussian noise.

Figure 11:
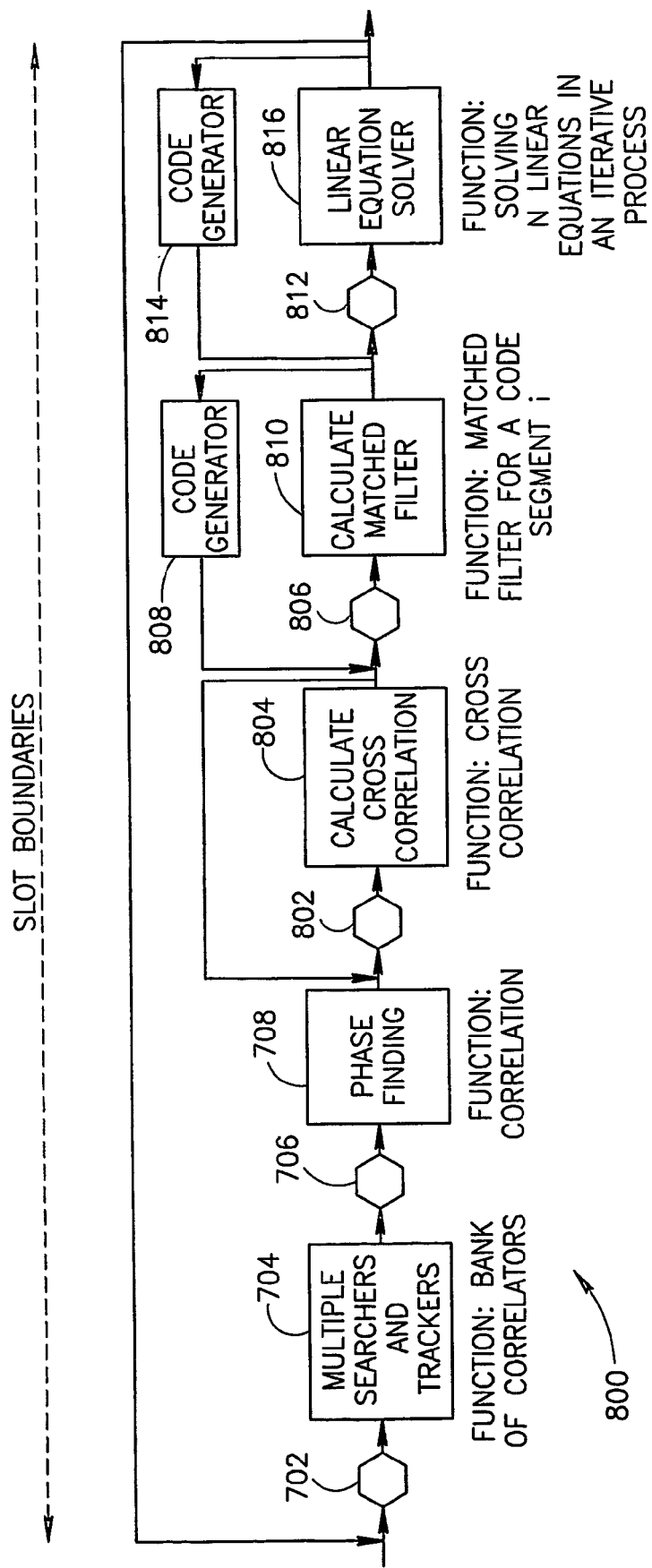
FIG. 11 is a schematic flow diagram of a rake receiver including MUD (multi-user detection), in accordance with an exemplary embodiment of the invention.

FIG. 11 is a schematic data flow diagram 800 of a rake receiver including MUD, in accordance with an exemplary embodiment of the invention. Portions 702-708 are the same as in simple rake receiver. However, the finger detectors are integrated into the MUD method. At 802 a matrix for calculating cross-correlation is loaded and the cross-correlation factors are calculated (804). The matrix is switched so as to calculate multiple cross-correlation coefficients.

At 806, a matrix for calculating a matched filter is loaded. Values for the matched filter are calculated using a code generator 808. This process is repeated until all the desired matched filters are calculated. At 812 matrixes for solving a set of simultaneous equations are loaded. The equations are solved at 816, with the help of a code generator 814 for loading the equations. As noted above, this process is iterative.

In some cases, two paths (of a same or different users) have a significant (e.g., of the order of a length of a bit) delay between them. If detection is applied to two such users using a same matrix operation, the input vector that contains a whole bit for one user may contain contributions (even equal) from two bits for another user. However, the delay for each user/path is generally tracked. In an exemplary embodiment of the invention, detection is applied to an artificial signal, in which contribution from a fractional bit is provided. For example, an input signal may be correlated with a signal that contains the second half of a code for a "0" value and a first half of a code for a "1" value, for a particular user. For example, six different signals may be used for each user, "01", "00", "10" and "11", with the dividing line being determined by the tracking and in some cases, degenerating in to "0" and "1". Optionally, only "00" and "01" are used, as the other two signals have a correlation with the opposite sign for any particular case.

In some cases, it is difficult to detect fraction parts of a bit. In an exemplary embodiment of the invention, the correlation is applied on pairs of consecutive bits for double length input vectors (e.g., which contain enough chips to show two bits). Each correlation optionally has an overlap of part of a bit or a whole bit.

This detection method may be used for regular detection rather than for MUD.

A further optional feature is a smart antenna controller, in which the antenna gain is directional. In the uplink channel, the limitation on cell capacity is mainly from inference between users. In the downlink channel, the limitation is caused by the limited transmission power. In the past it has apparently been proposed to use some type of smart antenna in environments where there are a relatively small number of highly interfering users. CDMA, however, is an environment where there are a large number of low-inference users. In an exemplary embodiment of the invention, it is recognized that users with a low spreading factor (e.g., high data rate users) introduce a disproportionate amount of inference. In an exemplary embodiment of the invention, low data rate users are separated using MUD and high data rate users are separated using a smart antenna scheme. The number of actual antenna components used in an antenna can be derived from the required angular separation, for example. Different components may have different beam shapes.

In an exemplary embodiment of the invention, the process of applying a smart uplink antenna comprises receiving the signal from multiple antenna components and selectively applying a fractional gain to antenna components for a particular high inference source, while retaining a gain for the direction of the source, so that when the contributions from the components are combined the signals for the low inference users are not swamped out by the high inference user. Three different types of selective gain may be applied, including: null steering, fixed beams (e.g., beam forming without zeros) and beam shaping (e.g., beam forming with zeros, spatial filtering). In an exemplary embodiment of the invention, null steering is used for the uplink. It is noted that the identification of the interfering signals and their number is generally known to the base station.

Figure 12:
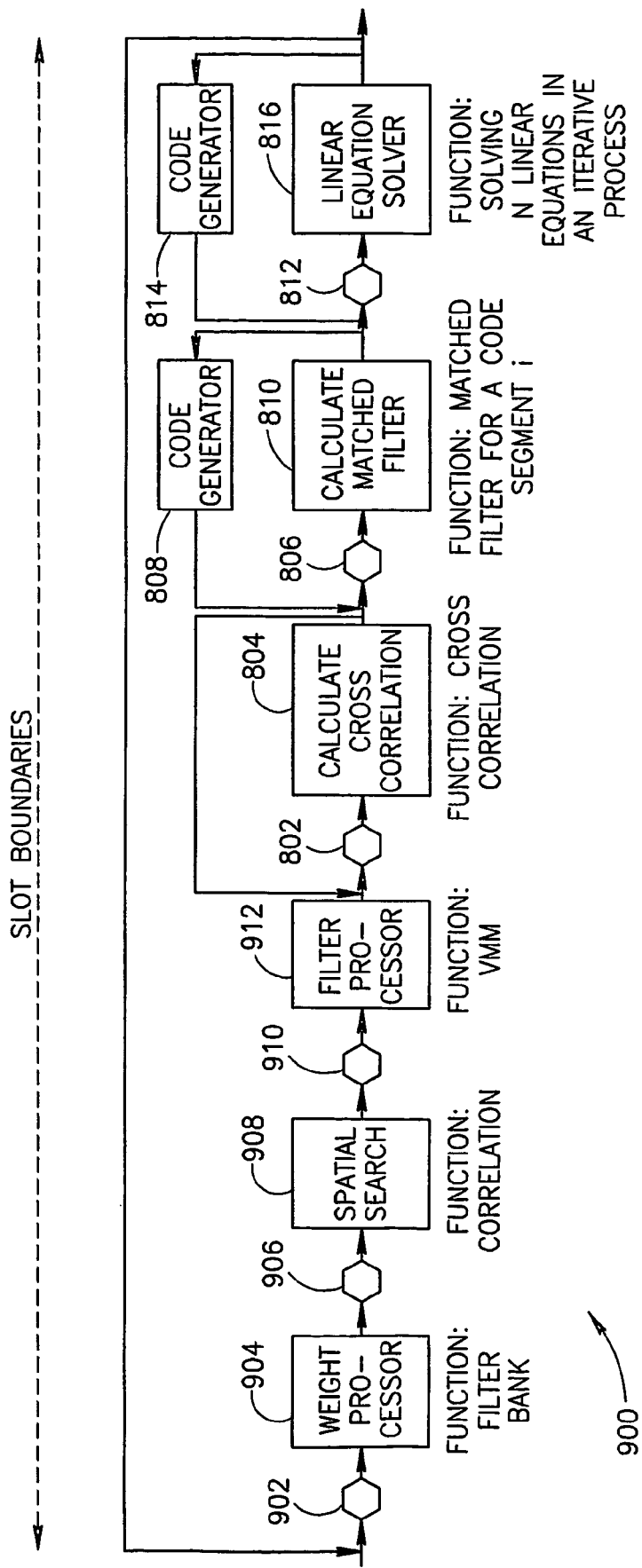
FIG. 12 is a schematic data flow diagram for a rake receiver implementation that includes a smart uplink and/or downlink antenna and MUD, in accordance with an exemplary embodiment of the invention.

FIG. 12 is a schematic data flow diagram 900 for a rake receiver implementation that includes a smart antenna and MUD, in accordance with an exemplary embodiment of the invention. At 902 a filter bank for weights determination is loaded. The values are decided, for example, based on the known high inference users. These users may be known, for example, by identifying them during connection process starts and sending the connection parameters to the searcher (e.g., in receiver 600) for each connection prior to the start of the data transfer (e.g., in the signaling phase of the connection/service setup). In an exemplary embodiment of the invention, the weights are estimated based on pilot bits detection and are updated at a low rate. At 904 the weights for the antenna segments are calculated. At 906 a new matrix is loaded, for correlation purposes, so that at 908 a spatial search of the input from the antenna segments is performed (e.g., first correlation then peak detection). At 910 a filter bank is loaded so that 912 performs a filtering function. The resulting signals can now be combined and processed using a MUD method, for example using elements 802-816, as in FIG. 11. Alternatively a regular rake receiver function is continued of correlating the multiple paths and combining finger results, as described above.

In a downlink antenna, the signals for the users are multiplied by a weighting matrix to determine the weights for each antenna segment, to provide beam forming. The transmission power is multiplied by the number of the antenna elements (e.g., each element has its own power amplifier). In an exemplary embodiment of the invention, the location of each user is determined using well known direction finding methods. Optionally, these methods use module 102 to determine the direction for multiple users and/or paths in parallel, using module 102 for solving multiple simultaneous equations, for example. In an exemplary embodiment of the invention, the direction of a user is found by sending a secondary spreading factor to the user (different for each antenna lobe) and then, by identifying the spreading factor, determining which return path the user is listening on. The return direction is the direction of the uplink as a whole and can be used to better aim the antenna for downlink (e.g., determining which beam direction the user responded to) and for uplink (e.g., determining which direction to listen to for that user).

An additional processing that may be performed by module 102 is the generation of multiple encoding and spread data, in parallel for multiple downlink channels.

It should be appreciated that using the methods described above, such as MUD and smart antenna, a cell can have a higher capacity. Alternatively or additionally, the cell can have spare capacity to handle calls from nearby cells. An additional potential advantage is better power control due to more frequent monitoring or actual power received from users and/or to be transmitted to users. Another potential advantage is higher capacity, due to more effective channel estimation.

In implementing a system using a VMM processor, the computations can be distributed in various ways between the computational components (e.g., VMM, VPU and DSP). While a variety of distribution methods are contemplated, in an exemplary embodiment of the invention, processes that can be redefined as VMM operations, are performed by the VMM. In general, as the VMM itself is massively parallel, it may be preferable to perform more operations, albeit in parallel. Any balance can be performed by the DSP, for example, using methods well known in the art. It should that a typical UMTS implementation includes many components that may not be applied using a VMM, for example, code generators and symbol reprocessors.

It should be noted, in addition, that some of the methods described herein may be applied also in non-VMM systems, for example, fractional MUD estimation reduction.

Furthermore, the terms row and column were used herein in description of specific operations on the matrix. It is noted that the use of rows and columns may be interchanged by a simple change in the optics setup and/or the matrix arrangement.

The present invention has been described using non-limiting detailed descriptions of embodiments thereof that are provided by way of example and are not intended to limit the scope of the invention. In particular some of the exemplary numerical figures for example, sizes (e.g., of matrix, of input), accuracy and/or precision, are derived from numbers currently associated with non-finalized standards and can change, for example, if the standards change or depending on the implementation. In addition, the implementation may include various degrees of distribution of processing components. Further, even in a real-time system and especially in a non-real-time system, various of the calculations (e.g., calibration) may be performed on-line or off line. The electronic circuits may be, for example, hardware, software and/or firmware. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. An integrated VMM (vector-matrix multiplier) module, comprising:
   an electro-optical VMM component that multiplies an input vector by a matrix to produce an output vector;
   an electronic VPU (vector processing unit) that digitally processes digital data comprised in at least one of the input and output vectors; and
   a memory that stores at least one of matrix replacement values, at least one previous output vector and instructions for a component of the module.

2. A module according to claim 1, comprising a DSP (digital signal processor) that processes at least one of the input vector, the output vector or the matrix.

3. A module according to claim 2, wherein at least one of said DSP and VPU are programmed to calculate an update value for at least part of said matrix.

4. A module according to claim 1, wherein said VMM component includes a local memory buffer for update values of said matrix.

5. A module according to claim 1, comprising a register file adapted for exchanging information between said VMM and said VPU.

6. A module according to claim 5, wherein said register file includes a register copy ability for transferring information between registers.

7. A module according to claim 1, comprising a parameter extractor which extracts at least one parameter from at least one of said vectors.

8. A module according to claim 7, wherein said parameter comprises an extreme value element.

9. A module according to claim 1, wherein said VMM module comprises a pre-processor which preprocesses said input vector, to improve a quality of its processing by a matrix component of said VMM.

10. A module according to claim 1, wherein said VMM module comprises a pre-processor which preprocesses said input vector, to correct for artifacts caused by processing by a matrix component of said VMM.

11. A module according to claim 1, comprising a vector buffer for buffered input from an external circuit.

12. A module according to claim 11, wherein said buffer receives 8 bit data in parallel.

13. A module according to claim 1, comprising a controller which controls the operations of the VMM component and the electronic VPU.

14. A module according to claim 13, wherein the VMM component and the electronic VPU have operations cycles and the controller controls the operations of the VMM component and the electronic VPU in each operation cycle based on commands it receives.

15. A module according to claim 14, comprising controller memory which stores the commands of the controller.

16. A module according to claim 14, wherein the commands received by the controller include a field for each of the VMM component and the electronic VPU.

17. A module according to claim 14, wherein the commands received by the controller include a field for program flow commands.

18. A module according to claim 14, wherein the commands indicate for the VPU one or more of a precision to be used by the VPU, a method of overflow treatment and a parameter of truncation.

19. A module according to claim 14, wherein the commands are generated by compiling high language directives.

20. A module according to claim 1, formed as part of at least one of the following:
   a cellular telephone signal processor;
   WBCDMA (Wide Band Code Division Multiplexing Access) processor;
   an automated face recognition system;
   an XDSL (Digital Subscriber Line) modem;
   an OFDM (Orthogonal Frequency Division Multiplexing) processor;
   a VDB Wireless Broadcast processor;
   a GSM cellular communication system;
   an EDGE (2.5 G) cellular communication system;
   a packet processor;
   a router;
   a switch;
   a compression protocol processor;
   a decompression protocol processor;
   a JPEG processor;
   an MPEG processor;
   an MP3 processor;
   a CELP/LPC voice processor;
   a spectrum analyzer;
   a machine vision processor; and
   a correlation engine.

21. An integrated VMM (vector-matrix multiplier) module, comprising:
   a electro-optical VMM component that multiplies an input vector by a matrix to produce an output vector; and
   a controller, wherein said controller is operative to replace values in only a part of said matrix.

22. A method of improving signal detection in an electro-optical VMM, comprising:
   receiving an input vector and a matrix to be processed by said VMM; and
   rearranging said input vector on an input of said VMM and said matrix in a matrix portion of said VMM, in a manner that improves signal detection.

23. A method according to claim 22, wherein rearranging comprises spatially separating vector elements to reduce cross-talk.

24. A method according to claim 22, wherein rearranging comprises duplicating at least some vector elements.

25. A method according to claim 24, wherein rearranging comprises duplicating an entire vector.

26. A method according to claim 24, wherein rearranging comprises rearranging said matrix.

27. A method according to claim 24, wherein rearranging comprises rearranging said input vector so that at least some light sources of said VMM can be extinguished.

28. A method of improving signal detection in an electro-optical VMM, comprising:
   receiving an input vector and a matrix to be processed by said VMM; and
   adapting values of at least one of said input vector on an input of said VMM and said matrix in a matrix portion of said VMM, in a manner that improves signal detection.

29. A method according to claim 28, wherein adapting comprising negating values of at least some vector elements.

30. A method according to claim 28, wherein adapting comprises shifting a baseline value to be non-zero, such that light sources of the VMM are not extinguished to achieve this base line value.

31. A method according to claim 28, wherein adapting comprises amplifying or reducing input value to make use of an available dynamic range of said VMM.

32. A method according to claim 28, wherein adapting comprises shifting an input value base line to make use of an available dynamic range of said VMM.

33. A method according to claim 28, wherein adapting comprises applying a linearity correction.

34. A method according to claim 28, wherein adapting comprises weighting vector elements with weights that correspond to a number of zero values in a corresponding matrix column.

35. A method according to claim 28, wherein adapting comprises weighting at least one of vector elements and matrix elements with weights that correspond to an average of values in corresponding matrix columns.

36. A method of improving signal detection in an electro-optical VMM, comprising:

receiving an input vector and a matrix to be processed by said VMM;

processing said vector by said VMM to produce an output vector; and adapting values of said output vector, by applying a history correction which corrects for residual affects of a previous computation performed by said VMM.

37. A method according to claim 36, wherein said adapting comprises applying a temperature correction.

38. A method according to claim 36, wherein said adapting comprises applying a correction for an adaptation made to said input vector.

* * * * *